United States Patent
Bryan et al.

(10) Patent No.: US 7,592,713 B2
(45) Date of Patent: Sep. 22, 2009

(54) ELECTRICAL SYSTEM FOR CONTROLLING COACH RESOURCES

(75) Inventors: Mark A. Bryan, Eugene, OR (US); Kent M. Clark, Junction City, OR (US); John E. Randleman, Veneta, OR (US)

(73) Assignee: Marathon Coach, Inc., Coburg, OR (US)

(*) Notice: Subject to any disclaimer, the term of this patent is extended or adjusted under 35 U.S.C. 154(b) by 662 days.

(21) Appl. No.: 11/359,133

(22) Filed: Feb. 21, 2006

(65) Prior Publication Data

US 2006/0192663 A1   Aug. 31, 2006

Related U.S. Application Data

(60) Provisional application No. 60/656,706, filed on Feb. 25, 2005, provisional application No. 60/660,678, filed on Mar. 9, 2005.

(51) Int. Cl.
B60L 1/00 (2006.01)
B60G 17/018 (2006.01)

(52) U.S. Cl. .......................... 307/9.1; 701/36
(58) Field of Classification Search ......... 307/9.1–10.8; 701/36, 49
See application file for complete search history.

(56) References Cited

U.S. PATENT DOCUMENTS

| | | | |
|---|---|---|---|
| 4,262,212 A | 4/1981 | Jacob et al. | |
| 4,499,385 A | 2/1985 | Slavik | |
| 4,617,472 A | 10/1986 | Slavik | |
| 5,119,268 A | 6/1992 | Brown et al. | |
| 5,261,824 A | 11/1993 | Ness | |
| 5,548,522 A | 8/1996 | Primlani | |
| 5,581,130 A | 12/1996 | Boucheron | |
| 5,592,485 A * | 1/1997 | Consiglieri et al. | 340/2.1 |
| 5,869,907 A | 2/1999 | Marler | |
| 5,990,573 A * | 11/1999 | Granitz et al. | 307/10.1 |
| 6,107,696 A | 8/2000 | Peter et al. | |
| 6,590,758 B1 | 7/2003 | Friede et al. | |
| 6,892,121 B2 * | 5/2005 | Schmidt | 701/45 |
| 7,245,044 B2 * | 7/2007 | Woltereck et al. | 307/29 |
| 2003/0105567 A1 | 6/2003 | Koenig et al. | |
| 2003/0167105 A1 | 9/2003 | Colborn | |

* cited by examiner

*Primary Examiner*—Albert W Paladini
(74) *Attorney, Agent, or Firm*—Chernoff, Vilhauer, McClung & Stenzel

(57) ABSTRACT

An electrical system for controlling coach resources for improved reliability and economy. The electrical system may comprise a plurality of smart modules networked together on a multiple channel network, one or more work modules each communicably connected with one of the smart modules, and one or more electrical devices controllably connected with one of the work modules. In one embodiment, the multiple channel network comprises multiple CAN busses and the work modules communicate to smart modules via RS422/485.

6 Claims, 66 Drawing Sheets

LED(1-30) »
LH(1-30) »

| LH1 | R35 | LED1 |
| LH2 | R34 | LED2 |
| LH3 | R33 | LED3 |
| LH4 | R32 | LED4 |
| LH5 | R31 | LED5 |
| LH6 | R30 | LED6 |
| LH7 | R29 | LED7 |
| LH8 | R28 | LED8 |
| LH9 | R27 | LED9 |
| LH10 | R26 | LED10 |
| LH11 | R25 | LED11 |
| LH12 | R24 | LED12 |
| LH13 | R23 | LED13 |
| LH14 | R22 | LED14 |
| LH15 | R21 | LED15 |
| LH16 | R20 | LED16 |
| LH17 | R19 | LED17 |
| LH18 | R18 | LED18 |
| LH19 | R17 | LED19 |
| LH20 | R16 | LED20 |
| LH21 | R15 | LED21 |
| LH22 | R14 | LED22 |
| LH23 | R13 | LED23 |
| LH24 | R12 | LED24 |
| LH25 | R11 | LED25 |
| LH26 | R10 | LED26 |
| LH27 | R9 | LED27 |
| LH28 | R8 | LED28 |
| LH29 | R7 | LED29 |
| LH30 | R6 | LED30 |

FIG. 8H

* TECHLINK MODULE REPORT * ⌒— 1770

FET COUNT                    :4
    [SM0, PORT 14]  FET Module 1
    [SM0, PORT 15]  FET Module 0
    [SM1, PORT 14]  FET Module 3     ⌒— 1772
    [SM1, PORT 15]  FET Module 2

RELAY COUNT                  :8
    [SM0, PORT 8]   Relay Module 0
    [SM0, PORT 9]   Relay Module 1
    [SM0, PORT 10]  Relay Module 2
    [SM2, PORT 8]   Relay Module 3    ⌒— 1774
    [SM2, PORT 9]   Relay Module 4
    [SM2, PORT 10]  Relay Module 7
    [SM3, PORT 8]   Relay Module 5
    [SM3, PORT 9]   Relay Module 6

KEYPAD COUNT                 :13
    [SM0, PORT 0]   Keypad Module 0
    [SM0, PORT 1]   Keypad Module 1
    [SM0, PORT 2]   Keypad Module 2
    [SM0, PORT 3]   Keypad Module 3
    [SM1, PORT 0]   Keypad Module 4
    [SM2, PORT 0]   Keypad Module 5   ⌒— 1776
    [SM2, PORT 1]   Keypad Module 6
    [SM2, PORT 2]   Keypad Module 13
    [SM3, PORT 0]   Keypad Module 7
    [SM3, PORT 1]   Keypad Module 8
    [SM3, PORT 2]   Keypad Module 9
    [SM3, PORT 3]   Keypad Module 10
    [SM3, PORT 4]   Keypad Module 14

FIG. 17H

SMART MODULE COUNT   :4
    [SM0] Smart Module 0
    [SM1] Smart Module 1
    [SM2] Smart Module 2
    [SM3] Smart Module 3

CIRCUIT BREAKER COUNT :1
    RELAY COUNT: 2
    [SM1, PORTS 8, 9] Circuit Breaker Controller  ~ 1778

INTERFACE MODULE COUNT: :1
    [SM0] IFM0 - Interface Module 0  ~ 1780
================:
TOTAL MODULE COUNT   :32  ~ 1782

```
/******************************************       1800
* Main Core of Smart Module for "The Project"
* Company    : Marathon Coach, Inc.
* Programmer : Kent Clark
* Version    : 1.0                      1772
********************************************/
#include <912dp256.h>
#include "SmartMain.h"                            1802

NODE_INFO DvIf ;
unsigned char AppMem [RAM_SIZE] ;   // RAM for application program.

void InitIADC (void)                // Setup A to D converts.
{
} void InitIO (void)                  // Setup I/O Lines.
{
} void InitTimers (void)              // Setup Timers.
{
}

// Startup.
void Init_OS (void)
{
        int iRet ;
        COM_Setup comInf ;
        extern void Mod_Init (void) ;
        extern void CAN_Init (void) ;
        extern void CMD_Init (void) ;
        extern int InitIdentifiers (void) ;      1810

COM_Init ( ) ;       // Setup SCI (COM Ports)
        Mod_Init ( ) ;
        CAN_Init ( ) ;       // Setup CAN Interface.

InitADC ( ) ;        // Setup A to D converts.
        InitIO ( ) ;         // Setup I/O Lines.
        InitTimers ( ) ;     // Setup Timers.     1825 iRet = InitIdentifiers ( ) ;
```

FIG. 18A

```
        CMD_Init ( );              // Setup Command Processing.  ~1830

DvIf.smID = 0 ;            // This nodes ID.  ~1835

/* SCI Baud Values.
         * 9600  = 68H @ 16MHz.
         * 19200 = 34H @ 16MHz.
         * 38400 = 1AH @ 16MHz.
         */

// Setup Serial UART.
//      comInf.baudRate = 0x1A; // UART Baud Rate Selection - 38400 Baud.
//      comInf.baudRate = 0xD;  // UART Baud Rate Selection - 38400 Baud.
        comInf.baudRate = 0xD0; // UART Baud Rate Selection - 2400 Baud.
        comInf.devType  = 0;           // Any other types of devices connected.
        comInf.mode     = 0;    // UART Mode, RTS, CTS, DTR, CD, etc.
        COM_Open (COM_SER, &comInf) ;
                                                   ~1840

// Setup Work Module UART.
//      comInf.baudRate = 0x68; // UART Baud Rate Selection - 9600 Baud.
        comInf.baudRate = 0x34; // UART Baud Rate Selection - 9600 Baud.
        comInf.devType  = 0;           // Any other types of devices connected.
        comInf.mode     = 0;    // UART Mode, RTS, CTS, DTR, CD, etc.
        COM_Open (COM_MOD, &comInf) ;
                                                   ~1845

DvIf.ndBits.onLine = TRUE ;
        // DvIf.comCmd = CMD_STANDBY;
        //DvIf.comCmdState = 0 ;
} void Do_OS_App (void)
{
        extern void CAN_Io (void) ;
        extern void Mod_Io (void) ;

extern void ScanDev (void) ;
        extern void CMD_Io (void) ;

// Process I/O Stuff.
        COM_Pump ( ) ;            // Pump COM I/O.
        // Mod_Io ( ) ;           // Pump I/O to Modules.       } 1850
        // -> CAN_Io ( ) ;        // Pump CAN Network.
```

FIG. 18B

```
        // Process Application Stuff.
        CMD_Io ( ) ;           // Process Command Interface.      ~ 1860
        // - > ScanDev ( ) ;    // Talk to Devices.
}

// Startup
void main ( )
{
        DvIf.ndBits.fTime = TRUE ;        // First Time.
while (TRUE) {                             // Run Forever & Ever.
        // Init Software.
        Init_OS ( ) ;
        DvIf.ndBits.fTime = FALSE ;       // Clear First Time Flag.    1865
        DvIf.ndBits.Reset = FALSE ;       // Restart software flag.
        // OS Core.
        do {                              // Run until reset.           1870
            Do_OS_App ( ) ;   // Execute Application Thread.
        } while ( !DvIf.ndBits.Reset) ;
    }
}

// End of Source Code.
```

FIG. 18C

ELECTRICAL SYSTEM FOR CONTROLLING COACH RESOURCES

CROSS-REFERENCE TO RELATED APPLICATIONS

This application claims the benefit of U.S. Provisional App. No. 60/656,706, filed Feb. 25, 2005 and U.S. Provisional App. No. 60/660,678, filed Mar. 9, 2005.

BACKGROUND OF THE INVENTION

The present invention relates to an electrical system. More particularly, the present invention relates an electrical system for controlling electrically operable resources installed on a vehicular platform such as a recreational vehicle, conversion bus, or motor coach.

The conversion of a bus chassis or shell into a luxury recreational vehicle, corporate coach, or other customized motor coach involves hundreds of man-hours for the installation of numerous materials and components, specialized fabrications, hundreds of special purpose components, hundreds of feet of electrical wire, and so forth. Depending upon the extent of the conversion, the resulting coach may sell for as much as two million. Each of these highly customized coaches is typically made from a chassis or conversion shell which is built-up with the features and materials and in the configuration specified by the customer.

In terms of the converter's manufacturing operations, the conversion business is characterized by high complexity, low volume (i.e. a production/manufacturing lot size of one since each unit is unique), high rework (as customers routinely review the unit during its construction, typically making changes), and high feature content (incorporating the latest consumer features such as motor lifted plasma TV's, DVD players, and so forth). Each customer decides the particular layout of their coach. Customer decisions include placement of accent lighting in various parts of the coach, incorporation of slide out portions to increase interior space, selection of various appliances such as refrigerators and air conditioning systems, specification of various electronic devices such as rearward camera systems for increasing driver visibility, citizens band or other communications systems, security and alarm systems, and so on.

Each of the electrically operable features typically involves the placement of switches, one or more gage or display indicators, and wiring from multiple power sources such as chassis/engine and house batteries, shore power facilities, alternators, and generators. Existing electrical systems have typically involved point-to-point or discrete wiring for each electrical device, display, switch, and so forth. Such systems involve wire routings that are specific to the particular customer order, and the wiring often needs to be pulled through the walls, the chassis, and other difficult to reach areas throughout the coach. Accommodating customer change orders is usually labor intensive. The addition of a single feature typically requires rewiring control panels where the feature is controlled or monitored, pulling additional wires throughout the coach to connect the feature to various power sources, reworking fuse panels, circuit breakers, junction boxes, and other connection points to allow for the added feature. Adding a feature also requires updating numerous engineering drawings to document wire routings, revised system schematics, and so forth.

The automotive industry has developed multiplexing as a way to reduce the amount of wiring within a motor vehicle. In particular, a vehicle electrical system may incorporate networked intelligent nodes that communicate with a central control processor across a controller area network (CAN) bus. Instead of running discrete wires from, for example, multiple sensors, back to a central processor, each sensor is an intelligent node which communicates across multiple CAN bus back to a central processor. Each intelligent node requires a microprocessor for executing programming instructions and means to communicate on the CAN bus.

An example of a system using a central control processor is U.S. published patent application 2003/0105567, entitled "Mobile Energy Management System," by Koenig, et al., which discloses a local area network (LAN) for managing the power provided to various electrical appliances installed in a recreational vehicle. The LAN consists of a master node for managing which appliances are to receive power depending upon a priority scheme for the appliances and the available power. Sensors are used to detect the type of external power source connected to the vehicle. Various appliances may be automatically shut down when the power supply cannot meet demand.

The recreational vehicle industry has considered using a fully distributed network architecture comprising intelligent nodes that communicate with each other on a peer-to-peer basis. An example is the LonWorks® system by Echelon Corporation of Palo Alto, Calif. Each device in the LonWorks® system is an intelligent node having a microprocessor and means for communicating on a network bus. Each device is able to communicate directly with every other device on the network. Consequently, each device hears all communications on the network bus. For example, a lighting device on the network will continually listen to all communications on the network bus until it recognizes a command that it can execute (e.g. turning on or off). Likewise, a switch device attempting to control the lighting device will listen until the network bus is available, transmit the controlling command, and listen for an acknowledgement from the lighting device. Alternatively, the switch device attempting to control the lighting device may repeatedly retransmit the controlling command until an acknowledgement is received from the lighting device.

Other systems have been developed to address various control aspects. For example, U.S. Pat. No. 4,262,212, entitled "Automatic Power Control Circuit for Recreational Vehicle or the like," by Jacob, et al., provides a control circuit for automatically switching between vehicle power sources. When load requirements exceed the power available from one source, for example a land line (also called shore power), the generator is automatically started and the power source is switched to the generator.

U.S. Pat. No. 5,581,130, entitled "Circuit Board for the Control and/or Power Supply of Electrical Function Devices of a Vehicle," by Boucheron, discloses a circuit board with removable modules for modifying vehicle circuits to accommodate various optional accessories in the vehicle. The circuit board aggregates wiring connections into a "cabin computer" where modules may be added or removed as needed.

U.S. Pat. No. 5,869,907, entitled "Modular Wiring Harness for a Vehicle," by Marler, discloses a motorcycle wiring harness design with repositioned fuses, splices, relays, circuit breakers, and other in-line features to form a system module with diagnostic indicator lights intended to help simplify the aftermarket rebuilding or customization of motorcycles.

What is needed is an electrical system for controlling coach resources that provides improved reliability and economy.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

For a more complete understanding of the present invention, the drawings herein illustrate examples of the invention. The drawings, however, do not limit the scope of the invention. Similar references in the drawings indicate similar elements.

FIGS. 8A-8I comprise schematics for a switch group module according to one embodiment.

FIGS. 17A-17I depict exemplary screen shots of an application used for programming, testing, and calibrating an electrical system for controlling coach resources, according to one embodiment of the invention.

FIGS. 18A-18B illustrate exemplary main core programming instructions for a smart module.

DETAILED DESCRIPTION OF PREFERRED EMBODIMENT

In the following detailed description, numerous specific details are set forth in order to provide a thorough understanding of the present inventions. However, those skilled in the art will understand that the present inventions may be practiced without these specific details, that the present inventions is not limited to the depicted embodiments, and that the present inventions may be practiced in a variety of alternate embodiments. In other instances, well known methods, procedures, components, and systems have not been described in detail.

Various operations will be described as multiple discrete steps performed in turn in a manner that is helpful for understanding the present inventions. However, the order of description should not be construed to imply that these operations are necessarily performed in the order they are presented, nor even order dependent.

Overview

Figure 1:
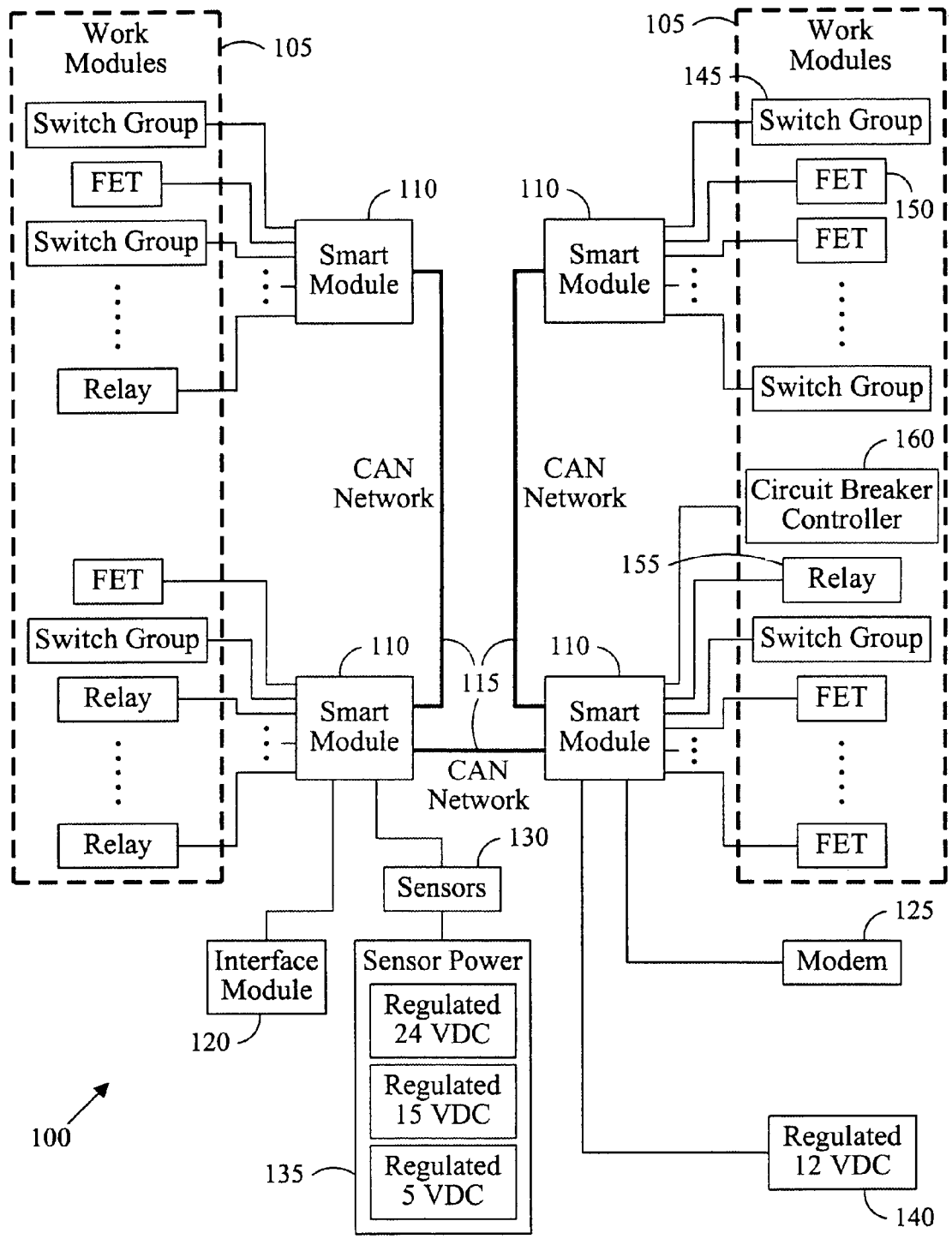
FIG. 1 illustrates a network architecture of an electrical system for controlling coach resources according to one embodiment of the invention.

FIG. 1 illustrates a network architecture 100 of an improved electrical system for controlling coach resources according to one embodiment of the invention. The system comprises interconnected and networked work modules 105 and smart modules 110 with each of the smart modules 110 containing configuration information that characterizes the electrical system installed on a particular coach. Each of the smart modules 110 includes stored configuration information for the electrical system such that each of the smart modules 110 is interchangeable within the system. A typical system comprises four to eight smart modules 110 networked together by four CAN buses, the CAN busses comprising a CAN network 115 and forming a redundant communication back bone system.

Each smart module 110 comprises a network hub using RS422 or RS485 with up to sixteen connections to work modules 105. Standard RJ45 connectors and twisted pair wires are used for connecting work modules 105 to the associated smart module 110.

The innovative network architecture 100 has advantages over other architectures such as peer-to-peer networks (used in LonWorks® or 10Base-2 systems) because servicing and diagnostics of their fully distributed architecture is difficult due to the fact that access to the modules is limited. Other systems that use a central control processor system, such as Allen Bradley or Crestron, are susceptible to total failure if the core processor system goes down. The network architecture 100, by comparison, provides an innovative approach in which if a particular smart module 110 fails, one of the other smart modules 110 can be used to replace the failed smart module 110. Only the work modules 105 connected to the failed smart module 110 may not function as a result of the failure, leaving the rest of the work modules 105 unaffected.

Also, the hub function of smart module 110 provides a central location performing diagnostics on work modules 105 without having to disassemble the coach. For example, a laptop computer may be interfaced into the smart module 110 or work module 105 for performing diagnostics. Each smart module 110 includes an optically isolated RS232 serial port interface for allowing other devices to connect to the smart module 110. Such devices may include a modem 125 for remote diagnostics, a display computer 127 for monitoring coach resources, devices for connecting with other control systems.

The smart modules 110 further comprise A/D converters and digital I/O for interfacing into the coach resources. The A/D converters and digital I/O on-board the smart modules 110 are typically used with sensors 130 for sensing fluid levels for various tanks, various temperatures, voltages, pressures, and so forth. An interface module 120 may be used with screens or other displays to view input and output characteristics of the sensors 130.

The sensors 130 use regulated sensor power 135, and the smart modules 110 use regulated power 140. Various sensor types require regulated sensor power 135 comprising 5 VDC, 15 VDC, and 24 VDC regulated power supplies, and smart modules 110 require 12 VDC regulated power 140. The sensor power 135 and the regulated power 140 are preferably from 'house' batteries, which are completely independent of the battery running the engine. In this manner, when the engine is turned on, or the air conditioning is turned on, the power to the network system is not disturbed. Also, if you leave on items in the living area of the vehicle, the engine batteries are not drained so that the engine will cease to start.

In many cases, each of the smart modules 110 is located in a different region of the vehicle proximate an associated set of work modules 105. The CAN network is preferably interconnected using a network cable between smart modules 110. Unfortunately, during the remodeling and typical usage of the vehicle, the network cable may become severed rending the interoperability broken. In order to reduce the likelihood of such an event, the system preferably includes a plurality of network cables between each smart module 110, such as four separate cables. In this manner, while it may seem unnecessarily redundant, there is a significantly reduced likelihood that all of the networks cables will become severed. The system may transmit commands simultaneously across all of the network cables from smart module to smart module. In other implementations, the system may determine that the signals are not being properly transmitted across one of the network connections and switch to another network connections. In the case of four separate network connections, the system may switch between the four cables until the data is transmitted to the other smart module.

The work modules 105 may comprise one or more special purpose module such as a switch group (or keypad) module 145, a lighting module 150, a relay module 155, and a circuit breaker controller 160. The work modules 105 process requests from the smart module 110 via RS422 or RS485, including performing commands received from or sending information to the smart module 110. For example, a switch group module 145 may receive switch inputs for controlling lights that are connected to a particular lighting module 150. The switch group module 145 processes the switch inputs and communicates via RS422 or RS485 to a smart module 110. The smart module 110 then finds the appropriate lighting module 150 for controlling the desired lighting, perhaps communicating across CAN network 115 to another one or more smart module 110 to find the appropriate lighting module 150. In this example, the switch inputs for controlling certain lights are communicated over RS422/485, through one or more smart module 110, and then to the appropriate lighting module 150 wired to the desired lights.

Within the environment of a vehicle, the smart module may be readily accessible but it is somewhat difficult to figure out what is at the other end of the cable, such as which work module is a particular cable connected to, since the work module may be a significant distance from the smart module with the cabling located behind the interior wall. In order to facilitate the ability to identify a particular work module with a particular cable, the work modules are preferably color coded and corresponding color coded cables are used. In this manner, a 'green' cable connected to a smart module would indicate a corresponding 'green' work module, which may be a switch group module 145 for example. This facilitates the quick ability to identify the type of module at the end of the color coded cable.

The switch group module 145, for example, comprises an internal keypad, scans a membrane keypad for button presses, and drives LED's located under the membrane. The switch group module 145 may process up to ten external switch inputs and control various types of LED's such as bi-color and tri-color, RGB LED's. The switch group module may, for example, change the output of the lighting, dim the lighting, mood lights, track lighting on the flooring.

The lighting module 150 may include four field effect transistors used for lighting with pulse width modulation (PWM) control or for switching other devices. For example, the lighting module 150 comprises four power MOSFET's controllable via RS422/485 communication with a smart module 110 or using digital inputs on the lighting module 150 directly. The lighting module 155 may, for example, change the output to heating elements, bed lifts, or other types of devices that tend to be either 'on' or 'off'.

The relay module 155 comprises six Form C, or single pole double throw (SPDT), relays with each relay including a bi-directional current sense circuit. Whereas the lighting module 150 may be communicably connected with one or more smart modules 110 for dimming or controlling various coach DC lighting resources, the relay module 155 may be communicably connected with one or more smart modules 110 to turn on and turn off various AC or DC appliances and other devices. The single-pole double throw (Form C) relay allows for both normally closed (NC) and normally open (NO) operation. The current sensing circuitry may be used in determining whether one of the Form C relays comprising the relay module 155 is operated in the normally closed or normally open mode. Thus, the relay module 155 allows for remotely turning on and off a device. For example, the relay module 155 may be used to drive a DC motor to flip (on) an AC circuit breaker and also, by reversing the polarity, to drive the DC motor in the opposite direction to flip the AC circuit breaker switch into the former (off) position.

The circuit breaker controller 160 comprises, in one example, two relay modules 155 configured to selectively operate individual circuit breaker controllers within a matrix of individual circuit breaker controllers. Operation of circuit breaker controller 160 may involve a keypad or switch input received by a smart module 110. The smart module 110 then processes the switch input to determine which of the relays within the two relay modules 155 comprising the circuit breaker controller 160 are needed to operate the desired individual circuit breaker controller.

Each of the work modules 105 includes software written for the purpose for which the processor is being used within the particular module type. For example, the switch group module 145 includes software written to perform the necessary switching functions, such as scanning keypads or other switch inputs, appropriately driving the LED indicator lights, and so on. Likewise, the lighting module 150 and the relay module 155 each include software written to perform the necessary functions, light control and relay control, respectively. In the case of the smart module 110, the software written and stored therein manages flash memory or other memory capable of storing coach electrical system configuration information and documentation. Each of the one or more smart modules 110 includes coach electrical system configuration information (and documentation) so that all needed information can be retrieved from any one of the smart modules 110. Also the smart module 110 includes the logic for managing the CAN network 115, the serial ports, the A/D converters, the digital I/O, and all of the work modules 105. Further, the smart module 110 may include software programming and configuration information to allow the work modules 105 to function in different ways so as to create new virtual devices such as the circuit breaker controller 160. By including the programming information in each of the smart modules, it is highly unlikely that the programming information will be lost for the system. Otherwise, if the programming for a particular customized vehicle is lost then recreating the necessary programming is problematic, at best. Also, if the programming information is lost for a particular vehicle, the manufacturer may simply download the information from one of the smart modules.

In order to manage the coach electrical system comprising network architecture 100, supporting software may be used to configure modules 105 and the smart modules 110. For example, a standard spreadsheet program may be used to establish how the work modules 105 and smart modules 110 will operate together in a particular coach. The supporting software may be used with the standard spreadsheet program to compile a flash file for use with the smart modules 110 that the smart modules 110 in turn use for linking various functions together. For instance, a particular coach may have four smart modules 110 with a switch group module 145 and a lighting module 150 that need to be logically linked together so that a particular light or device attached to the lighting module 150 is appropriately responsive to activation of a particular switch attached to the switch group module 145. A computer executing the supporting software may then be used to load the flash file into the smart module 110 using the interface module 120 or the modem 125.

The supporting software may also be used to modify the CAN network identifiers, poll identifiers, and other aspects of managing communications between the smart modules 110 on the CAN network 115. Further, for troubleshooting and diagnosing problems, the supporting software may also be used to activate and control individual functions of individual smart modules 110 and work modules 105.

Preferably the work modules do not include an internal identification number so that they are identified by their type (if desired) and their position of interconnection on a smart module. In this manner, the smart module programming (which is the same across all smart modules) is aware of which work module and which device (which connector) on which particular smart module is the location of the particular device. Thus the work module may be simply replaced on the connector with a new operational one, and the system is ready to go without further configuration. This reduces the steps necessary to install a new work module, which increases the likelihood that the technician will properly install a new work module.

Smart Module

Figure 2A:
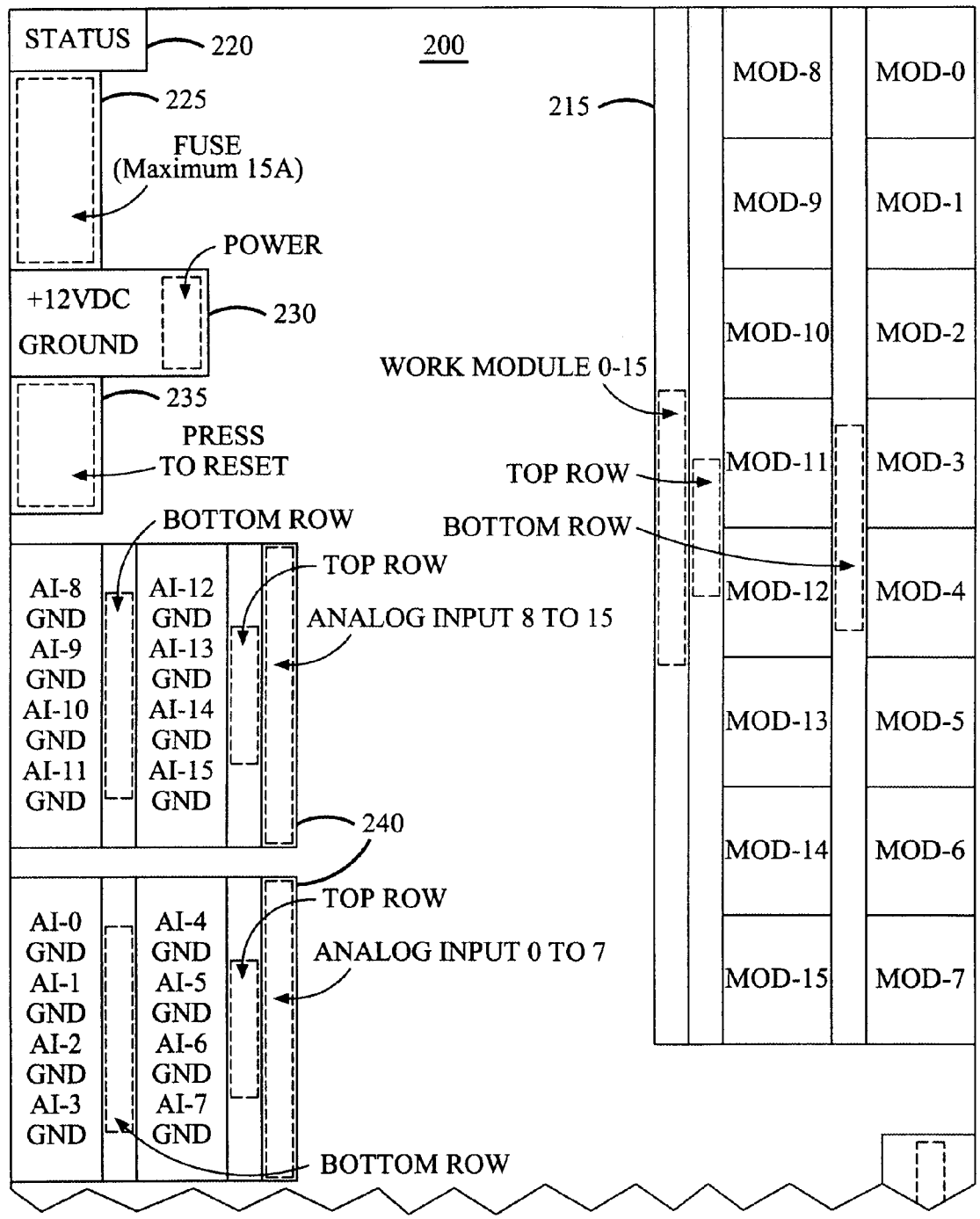
FIGS. 2A-2B illustrate an exemplary smart module.
Figure 2B:
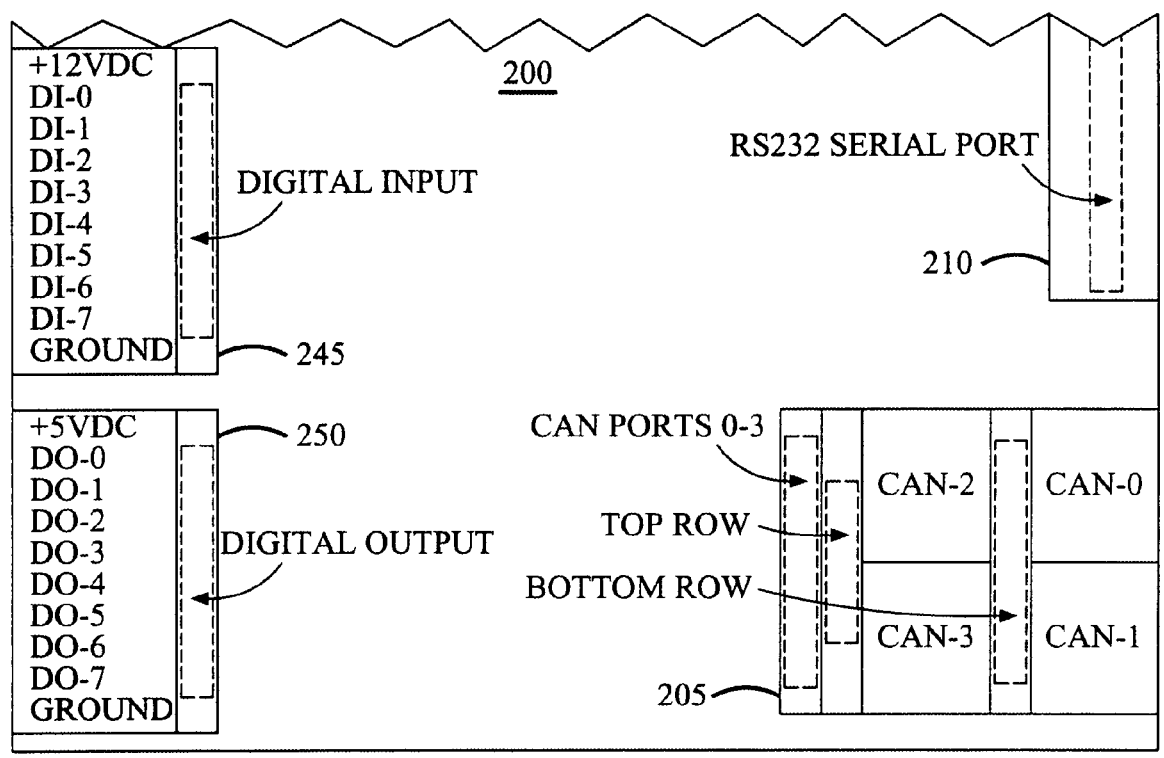

FIGS. 2A-2B illustrate an exemplary smart module 200. The smart module 200 includes four CAN port connections 205 which are used to connect the smart module 200 to the CAN network 115 as shown in FIG. 1. Each of the four CAN port connections 205 comprises a connection for one cable that supports two CAN busses. Thus, if two or more of the CAN port connections 205 are used to connected between the same two smart modules 200 the CAN bus then has a redundant communication backbone system comprising the CAN network 115. In this manner, the system is resistant to damage of the network cable itself, which could occur from for example a screw penetrating the cable. The smart module 200 communicates across any of the four CAN busses as needed. If a particular CAN bus is busy, for instance, smart module 200 will choose the next available CAN bus to communicate across the CAN network 115. The four CAN busses provide additional channels of communication, improving system response for time-critical functions such as dimming lighting within the coach. The data transfer speed across the CAN network 115 is typically 250 Kbps.

Unacceptable delay in time-critical functions (such as lighting control) has been a problem with fully distributed architectures, networks using a common CAN bus, systems with lower available bandwidth, and so forth. In systems with, for example, thirty to forty intelligent nodes attempting to communicate over a typical control network comprising a single network bus, network latency can easily frustrate a user attempting to, for instance, dim certain lights. The user may continue attempting to dim the lights, causing the lights to eventually dim to an intensity below the desired intensity. Worse, the user may subsequently attempt to turn the lights back up, and, facing the same problem, may again overcompensate and end up with lighting at an intensity above that which is desired. Compounding the problem is a high likelihood that the user's experience with such latency is intermittent—sometimes the system appears to work, sometimes it doesn't. By contrast, the network architecture 100 involves a small number of smart modules 110 as in FIG. 1 attempting to send control signals over the CAN network 115.

As will be discussed further below, the smart module 200 may be connected to other smart modules 110 in a number of ways. For example, the four CAN port connections 205 may comprise RJ45 modular receptacles and the CAN bus cables may comprise standard plenum rated (blue in color) CAT-5 type unshielded twisted pair (UTP) cables terminated with RJ45 modular plugs. Total end-to-end CAN bus cable length may be in the range of 164 feet to 262 feet in a typical coach installation.

Moving counterclockwise around the smart module 200 illustrated in FIGS. 2A-2B, an optically isolated RS232 serial port connection 210 is provided. A laptop or personal computer may be connected to the smart module 200 using the RS232 serial port connection 210 for programming or troubleshooting the smart module 200. The laptop or PC may be used, for example, to load software into flash memory within the smart module 200. The laptop or PC may be used to monitor operation of the smart module 200 or operation of work modules 105 connected to the smart module 200. Additionally, the laptop or PC may be used to monitor communications across the CAN network 115 as well as to monitor or troubleshoot operation of other smart modules 110 within the network architecture 100 and of work modules 105 connected to those smart modules 110.

The RS232 serial port connection 210 may also be with the modem 125 for performing remote diagnostics and with the interface module 120 for viewing inputs and outputs associated with the sensors 130 that may be connected to the smart module 200.

Up to sixteen work module connections 215 may be used to connect up to sixteen work modules 105, with the smart module 200 comprising a network hub. Each of the sixteen work module connections 215 comprise RJ45 modular receptacles for connecting to a particular work module 105. Each of the work modules 105 connected using the module connections 215 may be networked to the smart module 200 using full duplex RS422 and typically supporting a data rate of 9600 bps across cable lengths up to 4000 feet. A typical installation includes several different work modules 105 networked to the smart module 200 with each type of work module 105 having its own color coded RS422 cabling. For instance, referring to the work modules 105 in FIG. 1, each switch group module 145 may have green colored R2422 cabling, each lighting module 150 may have yellow colored cabling, and each relay module 155 may have red colored cabling. As mentioned, the smart module 200 may have blue colored CAN bus cabling. The color coded cabling facilitates tracing wires and troubleshooting and generally simplifies management of the electrical system wiring.

The smart module 200 incorporates a status LED 220 for indicating the operational status of the smart module 200. For example, a multi-color LED may be used with green indicating proper functioning of the smart module 200 and red indicating an error. A steady, non-blinking LED may indicate the smart module 200 is powered and turned on whereas a blinking LED may indicate the smart module 200 is functioning. In particular, the status LED 220 may flash green to indicate that the processor within the smart module 200 is functioning properly, and the status LED 220 may flash green and red to indicate certain error codes. For instance, an error coming from a first work module port within the work module connections 215 may be indicated by alternating one flash red and one flash green, and an error coming from a second work module port within the work module connections 215 may be indicated by alternating one flash red and two flashes green. Exemplary error codes for the smart module 200 are given in the table below.

| Red Flashes | Green Flashes | Work Module Port | CAN Network Port |
|---|---|---|---|
| 1 | 1 | 0 | |
| 1 | 2 | 1 | |
| 1 | 3 | 2 | |
| 1 | 4 | 3 | |
| 1 | 5 | 4 | |
| 1 | 6 | 5 | |
| 1 | 7 | 6 | |
| 1 | 8 | 7 | |
| 2 | 1 | 8 | |
| 2 | 2 | 9 | |
| 2 | 3 | 10 | |
| 2 | 4 | 11 | |
| 2 | 5 | 12 | |
| 2 | 6 | 13 | |
| 2 | 7 | 14 | |
| 2 | 8 | 15 | |
| 3 | 1 | | 0 |
| 3 | 2 | | 1 |
| 3 | 3 | | 2 |
| 3 | 4 | | 3 |

Still moving counterclockwise around the smart module 200 illustrated in FIGS. 2A-2B, a fuse 225 (for instance, a 15 amp fuse) is provided for over current circuit protection. The power connections 230 are used to receive regulated 12 volt power (+12 volts and ground) from a regulated power supply (such as regulated power 140 as shown in FIG. 1). The smart module 200 also provides power to the work modules 105 to help balance loads across the coach electrical system. This also helps maintain a more even keypad lighting intensity throughout the coach.

The smart module 200 incorporates a "press to reset" type of reset button 235 for resetting the smart module 200 to, for example, clear error codes indicated by the status LED 220.

Up to sixteen analog inputs 240 are used to receive analog signals from the sensors 130. A typical coach electrical system may comprise more than twenty sensors. A typical system comprises eight different types of sensor, each requiring a particular regulated voltage supply. The eight different types include sensors for indicating: tank level (requiring 5VDC), temperature (requiring 5VDC), AC volts (requiring 24VDC), AC amps, DC volts (requiring 5VDC), DC amps (requiring 15VDC), generator water temperature (requiring 5VDC), and generator oil pressure (requiring 5VDC).

The smart module 200 also incorporates digital I/O such as digital inputs 245 and digital outputs 250. The digital outputs 250 may be used for turning devices on or off. The digital outputs 250 include eight outputs as well as regulated power connections (+12VDC and ground). The digital inputs 245 shown in FIGS. 2A-2B include eight inputs for features such as thermostats. The digital inputs 245 also include power connections for the digital input circuit (here, +12VDC and ground).

Figure 3:
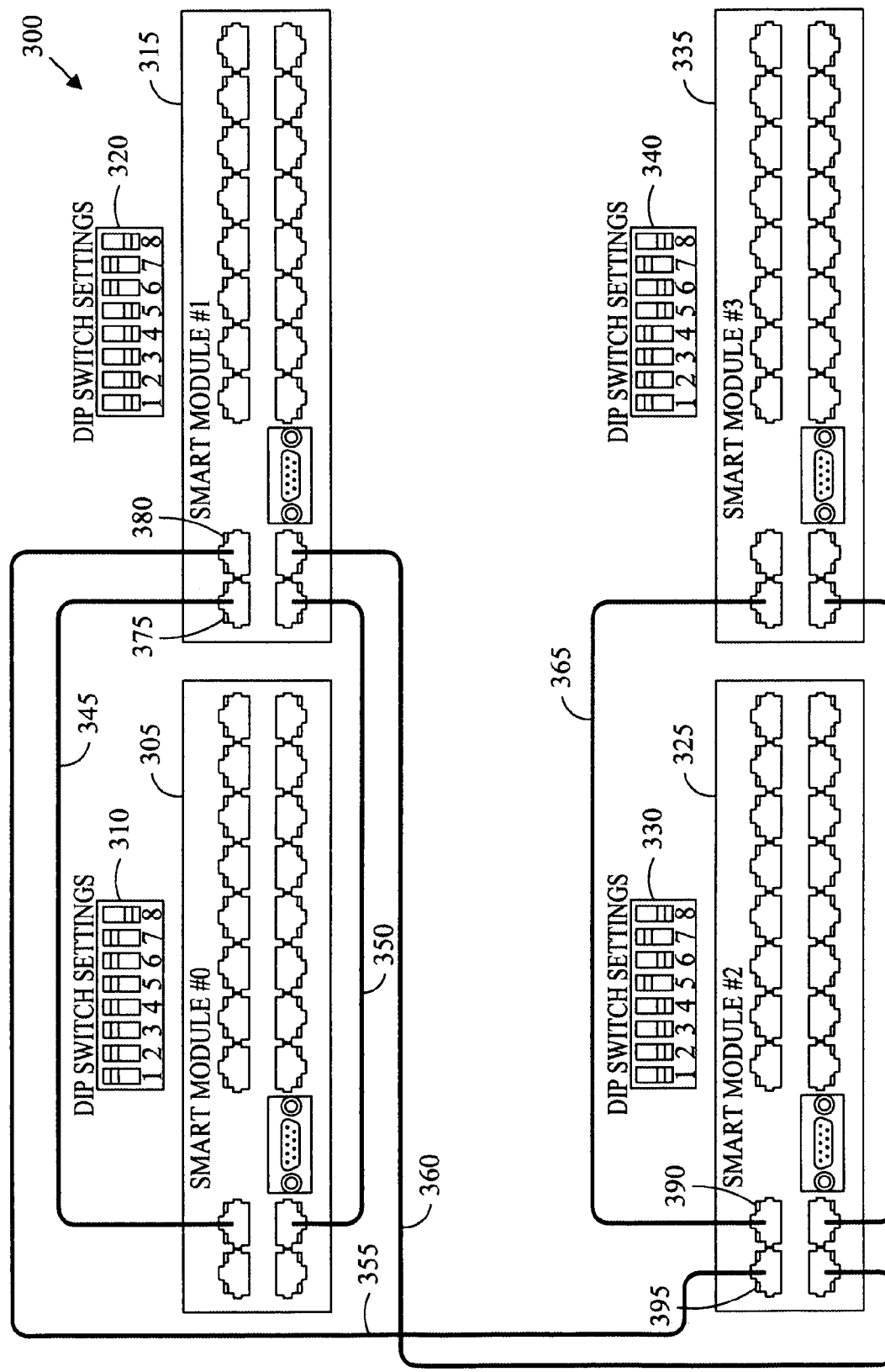
FIG. 3 illustrates exemplary CAN bus interconnections between four smart modules.

Next, FIG. 3 illustrates an exemplary CAN bus interconnection layout 300 comprising four smart modules. Each of the smart modules has a unique identification within the CAN bus interconnection layout 300, and each of the smart modules includes internal DIP switches that are used to set a smart module identification number and enable CAN bus termination resistors as needed within the CAN bus interconnection layout 300. For instance, the smart module 305 includes internal DIP switch settings 310 that may be set so that the smart module 305 is configured as smart module #0. Likewise the smart module 315 may be configured as smart module #1 using the DIP switch settings 320, the smart module 325 may be configured as smart module #2 using DIP switch settings 330, and the smart module 335 may be configured as smart module #3 using DIP switch settings 340. The smart modules may also be self-identifying on the network, if desired.

One scheme for mapping functions to each of the internal DIP switches is to configure switches one through four to control CAN bus termination, switches five through seven to set the smart module identification number, and switch eight to control an auxiliary or developmental function such as background debugging. As shown in FIG. 3, the DIP switch settings 310 are set with switches one through seven in the ON or "1" position and switch eight is in the OFF or "0" position. Switches five through seven are set in the ON position ("111") and thus configuring the smart module 305 to function as smart module #0. The smart module 305, when configured as smart module #0 using the DIP switch settings 310, then executes the programming instructions stored within the smart module 305 to appropriately manage the work modules, sensors, and other devices connected to the smart module 305. Likewise, switches five through seven of the DIP switch settings 320 are set OFF-ON-ON ("011") to configure the smart module 315 as smart module #1, switches five through seven of the DIP switch settings 330 are set ON-OFF-ON ("101") to configure the smart module 325 as smart module #2, and switches five through seven of the DIP switch settings 340 are set OFF-OFF-ON ("001") to configure the smart module 335 as smart module #3.

A typical CAN bus system comprises terminating resistors (for instance, 120 ohm resistors) at each end of the CAN bus. In the CAN bus interconnection layout 300, the smart module 305 with DIP switch settings 310 comprises one end of the CAN bus system. Thus, switches one through four in DIP switch settings 310 are turned to the ON position, electrically connecting the impedance matching (120 ohm) resistors to the ends of the four CAN busses which terminate at the smart module 305.

As shown in FIG. 3, the CAN bus cables 345 and 350 connect the smart module 305 with the smart module 315, the CAN bus cables 355 and 360 connect the smart module 315 with the smart module 325, and the CAN bus cables 365 and 370 connect the smart module 325 with the smart module 335. Therefore, in this CAN bus interconnection layout 300, the smart module 335 comprises the other end of the CAN bus system. Thus, like the DIP switch settings 310 within the smart module 305, switches one through four in the DIP switch settings 340 within the smart module 335 are turned to the ON position, electrically connecting the impedance matching resistors to the ends of the four CAN busses which terminate at the smart module 335. The DIP switch settings 320 and 330 for the smart modules 315 and 325, respectively, each have switches one through four in the OFF position, electrically disconnecting the impedance matching terminating resistors (typically only used at the far ends of a CAN bus system).

As described previously, each of the CAN bus cables 345, 350, 355, 360, 365, and 370 each comprise two CAN busses, and, therefore, each pair of CAN bus cables (for instance the CAN bus cables 345 and 350) comprise four CAN busses connecting each of the smart modules 305, 315, 325, and 335.

In the CAN bus interconnection layout 300, CAN bus cable 345 is matched up with CAN bus cables 355 and 365 such that the two CAN busses supported by each of the CAN bus cables 345, 355, and 365 comprise two communicably contiguous CAN busses. For example, the CAN port connection 375 is configured to match up with the CAN port connections 380, 385, and 390 so that two separate CAN busses are formed. Similar connections involving CAN bus cables 350, 360, and 370 form the other two CAN busses that comprise the CAN bus interconnection layout 300.

Because each of the smart modules 305, 315, 325, and 335 are physically identical, having the same structure, stored programming instructions, and so forth, each smart module is interchangeable with each other smart module. For example, if the smart module 315 malfunctions, it can be replaced by another smart module. The replacement smart module may be configured to operate as the failed smart module by setting the DIP switch settings. In this case, the replacement smart module used in place of the smart module 315 should have its DIP switch settings positioned to match the DIP switch settings 310 as shown in FIG. 3 (or otherwise auto-configuration).

The replacement smart module may be a new smart module, in which case software for the replacement smart module may be copied from any of the remaining smart modules, or the replacement smart module may be one of the other smart modules already within the coach electrical system. If desired, the smart module without being programmed may be included within the network and the suitable programming being provided from one or more of the other smart modules. In this manner, the user could install a new smart module and have it automatically programmed. For instance, the failed smart module 315 may be replaced by the smart module 305 simply by repositioning the smart module 305 in place of the failed smart module 315 (reconnecting all of the work modules, sensors, CAN bus cables, etc.) and resetting the DIP switch settings 310 so that the smart module 305 is configured as smart module #1 with the DIP switch settings 320. The interchangeability of smart modules makes it possible to restore critical resources (for example, air conditioning and main lighting) by swapping the malfunctioning smart module with another smart module within the coach that may be controlling less critical or non-critical resources (such as accent lighting). Thus, the reliability of the control system for controlling coach resources is improved since any smart module within the system may be used to keep the critical resources functioning. Moreover, the procedure for swapping out smart modules is straightforward, involving physically swapping the failed smart module with a functioning one, reconnecting the cabling and wiring, resetting the internal DIP switch settings in the repositioned (functioning) smart module, and (if necessary) pressing the reset button on the repositioned smart module.

Figure 4:
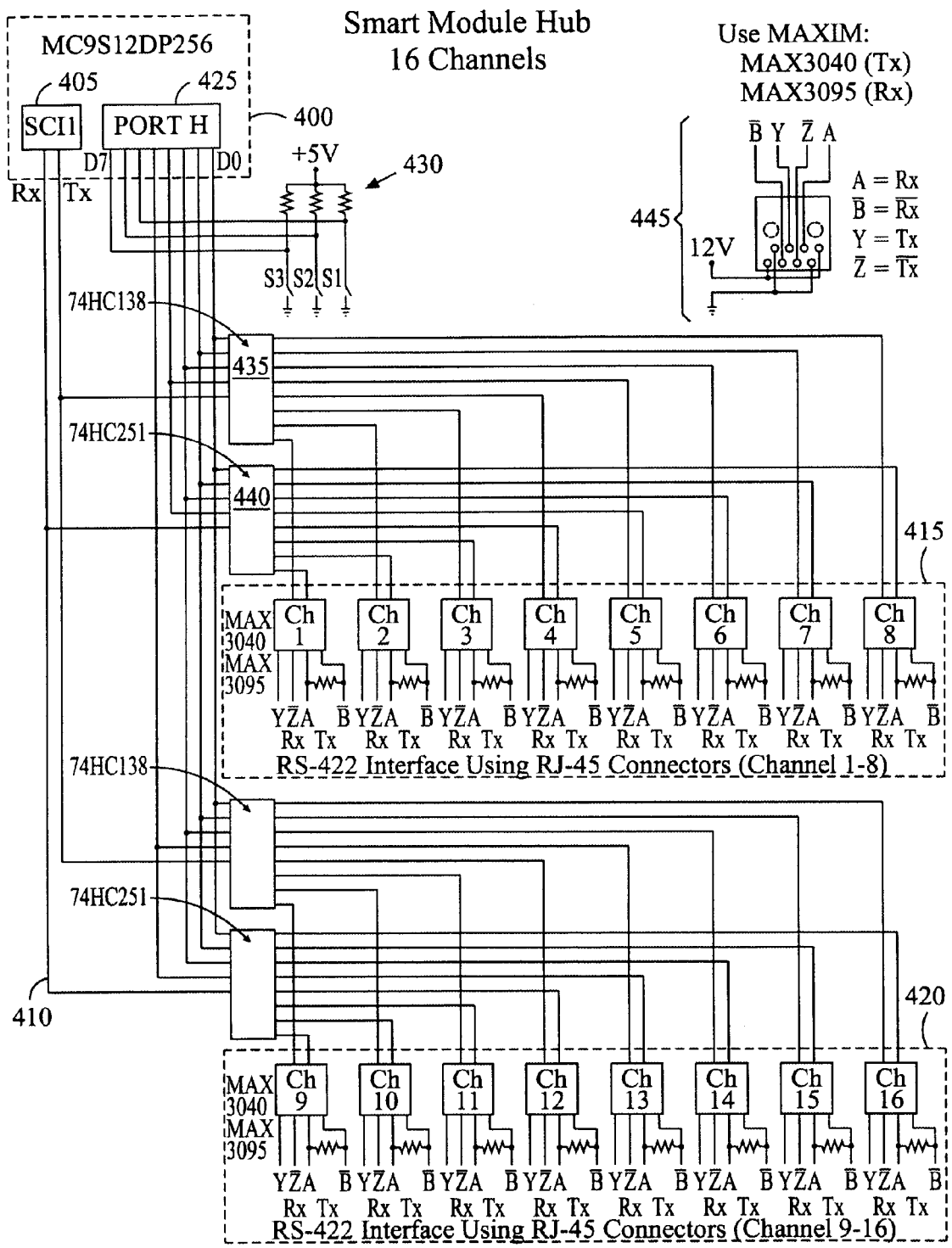
FIG. 4 illustrates an overview schematic of a smart module hub configuration according to one embodiment.

Turning now to electrical schematics for a smart module, FIG. 4 illustrates an overview schematic for a smart module hub configuration. As will be described in greater detail, a smart module may comprise a microprocessor or microcontroller 400 of the type designated MC9S12DP256 available from Motorola, which is a 16-bit device comprising on-chip peripherals such as a 16-bit CPU, 256 K bytes of Flash EEPROM, 12 K bytes of RAM, 4 K bytes of EEPROM, asynchronous serial communications interfaces, serial peripheral interfaces, A/D converters, pulse-width modulator, digital I/O lines, and five CAN compatible sub-modules (the sub-modules comprising CAN transmit and receive buffers and CAN 2.0 A/B protocol controllers). One of the serial peripheral interfaces 405 may be configured to support RS422/485 transmit and receive lines 410 for communication with work modules using the RS422/485 interface for channels 1-8 415 and the RS422/485 interface for channels 9-16 420. The microcontroller 400 comprises general purpose I/O, shown in FIG. 4 as Port H 425, which may be configured to selectively control the RS422/485 channels 1-8 415 and channels 9-16 420. For example, three of the I/O pins to Port H 425 may be configured with ID selection circuitry 430 for setting the smart module identification number. As previously described, the smart module identification number designates the configuration for the smart module within the coach electrical system thereby enabling the smart module to selectively control the devices connected to it. Other I/O pins to Port H 425, as illustrated, may be used for controlling channels 1-8 415 and channels 9-16 420. Channel selection within each group of eight channels may be accomplished using a combination of a demultiplexer 435 and multiplexer 440 as shown. The demultiplexer 435 may comprise a 3-to-8 inverting line decoder/demultiplexer of the type designated 74HC138 available from Philips Semiconductor. The multiplexer 440 may comprise an 8-input multiplexer of the type designated 74HC251 also available from Philips Semiconductors.

Circuitry for the channels 1-8 415 and channels 9-16 420 comprise RS422/485 transmitters and receivers designed for data transmission over twisted pair balanced lines such as the slew-rate limited quad transmitter designated MAX3041ESE and the quad receiver designated MAX3093EESE, both available from Maxim Integrated Products. The RS422/485 interface transmit and receive pairs for each of the channels 1-8 415 and channels 9-16 420 correspond with the RJ45 connector pin out 445 and may include associated circuitry (such as impedance matching 120 ohm termination resistors as shown).

Figure 5A:
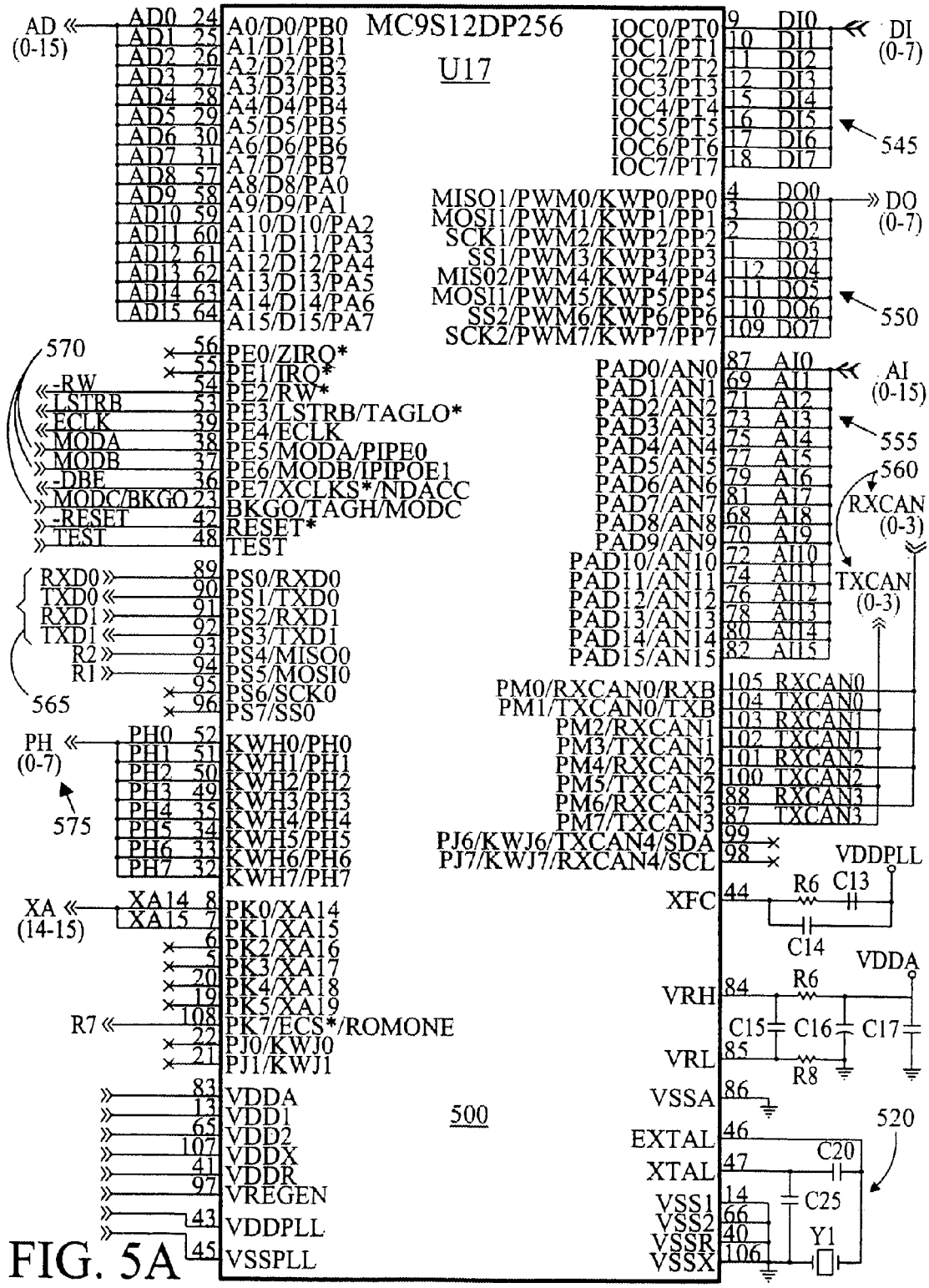
FIGS. 5A-5N comprise schematics for a smart module according to one embodiment.
Figure 5B:
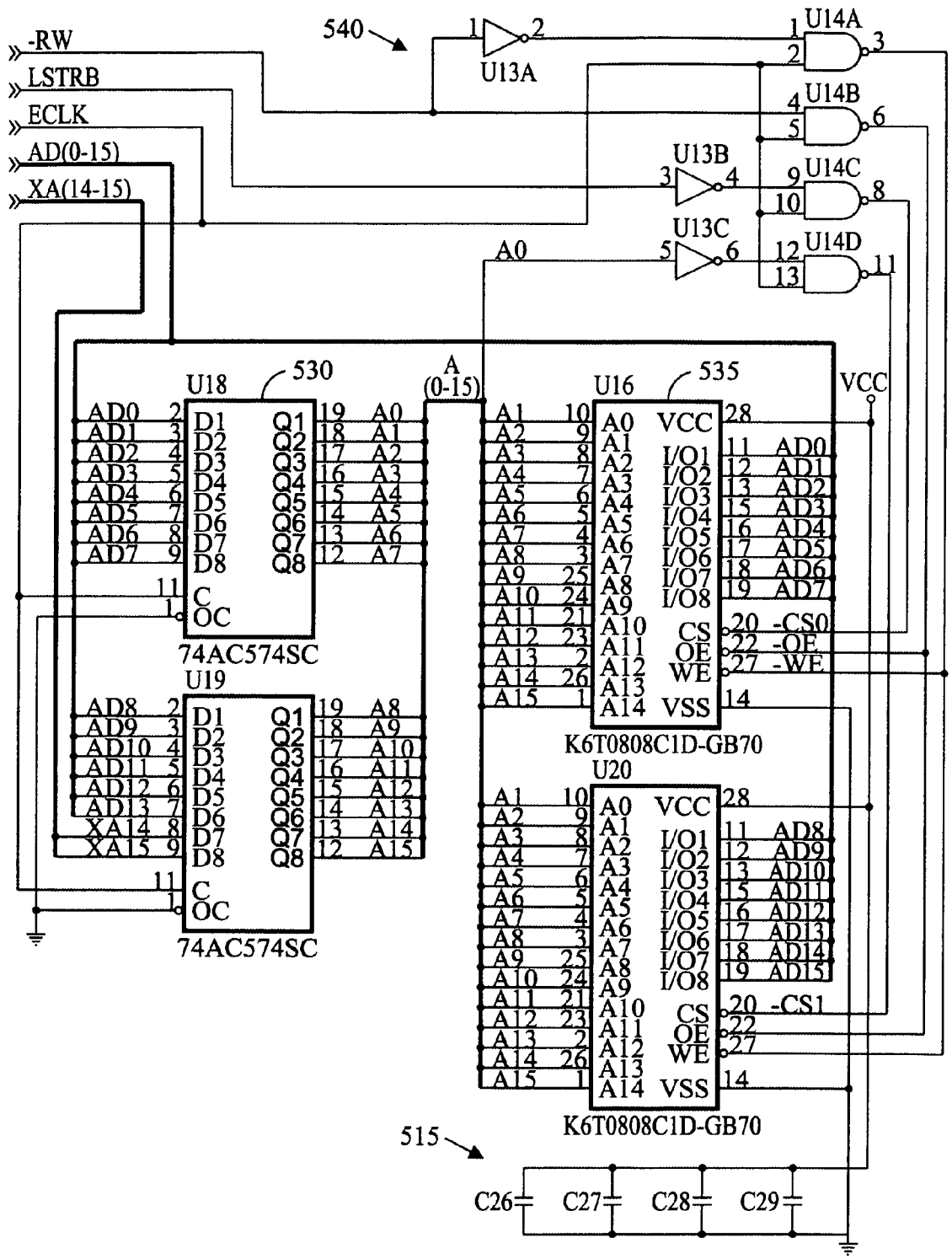
Figure 5C:
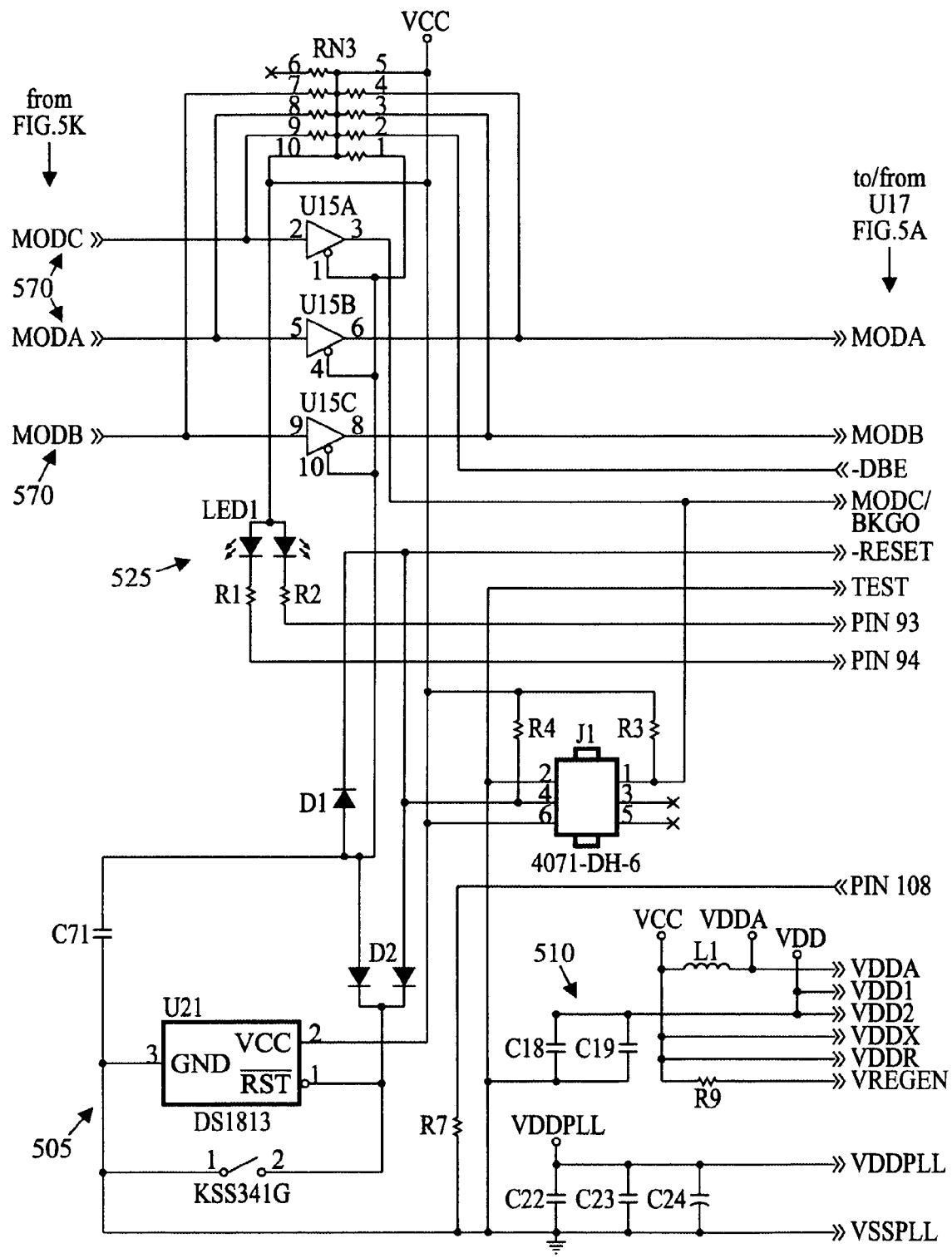
Figure 5D:
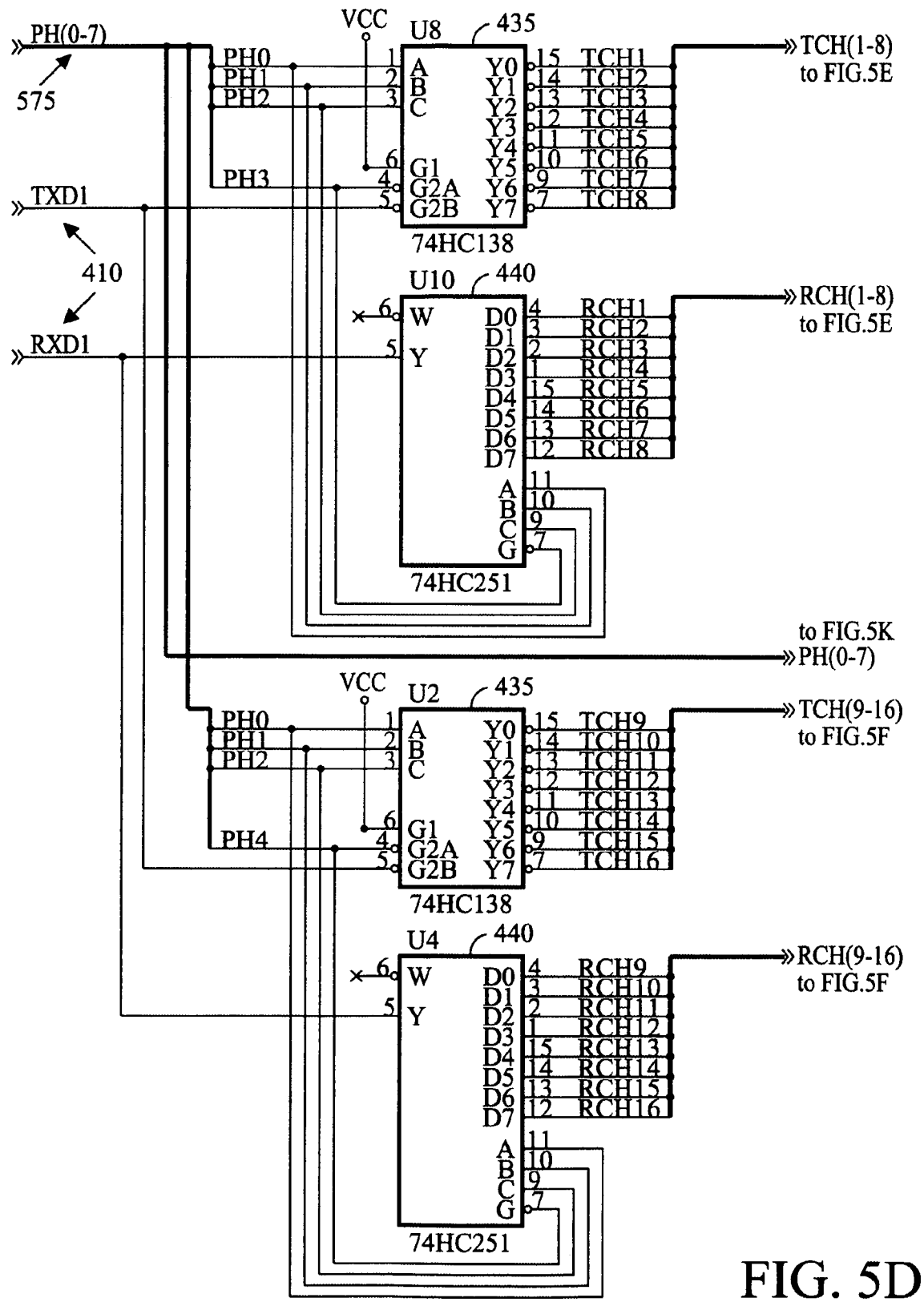
Figure 5E:
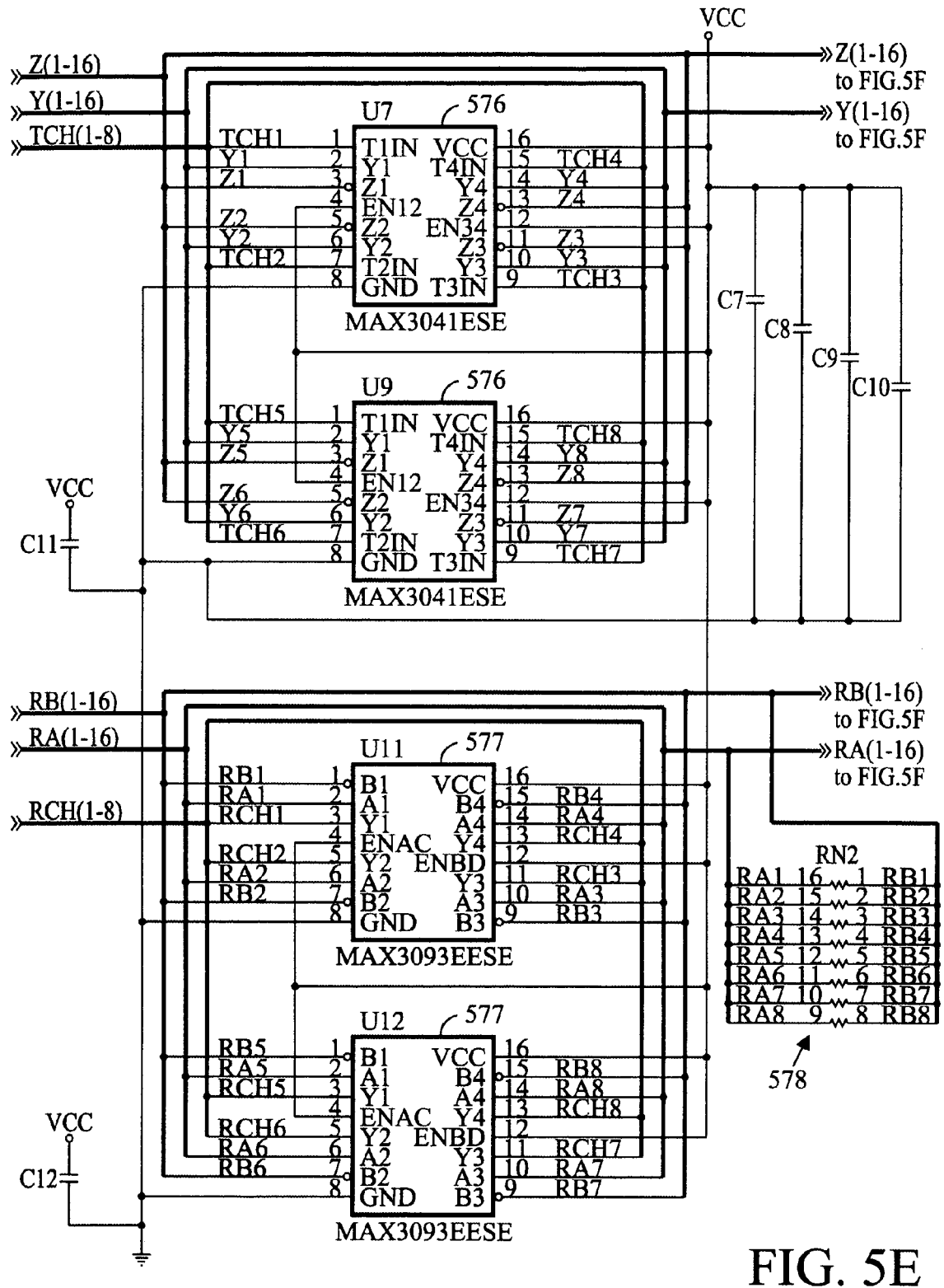
Figure 5F:
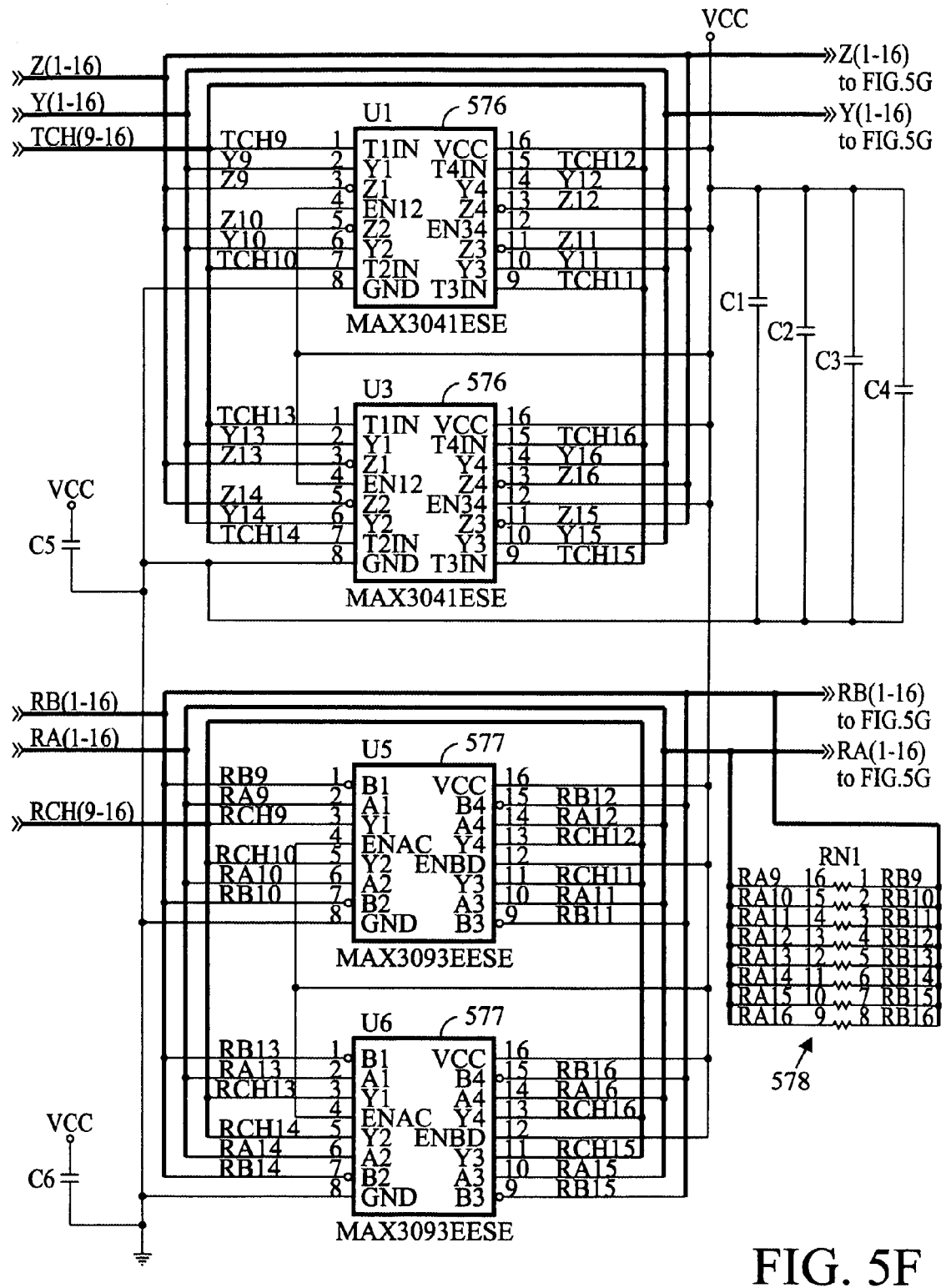
Figure 5G:
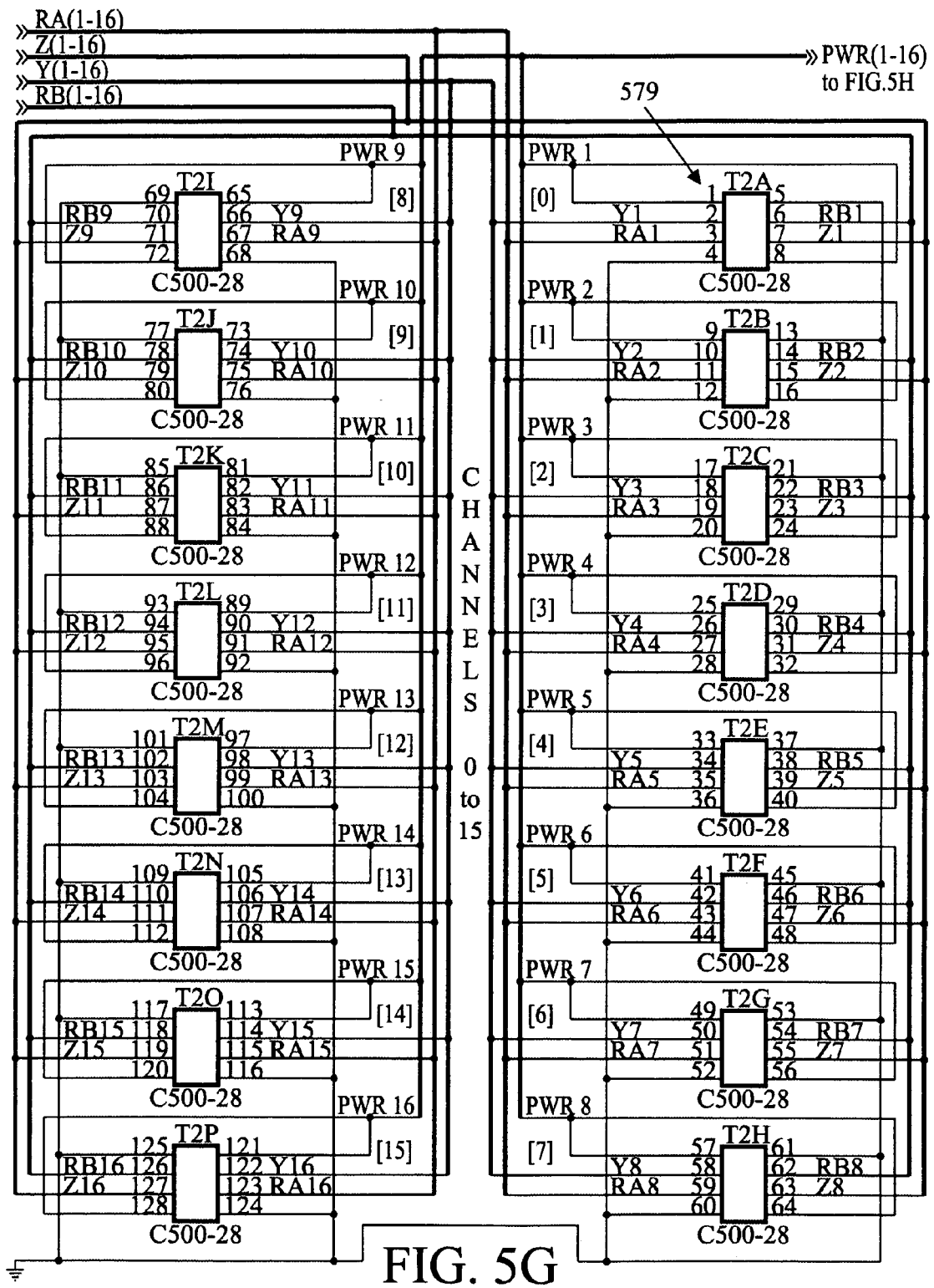
Figure 5H:
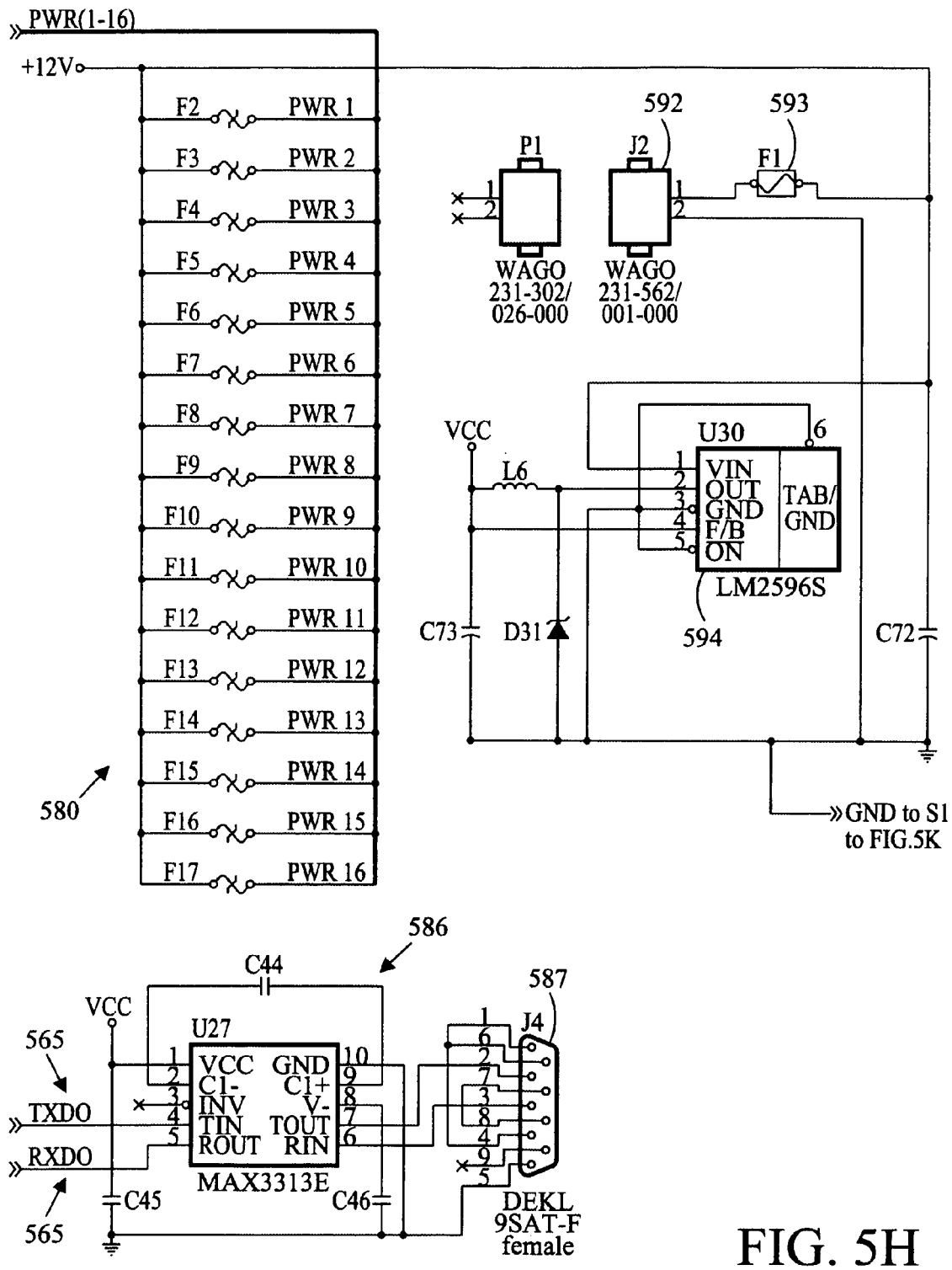
Figure 5I:
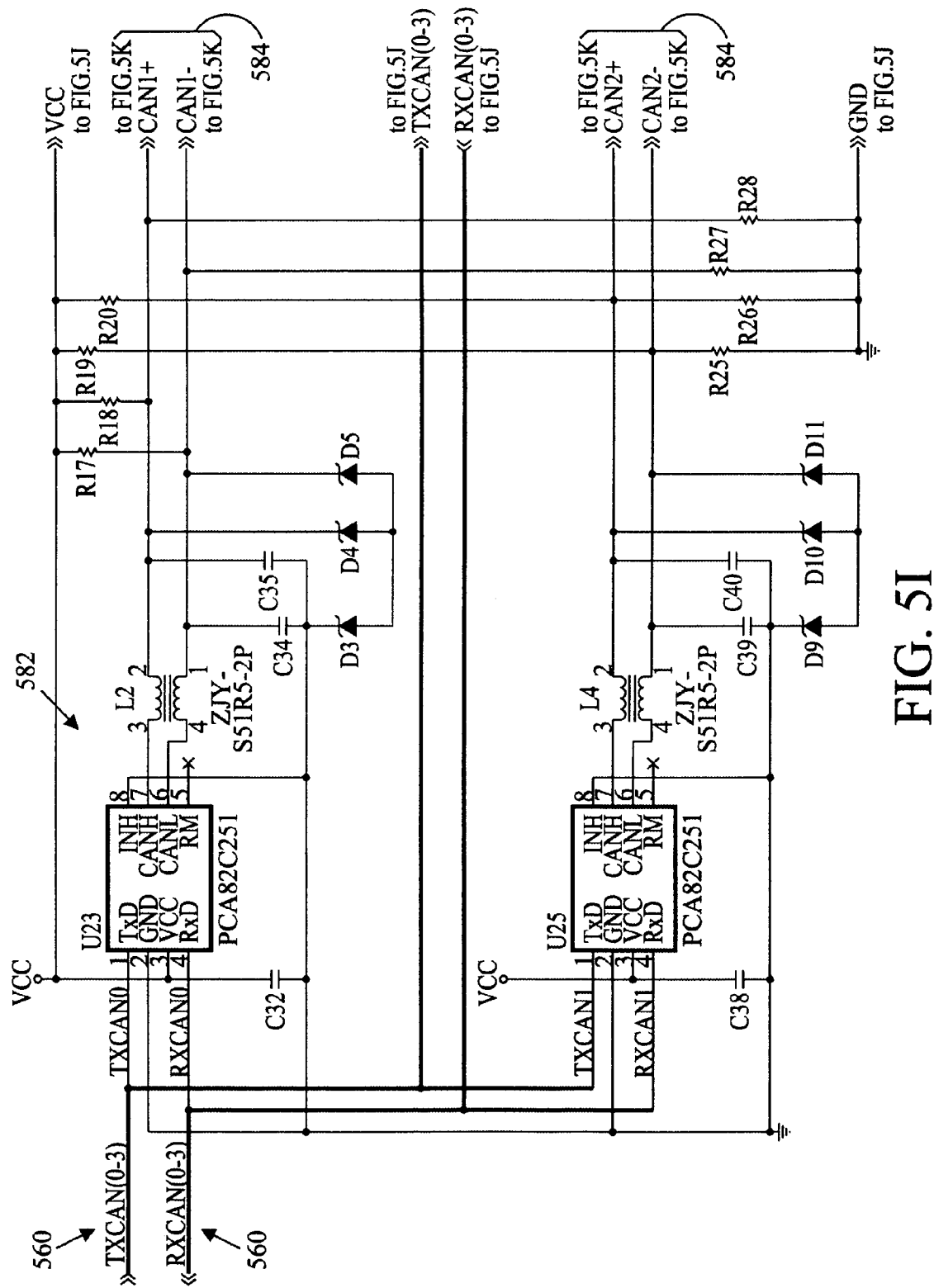
Figure 5J:
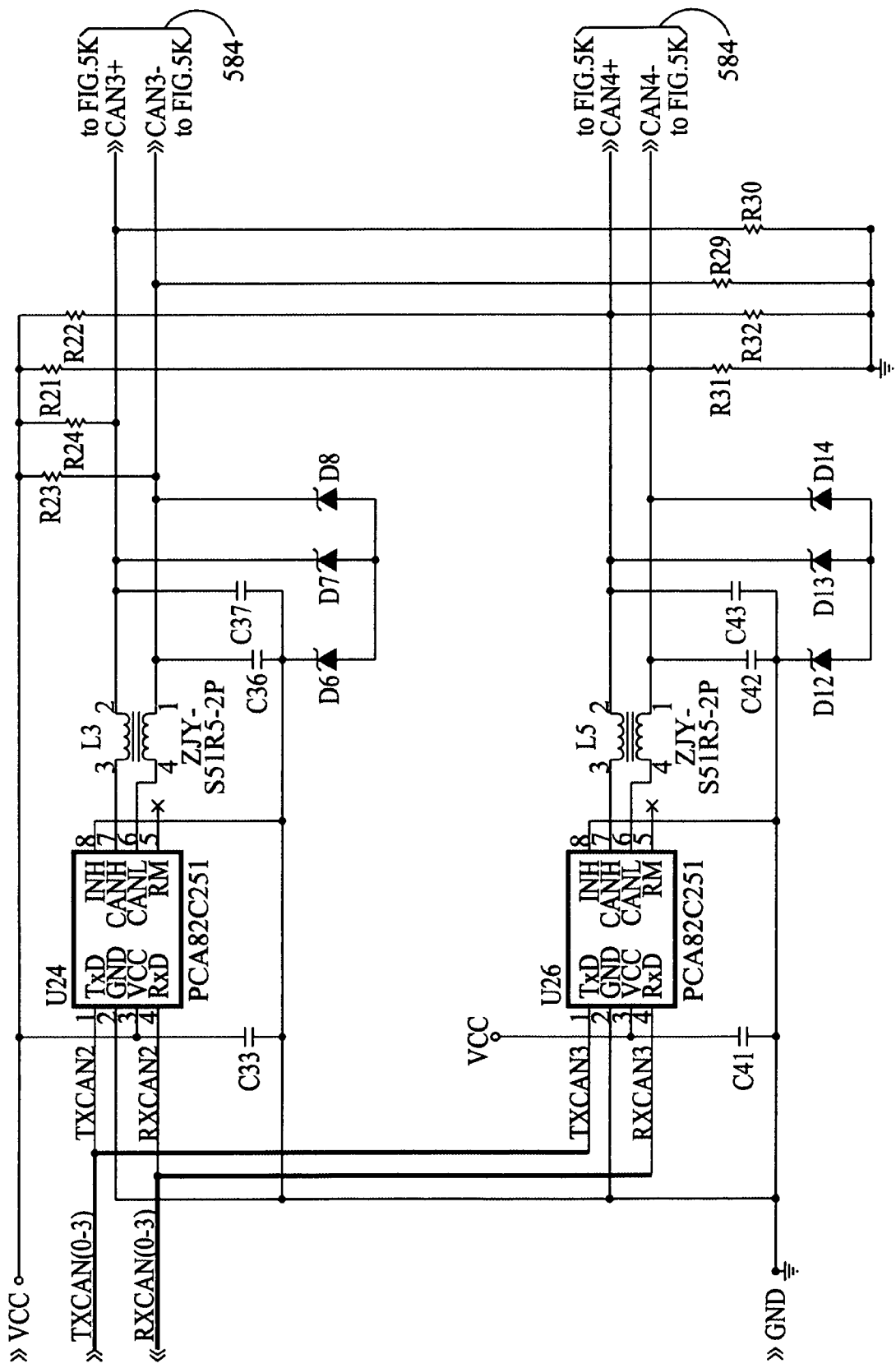
Figure 5K:
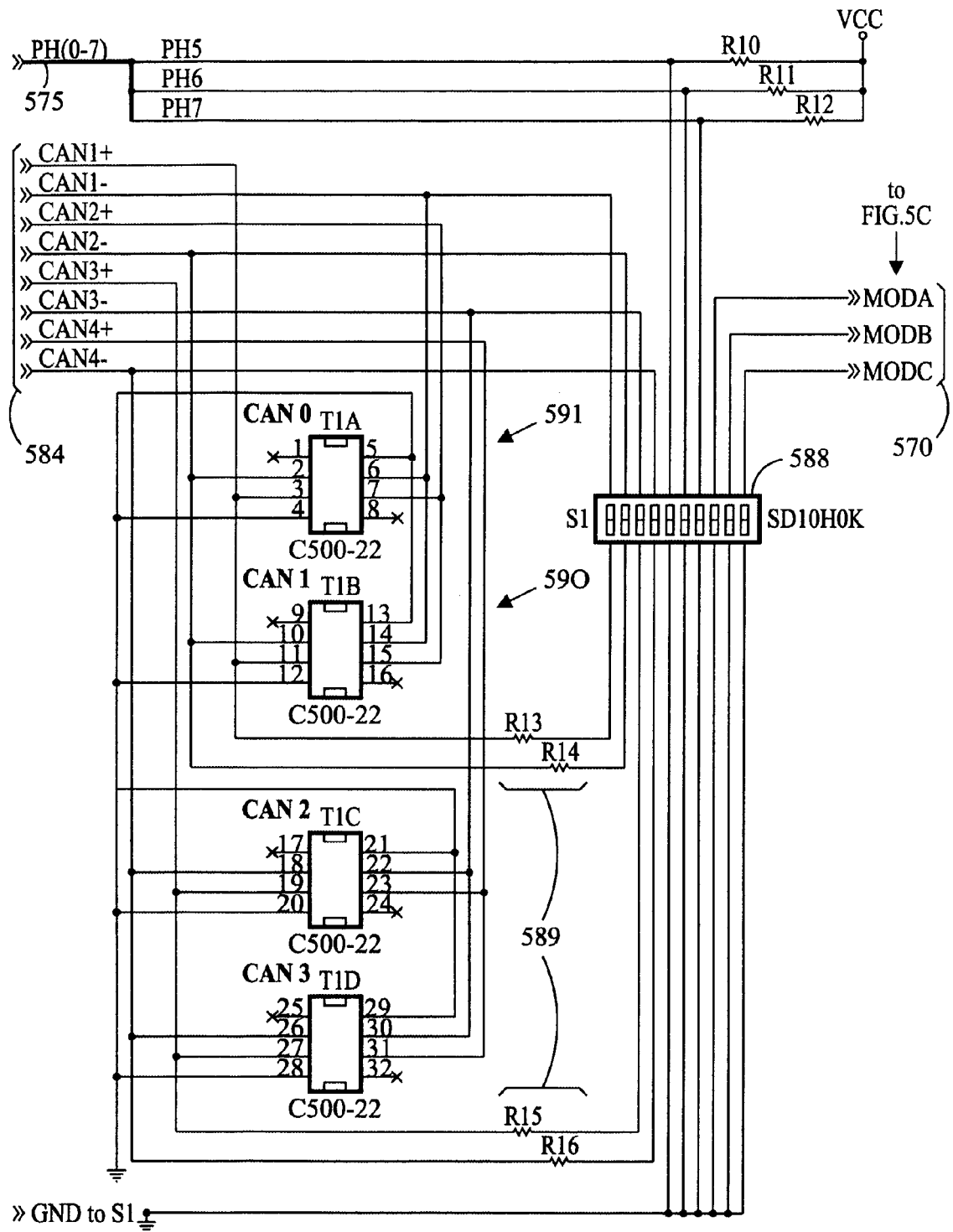
Figure 5L:
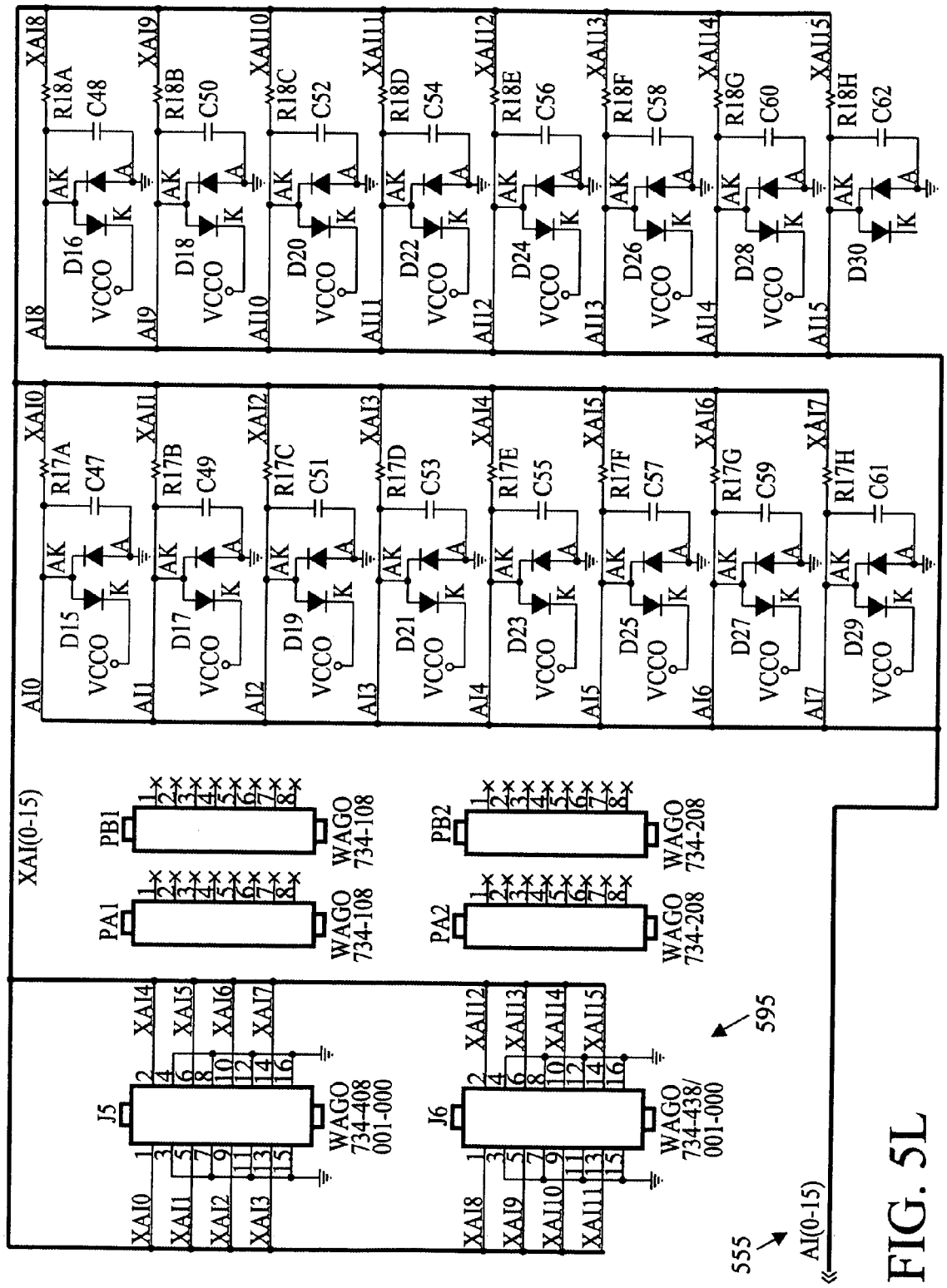
Figure 5M:
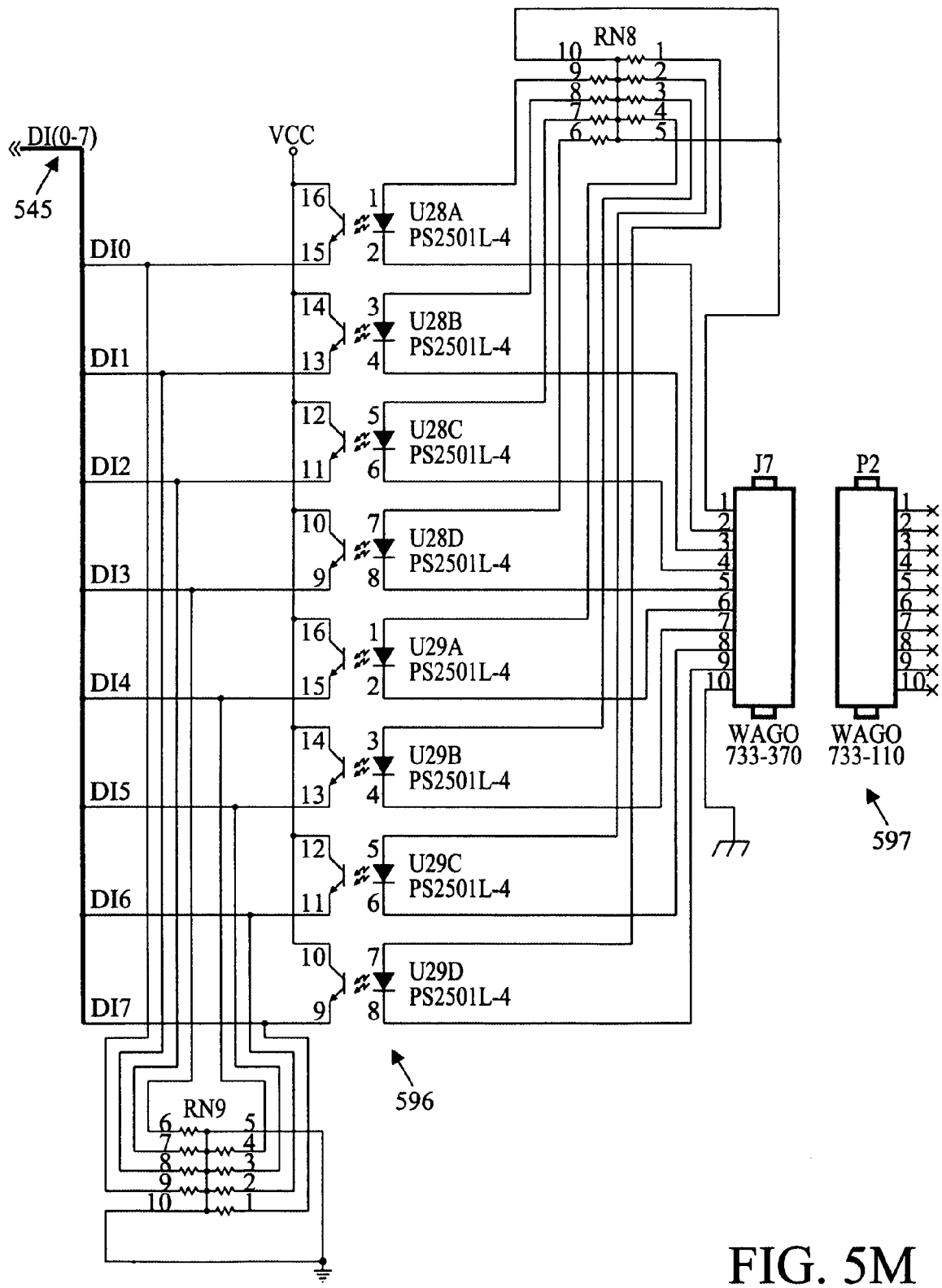
Figure 5N:
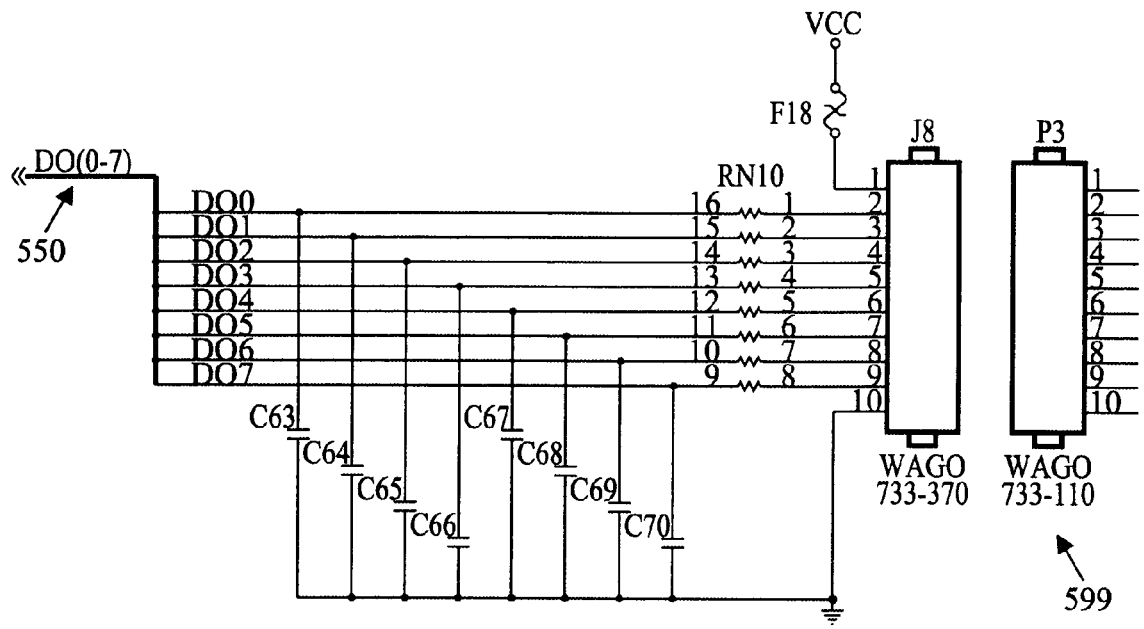
Figure 5N:
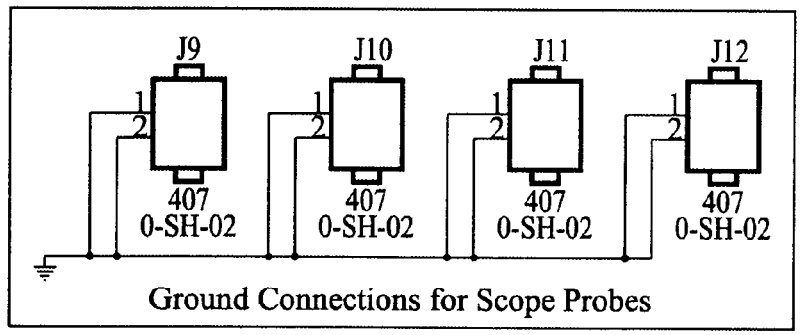
Figure 5N:
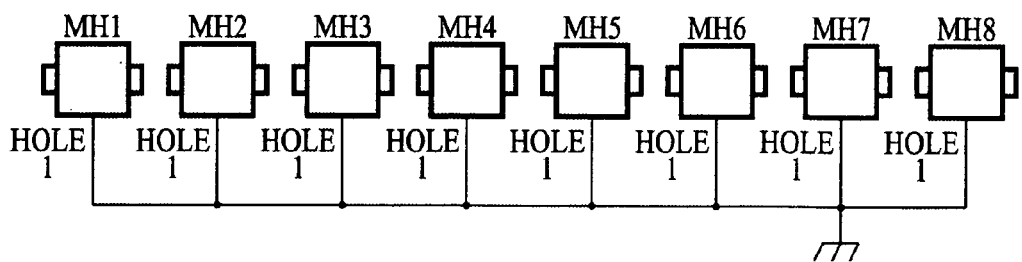

FIGS. 5A-5N comprise schematics for a smart module according to one embodiment. FIG. 5A shows a microprocessor or microcontroller 500 and associated circuitry. The microprocessor or microcontroller 500 may be of the type designated MC9S12DP256 as previously described. The associated circuitry may include a reset circuit 505 which may comprise a normally open, momentary, single pole single throw (SPST-NO) mini side-actuated switch of the type designated KSS341G available from Cannon ITT Industries in combination with automatic reset circuitry of the type designated DS1813 available from Dallas Semiconductor (which automatically resets the microcontroller after a power failure and monitors actuation of the pushbutton switch, here, the KSS341G, for external override). The associated circuitry may include LC filter circuitry 510 or other circuitry for noise isolation. Decoupling capacitors such as capacitors 515 may be used to handle transient current typically produced on power supply lines due to the high frequency content of digital signals. Other circuitry shown in FIG. 5A may be included as needed or as recommended for use with the core processor (here, the Motorola MC9S12DP256 microcontroller 500). For instance, external clock circuitry 520 is needed (external to the microcontroller chip to provide design flexibility and to provide isolation due to RF characteristics inherent with any oscillator). The external clock circuitry 520 may comprise a crystal or ceramic resonator of the type designated AS-4.0000-18-SMD (4 MHz) available from Raltron Electronics Corporation.

The status LED circuitry 525 may comprise a bi-color red-green LED device of the type designated BRPG1211 available from Stanley Electric Company, Ltd. Flip-flop circuitry 530, SRAM circuitry 535, and gate circuitry 540, as illustrated, comprise one of several possible external bus designs recommended for use with the Motorola MC9S12DP256 microcontroller 500. The flip-flop circuitry 530 may comprise an octal D-type flip-flop of the type designated 74AC574SC available from Fairchild Semiconductor, and the SRAM circuitry 535 may comprise a 32K×8-bit low power CMOS static RAM of the type designated K6T0808C1D-GB70 available from Samsung Electronics Company, Ltd.

FIG. 5A also illustrates various inputs and outputs associated with circuitry for a smart module. The microcontroller 500, as configured, provides eight digital inputs 545, eight digital outputs 550, sixteen analog inputs 555, four pairs of CAN transmit/receive lines 560, two pairs of serial communication interface transmit/receive lines 565 (one pair configured with circuitry supporting an RS232 interface and the other pair configured with circuitry forming a network hub comprising sixteen RS422/485 channels). The microcontroller 500 is also configured to provide mode pins 570. As illustrated, mode pins 570 comprise three pins, MODA, MODB, and MODC. The Motorola MC9S12DP256 microcontroller 500 supports eight different mode settings to provide configurations directed to one of three basic types— emulation (non-production), special functions (such as background debugging mode), and normal (production) system operation. Each of the eight modes determines the operating configuration of the microcontroller 500, and each configuration has an associated default memory map and external bus configuration. The eight mode settings are defined within the recommendations and applications notes associated with the Motorola MC9S12DP256 microcontroller 500 and, thus, will not be described in comprehensive detail.

Finally, with respect to FIG. 5A, the microcontroller 500 provides eight Port H pins (as shown connected to Port H lines 575) which may be configured as previously described and illustrated in FIG. 4.

FIGS. 5B-5C comprise electrical schematics for the RS422/485 interface circuitry described previously in FIG. 4. FIG. 5B illustrates RS422/485 interface circuitry for channels 1-8 415. Circuitry for data transmission on channels 1-8 415 comprises two slew-rate limited quad transmitters 576 of the type MAX3041ESE (previously mentioned), a demultiplexer 435 and interconnections with Port H lines 575 and RS422/485 transmit line 410 as shown. Circuitry for receiving data on channels 1-8 415 comprises two quad receivers 577 of the type MAX3093EESE (also previously mentioned), a multiplexer 440 and interconnections with Port H lines 575 and RS422/485 receive line 410 as shown. Further, the circuitry for receiving data on channels 1-8 415 may comprise impedance matching terminating resistors 578 (120 ohm resistors) as recommended for RS422/485 networks.

FIG. 5C illustrates RS422/485 interface circuitry for channels 9-16 420. Circuitry for data transmission on channels 9-16 420 comprises two quad transmitters 576, a demultiplexer 435 and interconnections with Port H lines 575 and RS422/485 transmit line 410 as shown. Circuitry for receiving data on channels 9-16 420 comprises two quad receivers 577, a multiplexer 440 and interconnections with Port H lines 575 and RS422/485 receive line 410 as shown. As in FIG. 5B, the circuitry for receiving data on channels 9-16 420 may comprise impedance matching terminating resistors 578.

FIG. 5D illustrates circuitry for the sixteen work module connections 579. Each of the work module connectors 579 comprises standard RJ45 modular receptacles with connector pin out 445 as shown in FIG. 4. Also illustrated in FIG. 5D is the circuitry for delivering 12 v power to each work module connection 579. The power supply line to each of the work module connections 579 includes a resettable fuse for over-current protection such as the surface mount 1.5A rated SMD150-2018 available from Raychem Corporation.

FIG. 5E illustrates exemplary CAN bus interface circuitry for a smart module. This circuitry provides the interface between the CAN protocol controller (here, the Motorola microcontroller 500) and the physical CAN busses. Each of the four pairs of CAN transmit/receive lines 560 from the microcontroller 500 may be connected with CAN transceiver circuitry 582 which provides differential transmit capability to each of four pairs of CAN bus lines 584 and differential receive capability to the CAN controller (microcontroller 500). The CAN transceiver circuitry 582 may comprise a transceiver of the type designated PCA82C251 available from Phillips Semiconductors. The PCA82C251 is a CAN transceiver for 24 v systems designed for applications up to 1 Mbaud in motor vehicles such as trucks and busses.

The CAN transceiver circuitry 582 may further comprise EMC filter components such as common-mode choke coils for the CAN bus signal lines of the type ZJYS51R5-2P available from TDK. The ZJYS51R5-2P is a high inductance common-mode filter designed for use with CAN bus systems. The CAN transceiver circuitry 582 may also include decoupling capacitors, pullup resistors, and transient voltage suppressors of the type designated SMBJ8.5A and SMBJ16AT available from DC Components Company, Ltd.

Also illustrated in FIG. 5E is an RS232 interface 586 which may comprise an RS232 compatible transceiver of the type MAX3313E available from Maxim Integrated Products. The MAX3313E is a low-power, 5 v EIA/TIA-232-compatible transceiver with one transmitter and one receiver. The RS232 interface 586 may comprise various decoupling capacitors as recommended for use with the transceiver as well as a standard 9-pin RS232 connector 587. The RS232 interface 586 allows a laptop computer or other device to communicate with the microcontroller 500 using the serial communication interface transmit/receive lines 565.

FIG. 5F illustrates circuitry for internal DIP switches 588 which may be of the type SD10H0K, a low-profile 10-position DIP switch available from Cannon ITT Industries. The first four switch positions allow CAN termination resistors 589 to be selectively connected across each of the CAN bus lines 584. For example, the first switch may set to the ON position thereby connecting one of the CAN termination resistors 589 across both positive and negative transmission lines of one of the CAN bus lines 584. Setting all four of the first four switch positions to the ON position thereby connects each one of the four CAN termination resistors 589 to a corresponding pair of CAN bus lines 584 as shown. The switch positions five, six, and seven, as described in FIGS. 3 and 4, may be used with Port H lines 575 to select the smart module identification number. The switch positions eight, nine, and ten, may be used, as described in FIG. 5A, with mode pins 570.

Exemplary default DIP switch settings may comprise the following:

| Switch Number | Assignment ON = 1, OFF = 0 | Function |
| --- | --- | --- |
| 1 | ON | CAN termination resistor turned on |
| 2 | ON | CAN termination resistor turned on |
| 3 | ON | CAN termination resistor turned on |
| 4 | ON | CAN termination resistor turned on |
| 5 | ON | Smart module ID bit 0 set to 1 |
| 6 | ON | Smart module ID bit 1 set to 1 |
| 7 | ON | Smart module ID bit 2 set to 1 |

-continued

| Switch Number | Assignment ON = 1, OFF = 0 | Function |
|---|---|---|
| 8 | ON | Startup with MODA pin low |
| 9 | ON | Startup with MODB pin low |
| 10 | OFF | Startup with MODC pin high = Background Debugging Mode (BDM) turned off |

FIG. 5F illustrates the circuitry for the CAN port connections of the smart module. The CAN port connections 590 and 591 may be configured identically, each supporting the same two CAN bus lines of the four CAN bus lines 584 so that two CAN bus cables connected to these CAN port connections become electrically connected. For example, referring to FIG. 3, consider that the CAN port connections 590 and 591 are configured to operate as the CAN port connections 375 and 380. The two CAN busses in the CAN bus cable 345 are electrically connected to the corresponding two CAN busses in the CAN bus cable 355 through the circuitry shown in FIG. 5F for the CAN port connections 590 and 591. As a result, data transmission across the two CAN busses would be unaffected by a power failure in the smart module 315.

FIG. 5F also illustrates circuitry for the power interface of the smart module. The circuitry may comprise a power connector 592 of the type WAGO 231-562/001-000 available from Wago Innovative Connections, an overcurrent fuse 593 such as a 15A fuse of the type Littelfuse 153007 available from Littelfuse, Inc. and a step-down voltage regulator 594 of the type LM2596S available from National Semiconductor Corporation along with an external inductor and other circuitry recommended for use with the step-down regulator.

FIG. 5G illustrates analog input interface circuitry for the sixteen analog inputs 555. A plurality of diodes (as shown) provide clamping protection for the input lines and pullups are provided by resistors. Decoupling capacitors may also be used. The analog input connectors 595 that may be used for connecting, for example, sensor outputs, may comprise WAGO 734-438/001-000, WAGO 734-408/001-000, WAGO 734-208, and WAGO 734-108 connectors, as shown, all available from Wago Innovative Connections.

FIG. 5H illustrates digital input interface circuitry for the eight digital inputs 545. The circuitry may comprise optocoupler circuitry 596 to isolate the eight digital inputs 545 from the digital input connectors 597. The optocoupler circuitry 596 may include the PS2501L-4 optocoupler available from NEC and resistors as recommended for use with the PS2501L-4 devices. The PS2501L-4 devices are optically coupled isolators containing a GaAs LED and an NPN Si phototransistor and provide isolation to the microcontroller 500 from common-mode voltages, ground loops, and voltage spikes. The digital input connectors 597 may be of the type WAGO 733-370 and WAGO 733-110 available from Wago Innovative Connections.

FIG. 5I illustrates digital output interface circuitry for the eight digital outputs 550. The digital output interface circuitry may comprise decoupling capacitors. The digital output connectors 599 may be of the same type as the digital input connectors 597.

Switch Group Module

Figure 6:
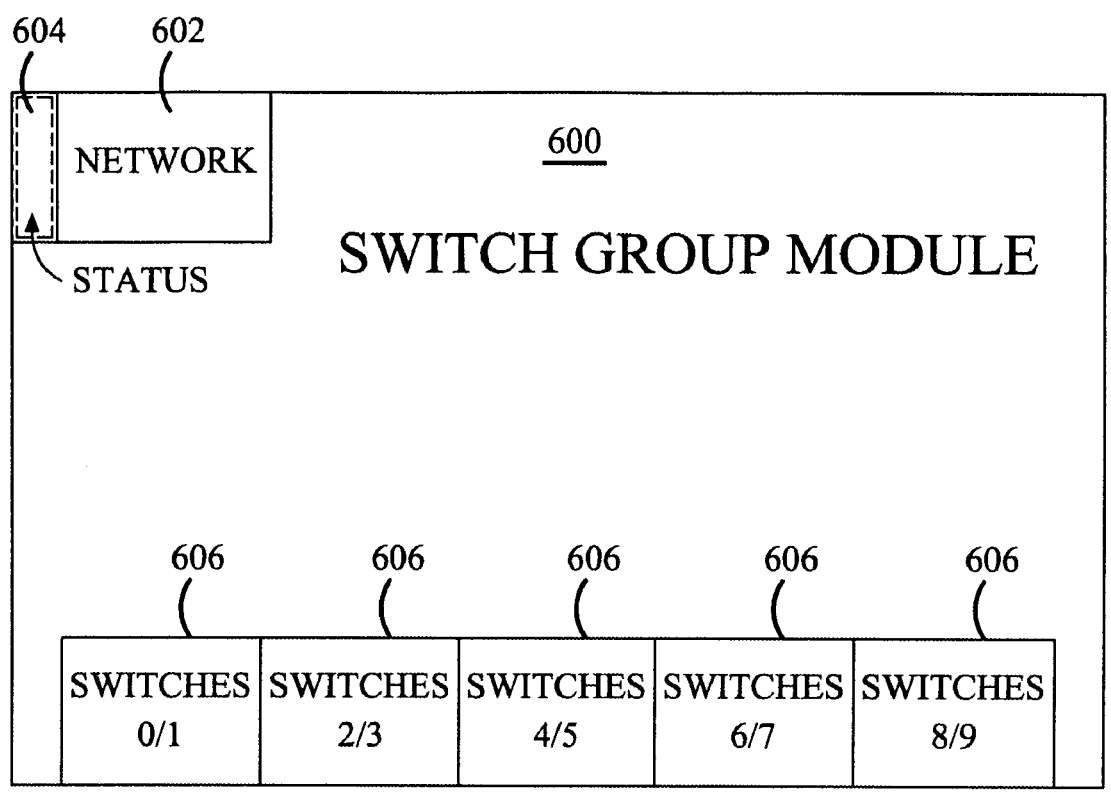
FIG. 6 illustrates an exemplary switch group module.

FIG. 6 illustrates an exemplary switch group module 600. The switch module may include a network connection 602 for connection to the smart module, and a light emitting diode 604 to indicate the current status of the device. The network connection 602 is preferably an RS422, 9,600 baud, full duplex connection interconnected using a green cable. By using a light emitting diode, such as green for operational, the status of the device may be quickly checked. A set of switches 606 may be included for changing the output of lighting or other devices. The switches 606 may comprise keypad switches for changing switch positions (open or closed) within the switch group module 600, or the switches 606 may comprise connections for receiving external switch inputs. As will be described below, the switches 606 may comprise both keypad switches and the associated circuitry and connections for receiving external switch inputs. The switches 606 as shown in FIG. 6 comprise ten individual switches, although the number may be more or less.

As described previously, each work module of a particular type may be replaced with another work module of that type without programming the module or reconfiguring the module to function in unique ways. For example, each switch group module 600 may be replaced with another switch group module 600 simply by reconnecting the network connection 602 and switches 606, thus saving time for installation.

Figure 7:
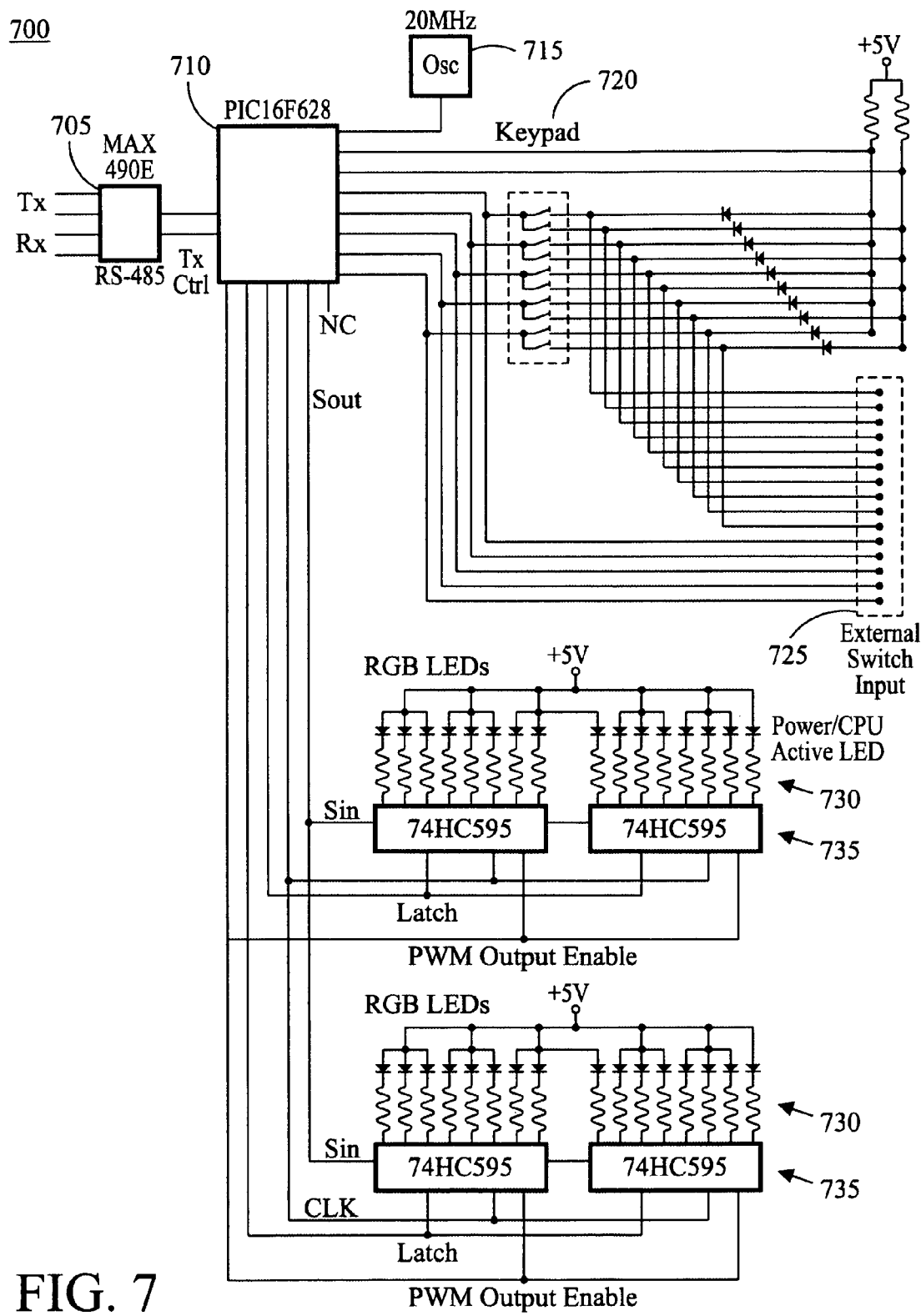
FIG. 7 illustrates an overview schematic of a switch group module according to one embodiment.

FIG. 7 illustrates an overview schematic of a switch group module 700 according to one embodiment. As will be described in greater detail, the switch group module 700 may comprise a transceiver 705 of the type designated MAX490E available from Maxim Integrated Products. The MAX490E is a low-power transceiver for RS422/485 communications and is used for communicating with a smart module connected to the network connection 602 and a microcontroller 710 within the switch group module 700. The microcontroller 710 may be of the type PIC16F628 available from Microchip Technology, Inc., which is an 8-bit CMOS Flash-based microcontroller, and may be clocked with an external oscillator 715 such as the 20 MHz surface mount quart crystal designated SG-216P available from Epson. Keypad input circuitry 720 and external switch input circuitry 725 are shown interconnected with the microcontroller 710. The keypad input circuitry 720 and external switch input circuitry 725 shown in FIG. 7 comprise ten switch inputs corresponding with the ten switches 606 shown in FIG. 6. The microcontroller 710 then drives LED's 730 for indicating the status of the ten switches as well as the operating status of the microcontroller 710 itself. As shown, the LED's 730 may comprise ten three-color (red-green-blue or RGB) LED's for indicating the switch status of each of the switches inputs and a single color LED for indicating the operating status of the microcontroller 710. The switch group module 700 may comprise output latch equipped shift registers 735 of the type 74HC595 available from Philips Semiconductors. The 74HC595 is an 8-bit serial-in, serial or parallel-out shift register with output latches.

Figure 8A:
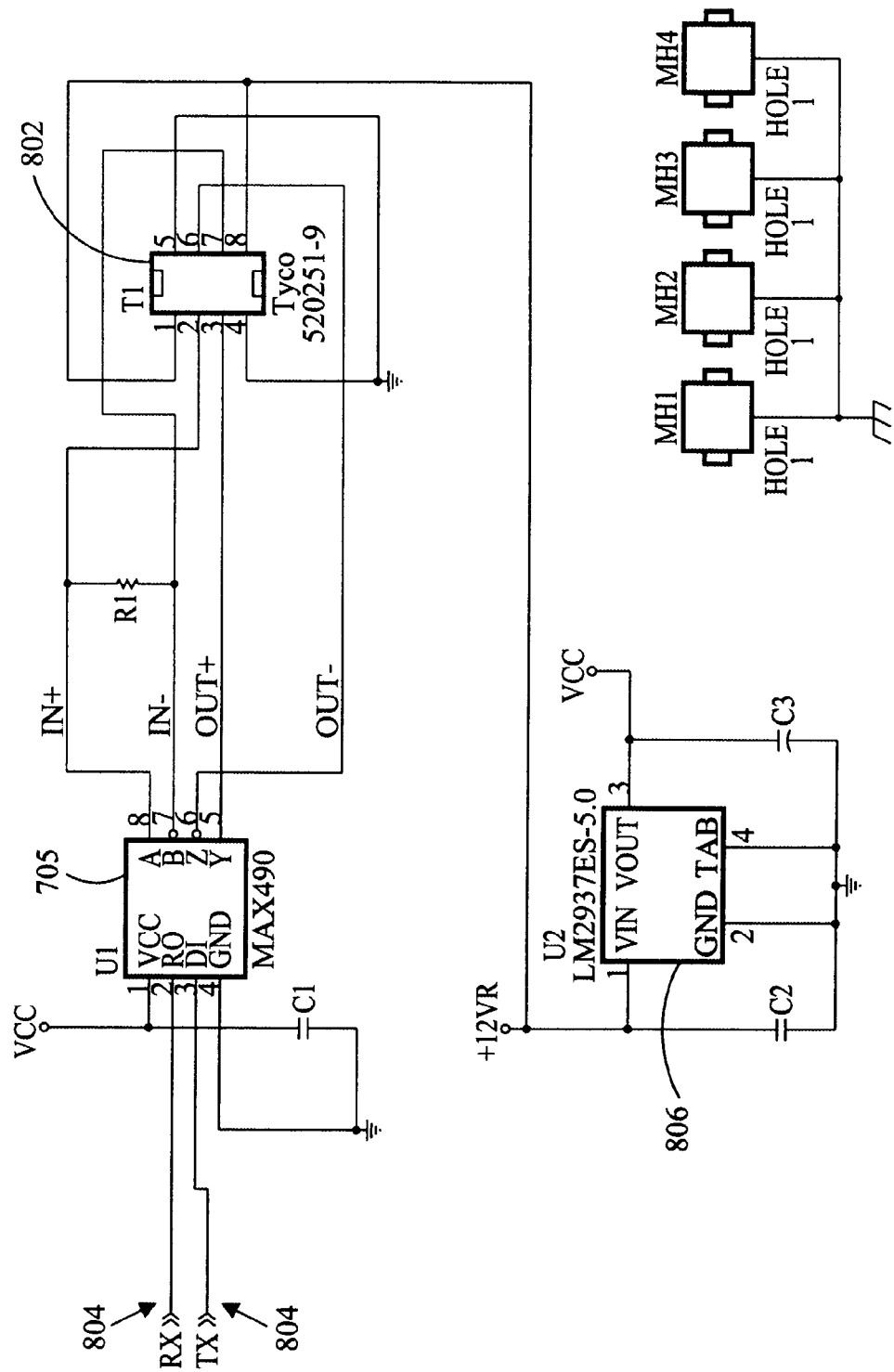

FIGS. 8A-8I comprise schematics for a switch group module according to one embodiment. FIG. 8A shows a modular RJ45 type connector 802 for the network connection 602, the transceiver 705, and transmit and receive lines 804 (leading to the microcontroller 700), and power supply circuitry 806. The power supply circuitry 806 may comprise connections with 12 v power and ground and incorporate decoupling capacitors as recommended for designs involving transceiver 705 and microcontroller 700.

Figure 8B:
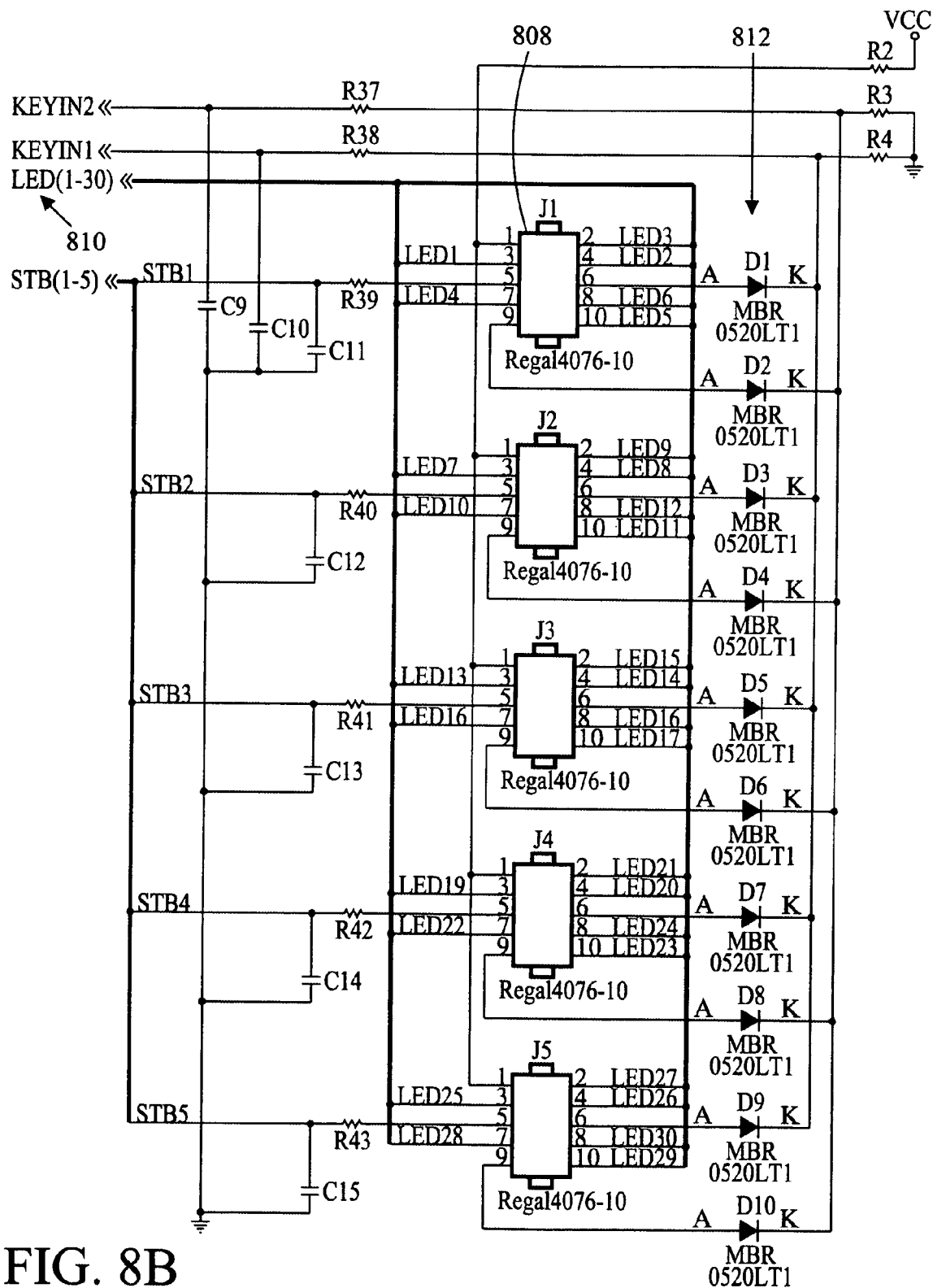

FIG. 8B illustrates circuitry for connecting the ten three-color LED's (or thirty LED positions). The circuitry shown includes five interconnects 808, each of the type 4076-10 available from Regal Electronics, Inc. The 4076-10 is a ten-position (10 contacts) box header. The multiconductor LED bus 810 connects with each of the (thirty) contact positions provided by the five interconnects 808. Also shown are Schottky power rectifiers 812 of the type MBR0520LT1 available from Semiconductor Components Industries, LLC.

Figure 8C:
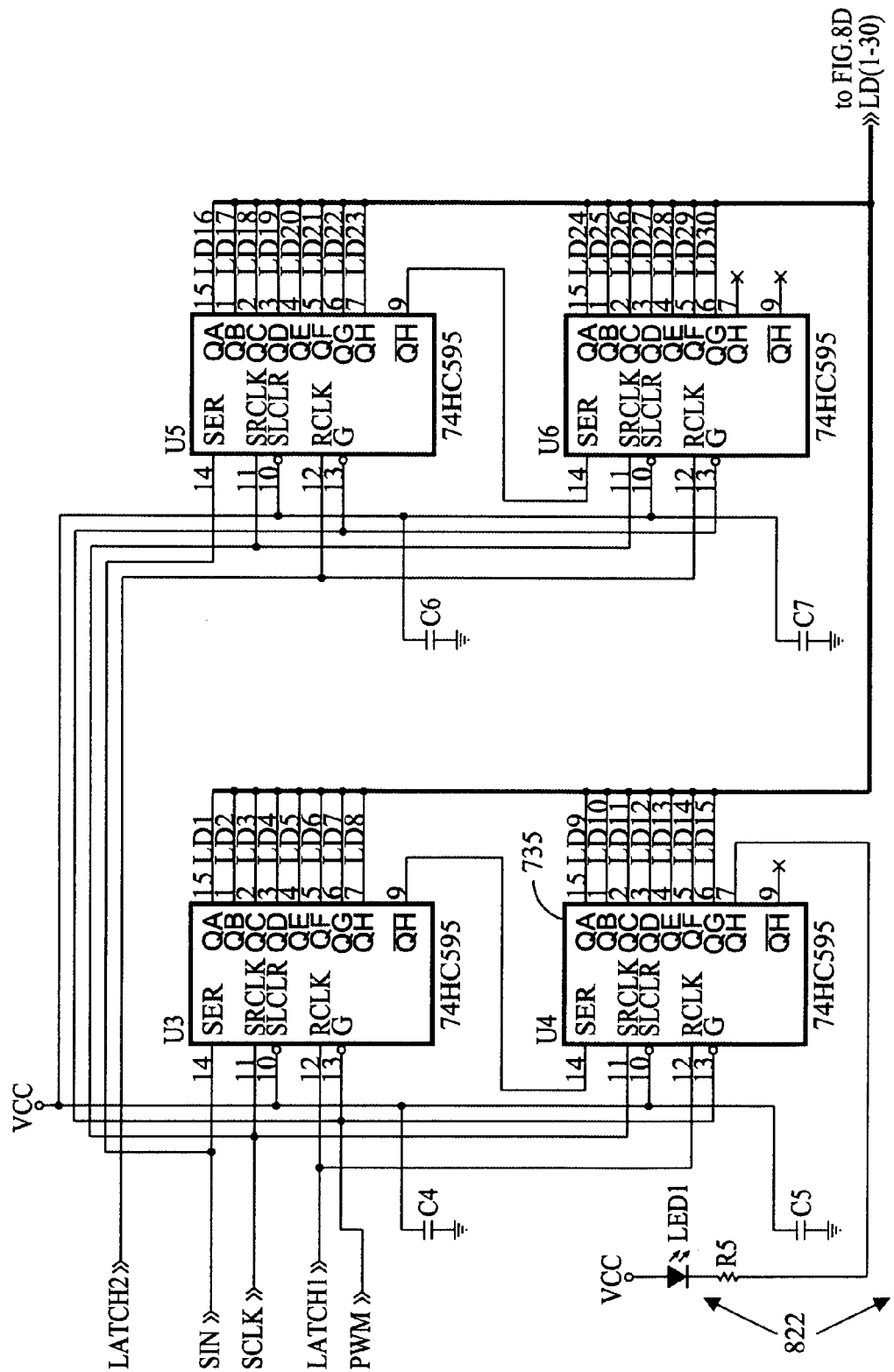

FIG. 8C illustrates a portion of the LED registers 820, circuitry associated with the shift registers 735, and the single color LED 822 for indicating the operating status of the microcontroller 710.

Figure 8D:
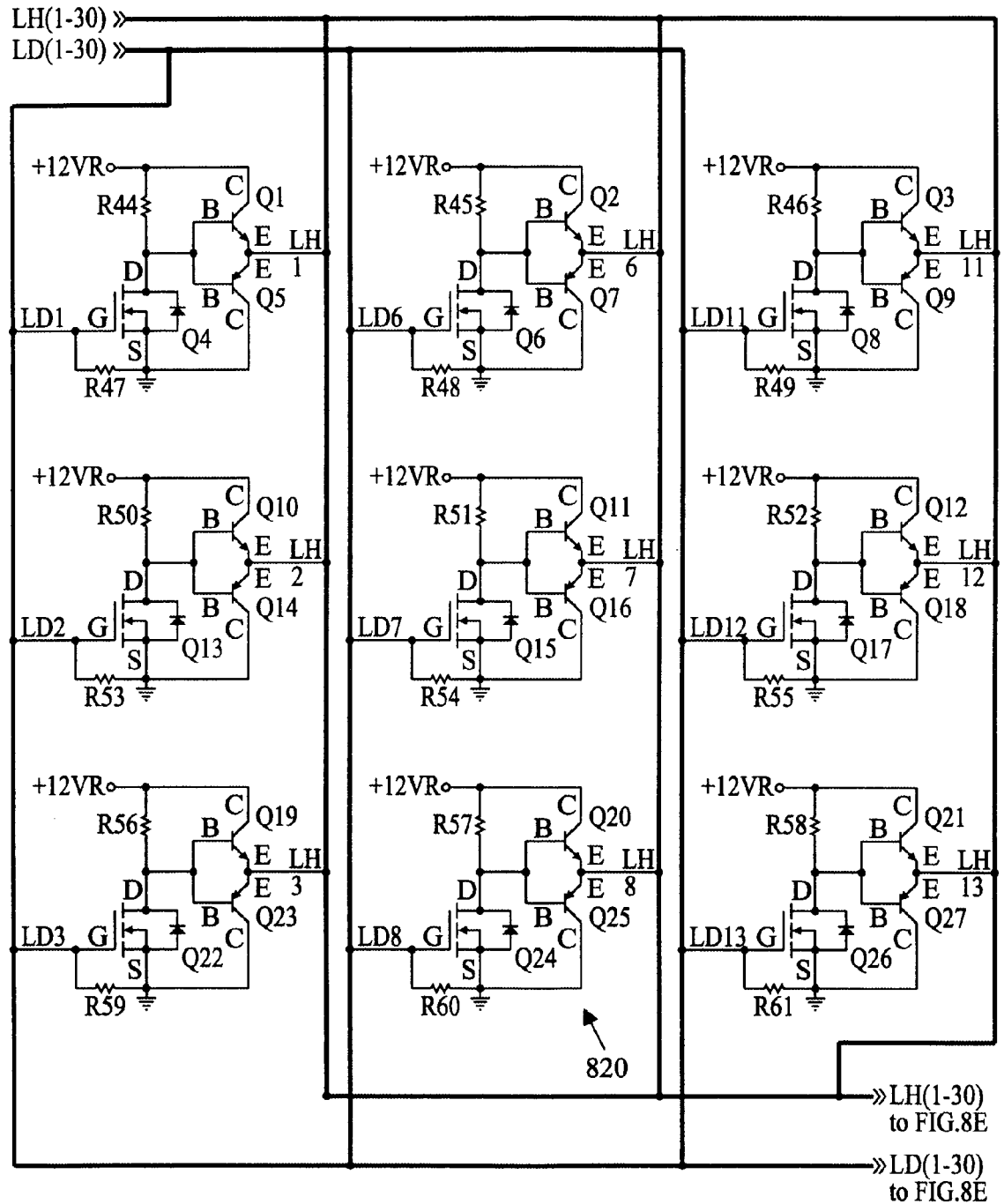

FIG. 8D illustrates the remaining portion of the LED registers 820 and resistors 824 used with the (thirty) multi-color LED's shown with LED's 730 in FIG. 7.

Figure 8E:
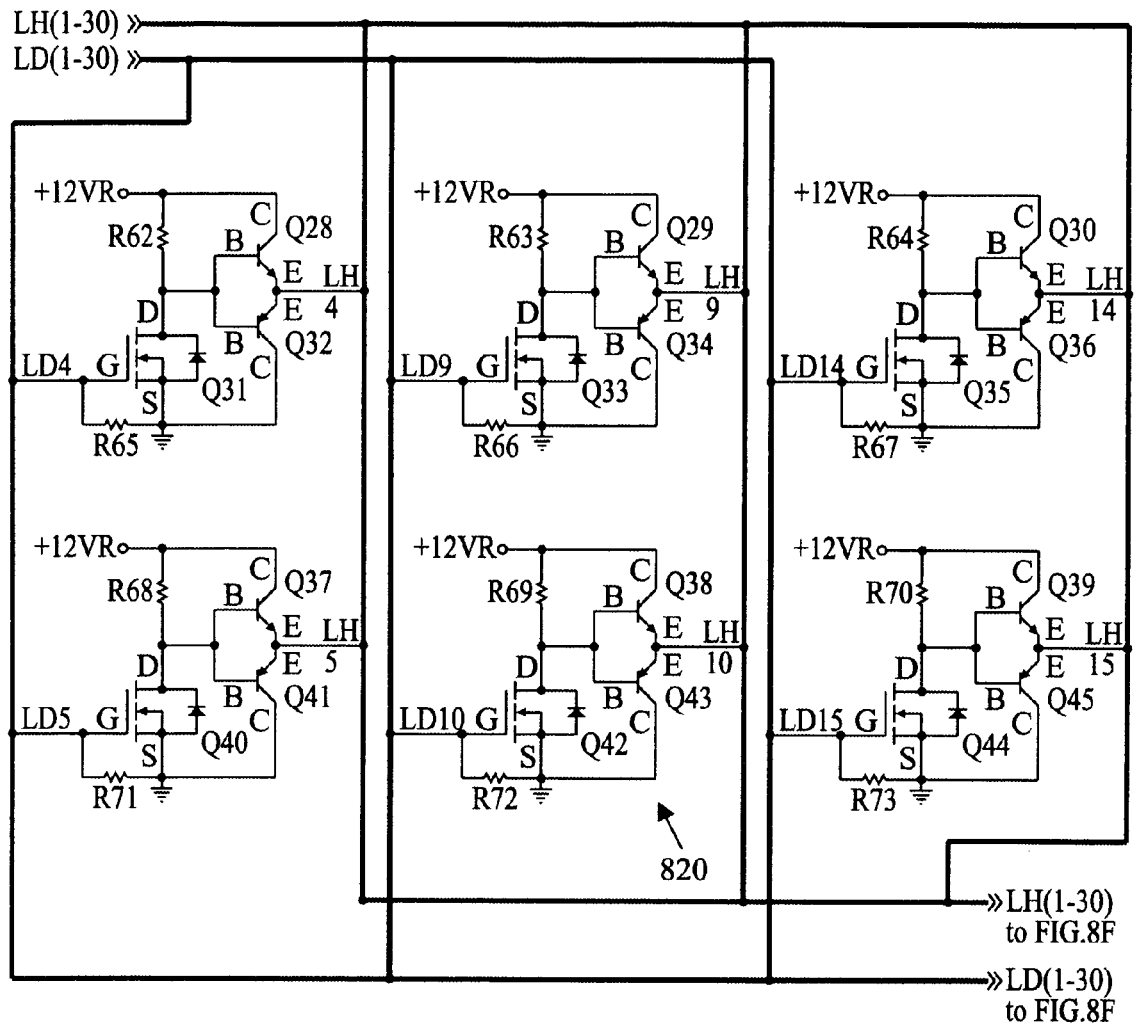
Figure 8F:
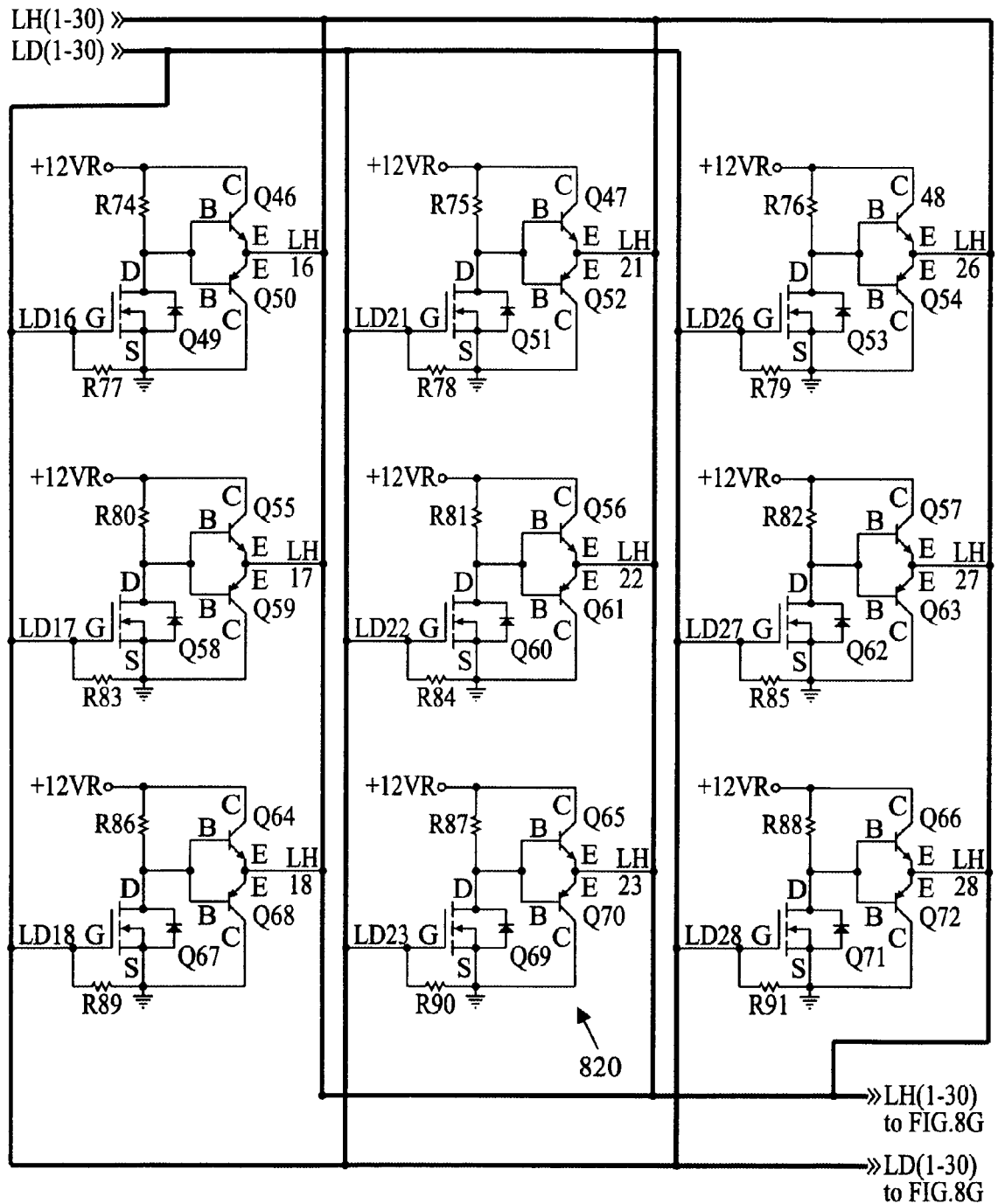
Figure 8G:
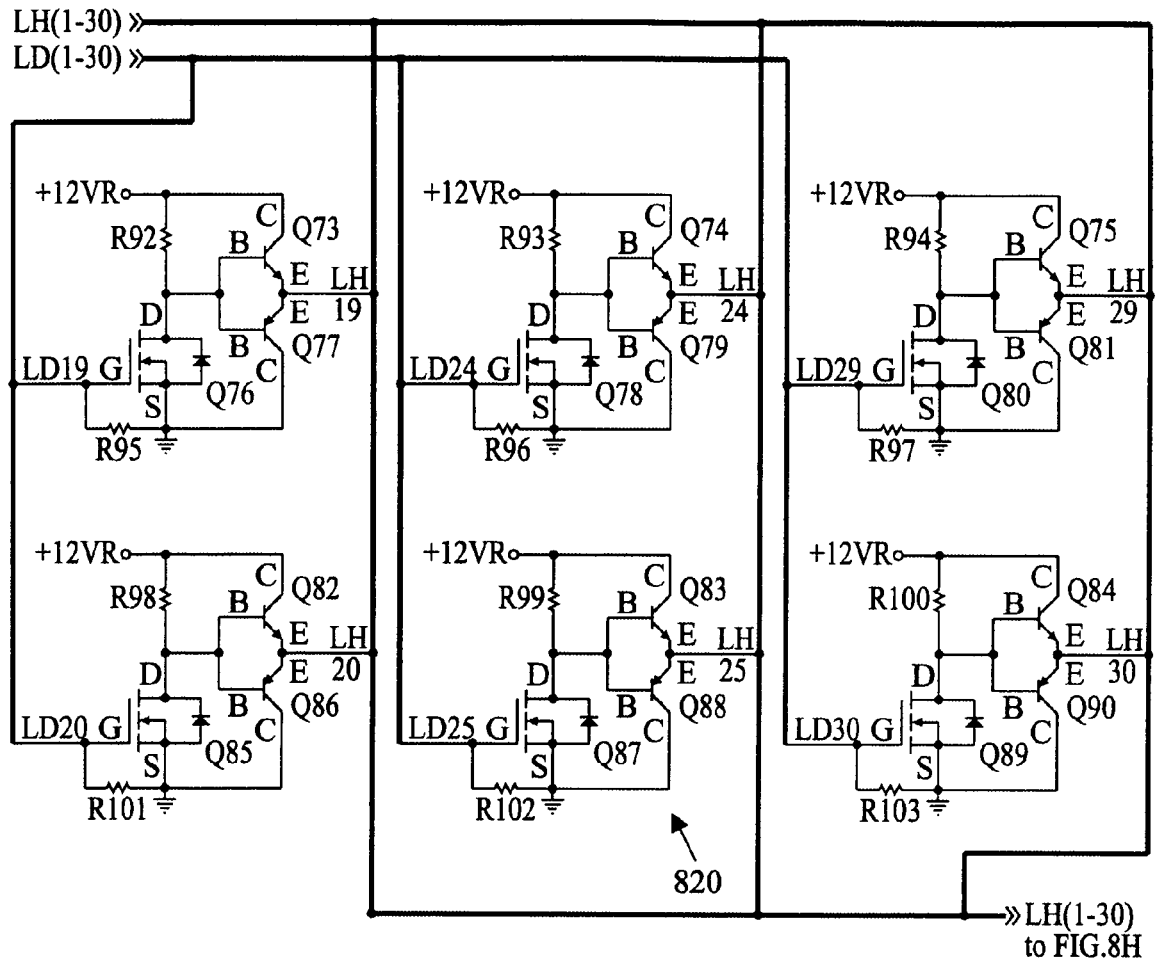
Figure 8I:
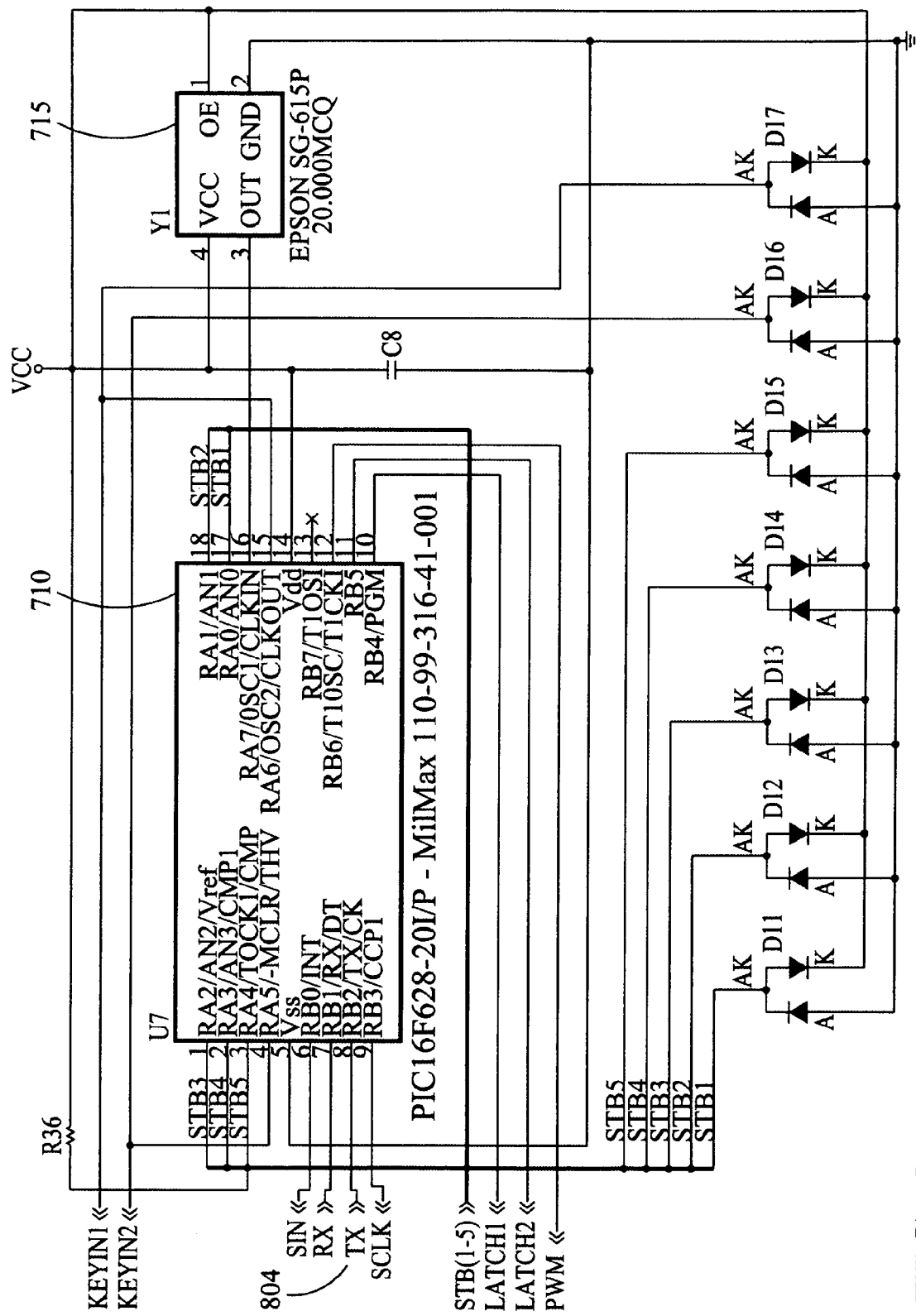

FIG. 8E illustrates circuitry associated with the microcontroller 710 and external oscillator 715. A plurality of diodes (as shown) provide clamping protection.

Lighting Module

Figure 9:
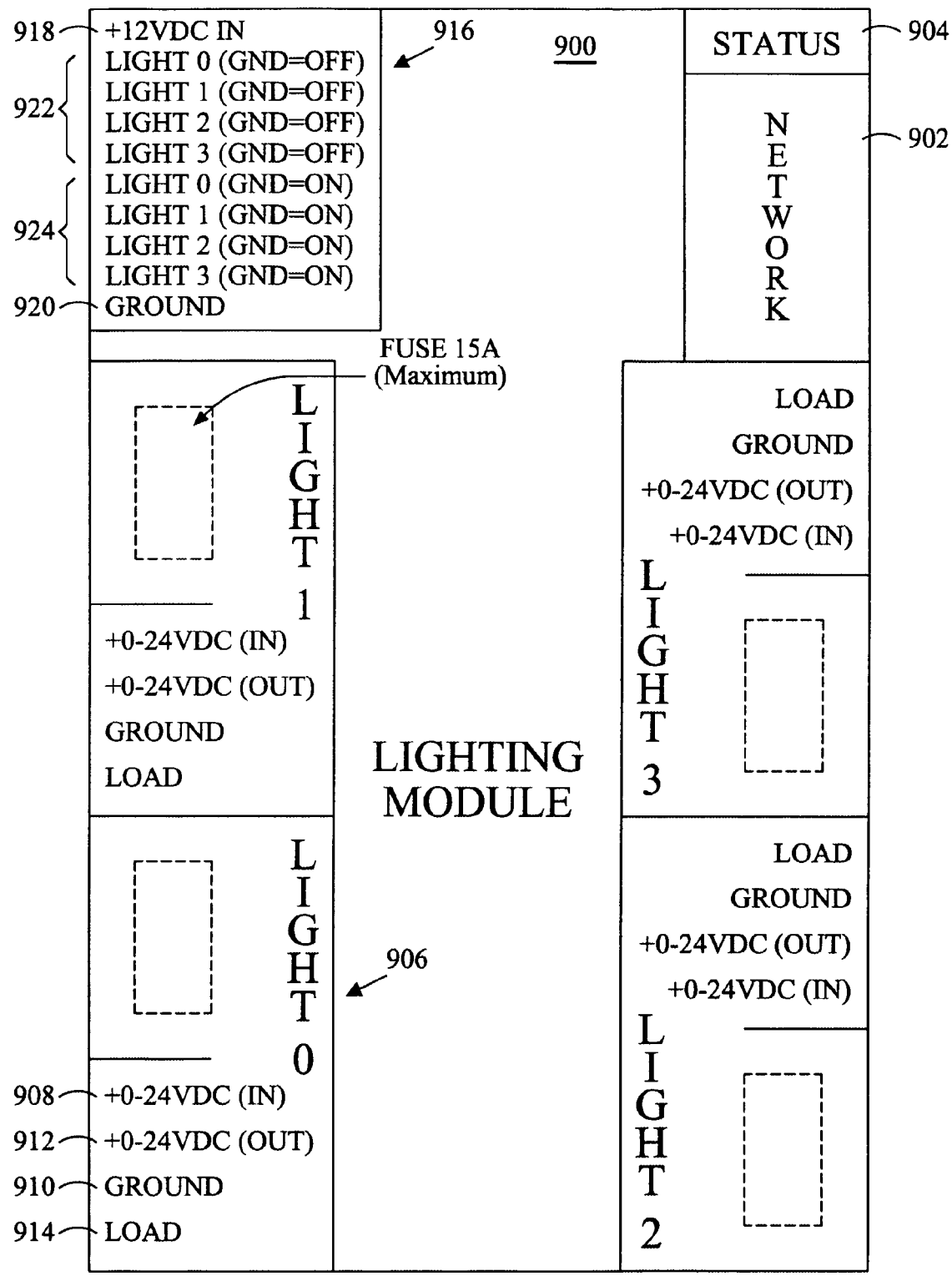
FIG. 9 illustrates an exemplary lighting module.

FIG. 9 illustrates an exemplary lighting module 900 which is typically used to control lighting. The lighting module 900 may include a network connection 902 for connection to the smart module, and a light emitting diode 904 to indicate the current status of the device. The network connection 902 is preferably an RS422, 9,600 baud, full duplex connection interconnected using a yellow cable. By using a light emitting diode, such as green for operational, the status of the device may be quickly checked. The lighting module 900 may include four light connectors 906. The light connector 906 may include a fuse (such as a 15 amp fuse) together with source power including +0-24 DC volts input 908 from the vehicle power source and a ground input 910. The light connector 906 may include power to the light with +0-24 DC volts output 912 and a load output 914. By varying the output 912 the intensity of the luminance from the lighting may be controlled. The lighting module 900 may include digital inputs 916 that are provided with +12 DC volts 918 and a ground 920. The digital inputs 916 may include a set of connectors ground to disable 922 or ground to enable 924. The ground to disable and ground to enable permit either high (12 volts) or low (0 volts) volts to be provided to the lighting module 900 in order to control the corresponding light connector 906. For example, the input for one of the digital inputs 916 may be a push button controller in the vehicle or other switching mechanism. Accordingly, in addition to controlling the light connectors 906 by software within the lighting module 900 the light connectors 906 may be controlled by external direct connections.

Figure 10:
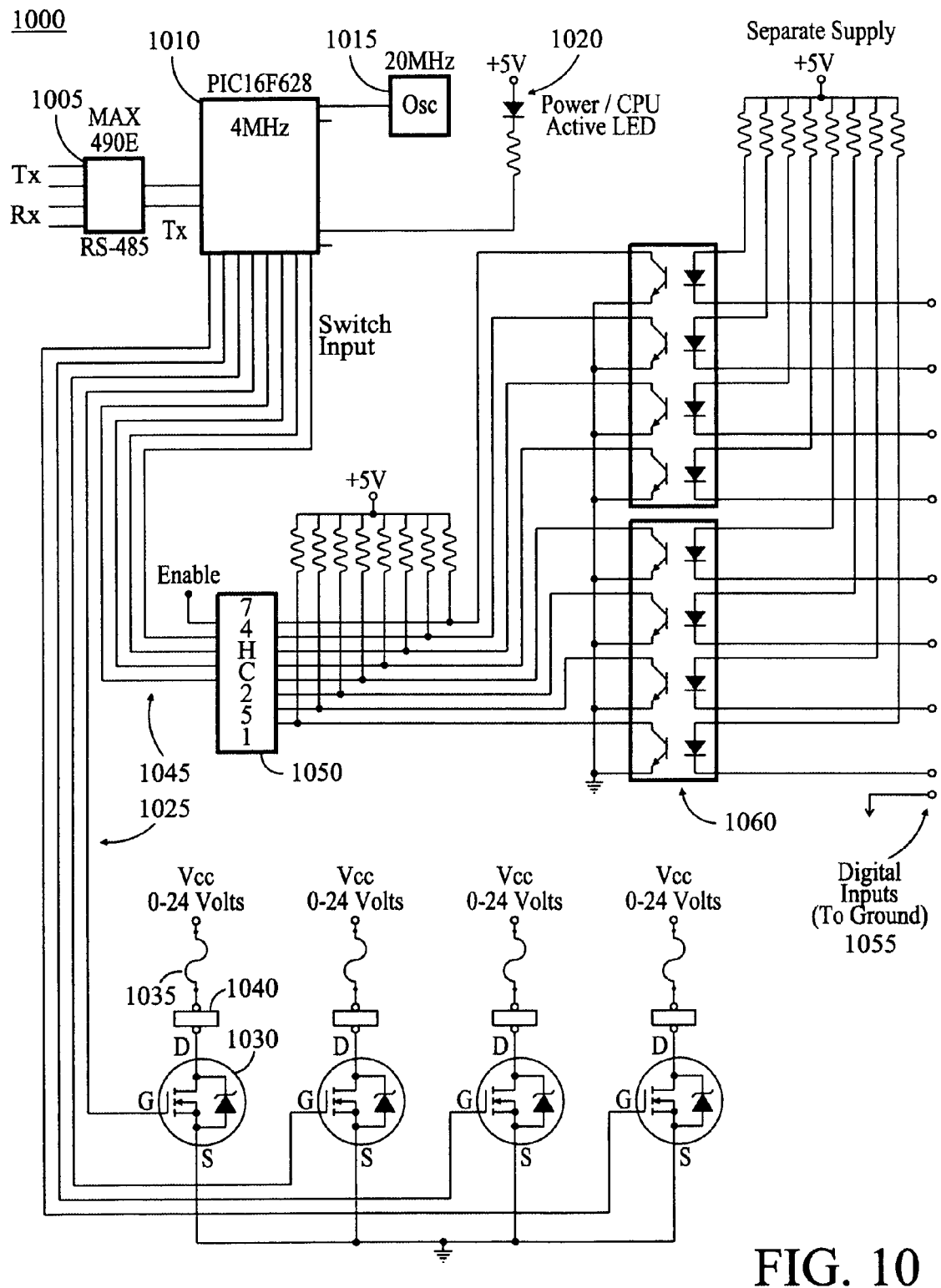
FIG. 10 illustrates an overview schematic of a lighting module according to one embodiment.

FIG. 10 illustrates an overview schematic of a lighting module 1000 according to one embodiment. As will be described in greater detail, the lighting module 1000 may comprise a transceiver 1005 of the type MAX490E available from Maxim Integrated Products. The MAX490E is a low-power transceiver for RS422/485 communications and is used for communicating with a smart module connected to the network connection 902 and a microcontroller 1010 within the lighting module 1000. The microcontroller 1010 may be of the type designated PIC16F628 available from Microchip Technology, Inc., which is an 8-bit CMOS Flash-based microcontroller. The microcontroller 1010 may be clocked using an external oscillator 1015 such as a 20 MHz surface mount quartz crystal of the type SG-216P available from Epson, and the microcontroller 1010 may include circuitry associated with the light emitting diode 1020 for indicating the operational status of the microcontroller 1010.

The lighting module 1000 may comprise FET control lines 1025 for controlling each of four power MOSFET's 1030. Each of the four power MOSFET's 1030 may be used to draw current through an overcurrent fuse 1035 and a load 1040 connected to the light connector 906. Four different loads 1040 may be connected to the four light connectors 906 shown in FIG. 10. Each of the loads 1040 may be controlled by the microcontroller 1010 which may control the loads 1040 responsive to commands received by the microcontroller 1010 through the transceiver 1005 or responsive to switch inputs 1045. An 8-input multiplexer 1050 of the type 74HC251 available from Philips Semiconductors may be used to receive digital inputs 1055. Optocoupler circuitry 1060 may be provided to isolate each of the eight digital inputs 1055 from the inputs of the multiplexer 1050.

Figure 11A:
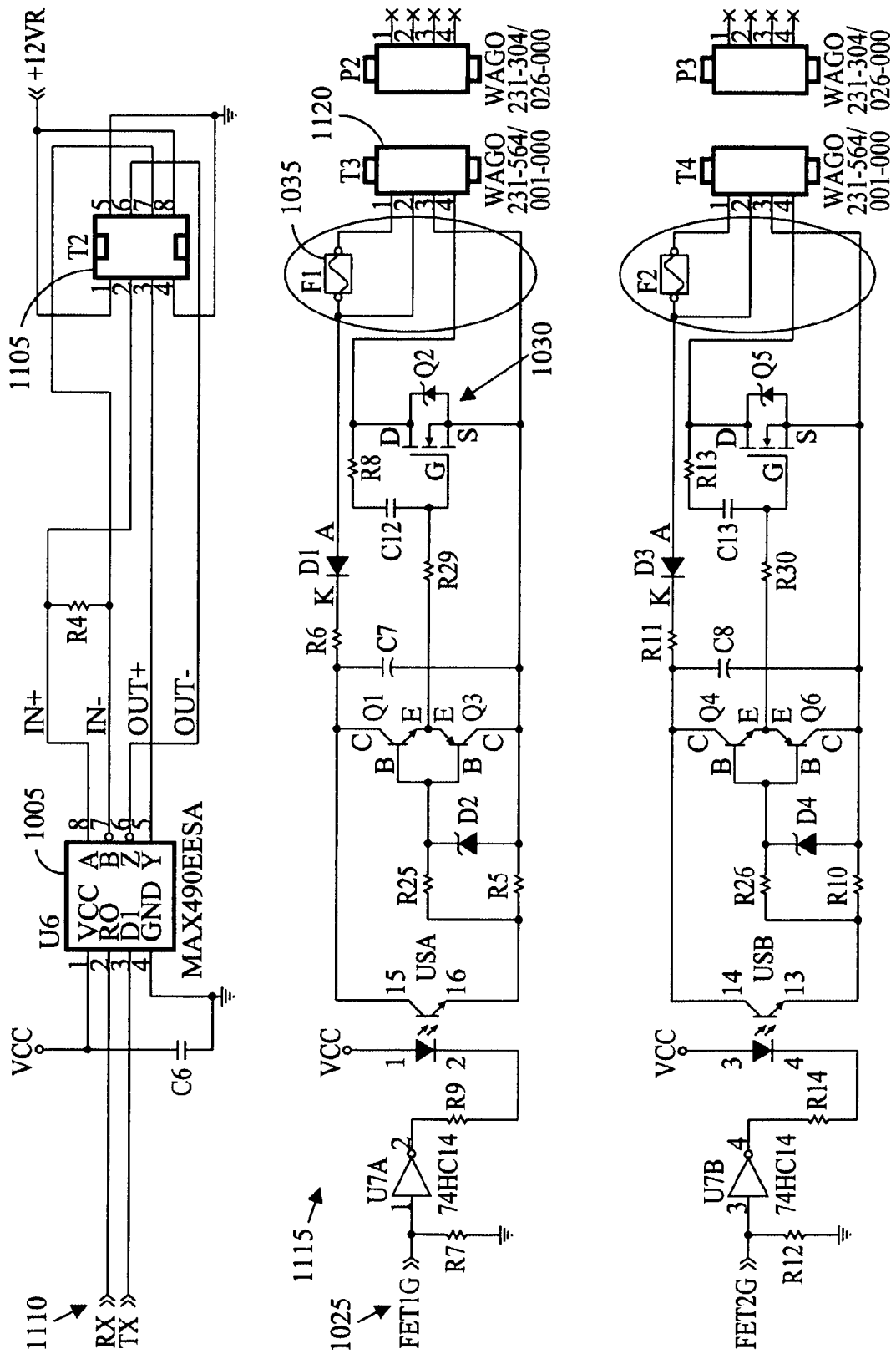
FIGS. 11A-11E comprise a lighting module schematic according to one embodiment.

FIGS. 11A-11E comprise a lighting module schematic according to one embodiment. FIG. 11A shows a modular RJ45 type connector 1105 for the network connection 902, the transceiver 1005, and transmit and receive lines 1110 (leading to the microcontroller 1010), and four power MOSFET's 1030 with associated circuitry 1115. Each of the four power MOSFET's 1030 may be of the type designated IRF2204S available from International Rectifier, which is an N-channel power MOSFET with integral zener (reverse p-n junction) diode. The associated circuitry 1115 may comprise optocouplers for isolating the FET control lines 1025 as well as a plurality of capacitors, resistors, diodes, gates, and transistors as shown. The connectors 1120 may comprise connectors such as WAGO 231-584/001-000 and WAGO 231-304/028-000 available from Wago Innovative Connections. The connectors 1120 may be interconnected with fuse 1035 (which may be a 15A fuse designated 153-007 from Littelfuse, Inc.) and the power MOSFET 1030 as shown in FIG. 11A. For each of the power MOSFET's 1030 the connectors 1120 as shown comprise an interface for connections with +0-24 DC volts input 908 from the vehicle power source, a ground input 910, power to the load with +0-24 DC volts output 912, and a load output 914.

Figure 11B:
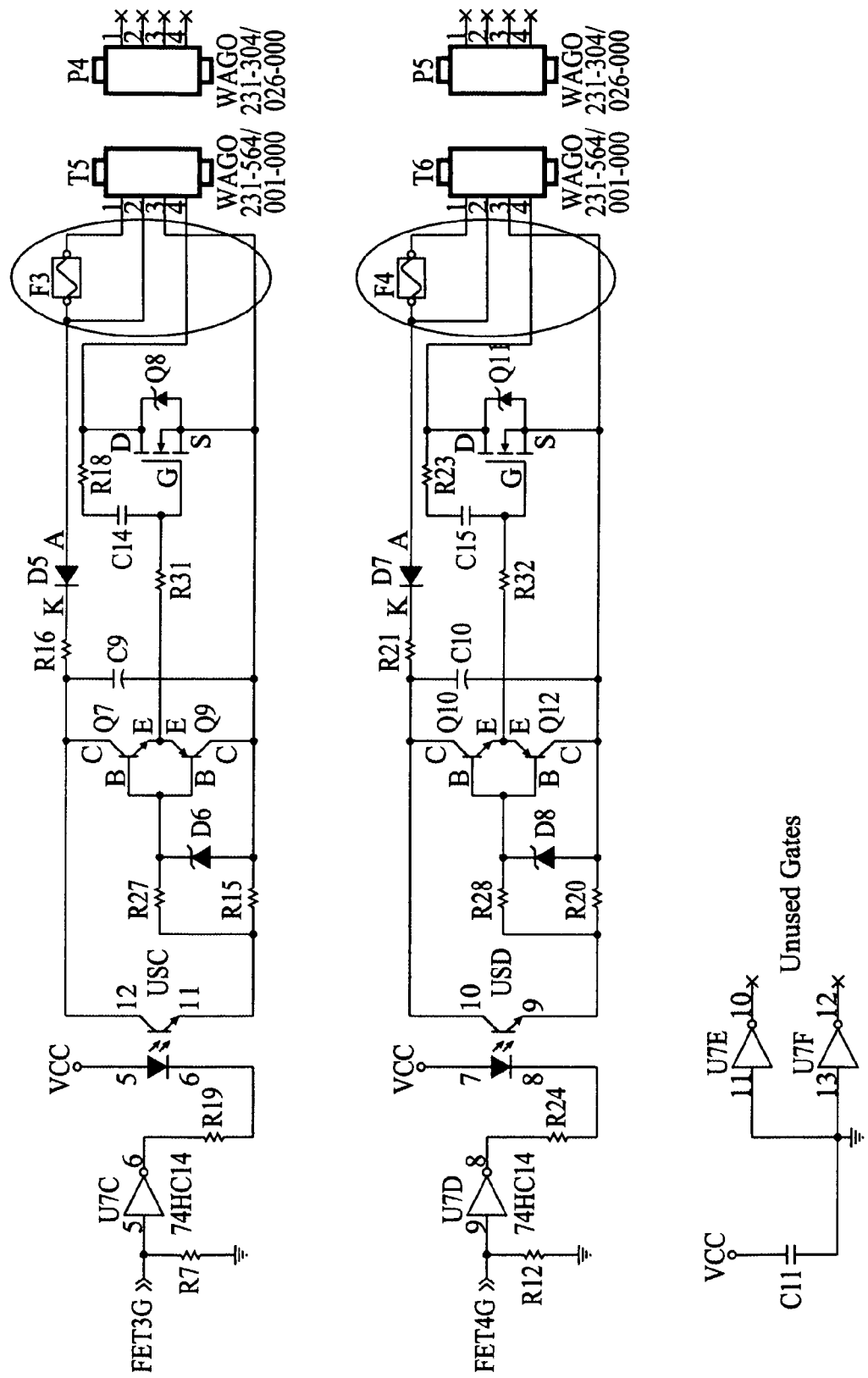

FIG. 11B illustrates interconnections with the microcontroller 1010. The FET control lines 1025, the light emitting diode 1020, the transmit and receive lines 1110 (from transceiver 1005), and oscillator 1015 may be interconnected as shown. The multiplexer 1050 may be connected with the microcontroller 1010 as shown. Digital interface circuitry may include optocoupler circuitry 1125 to isolate the eight digital inputs 1130 from the digital input connectors 1135. The optocoupler circuitry 1125 may include the PS2501L-4 optocoupler from NEC and resistors as recommended for use with the PS2501L-4 devices. The PS2501L-4 devices, as previously described, are optically coupled isolators used to provide isolation to the multiplexer 1050 and microcontroller 1010 from common-mode voltages, ground loops, and voltage spikes. The digital input connectors 1135 may be of the type WAGO 733-370 and WAGO 733-110 available from Wago Innovative Connections.

Figure 11C:
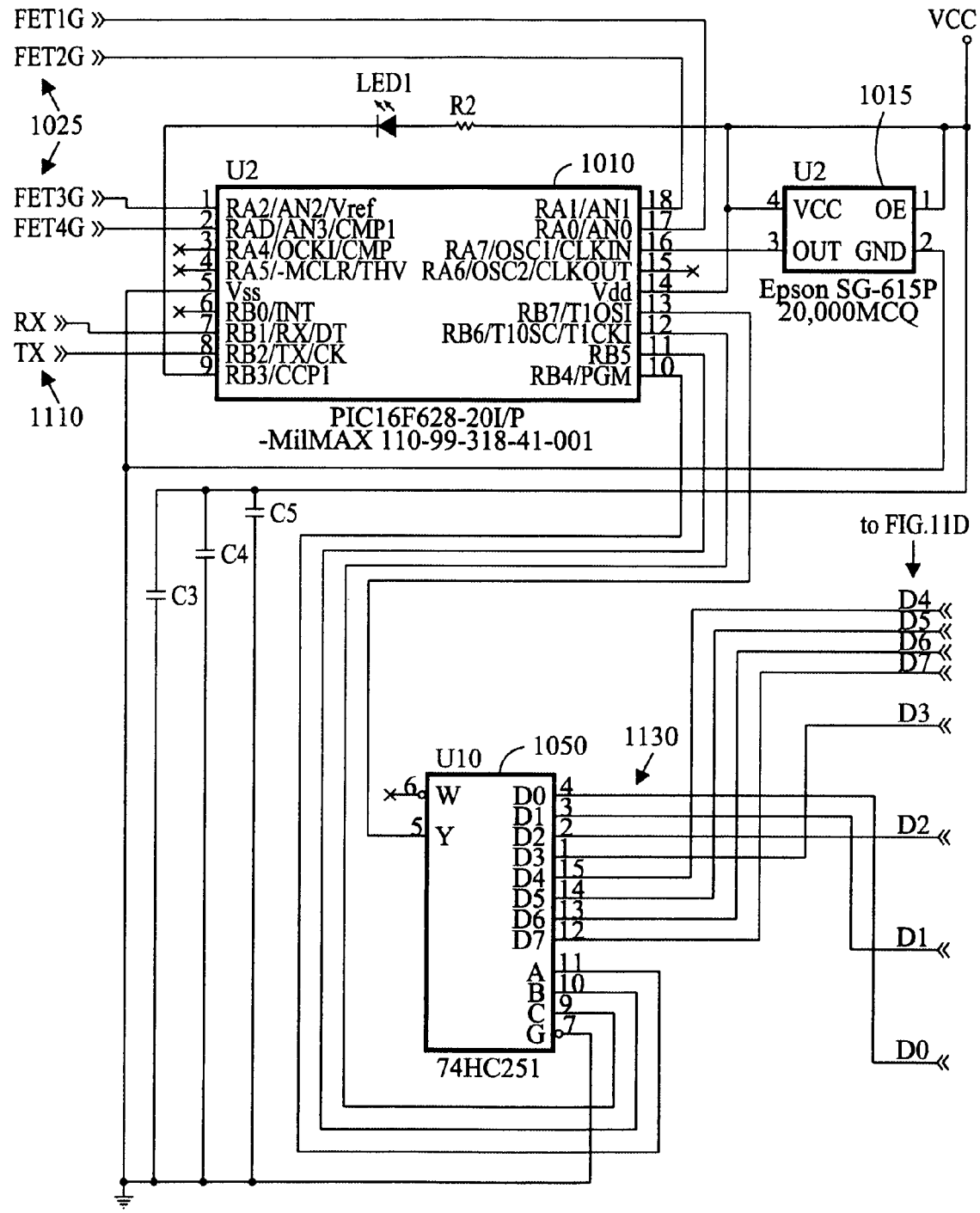
Figure 11D:
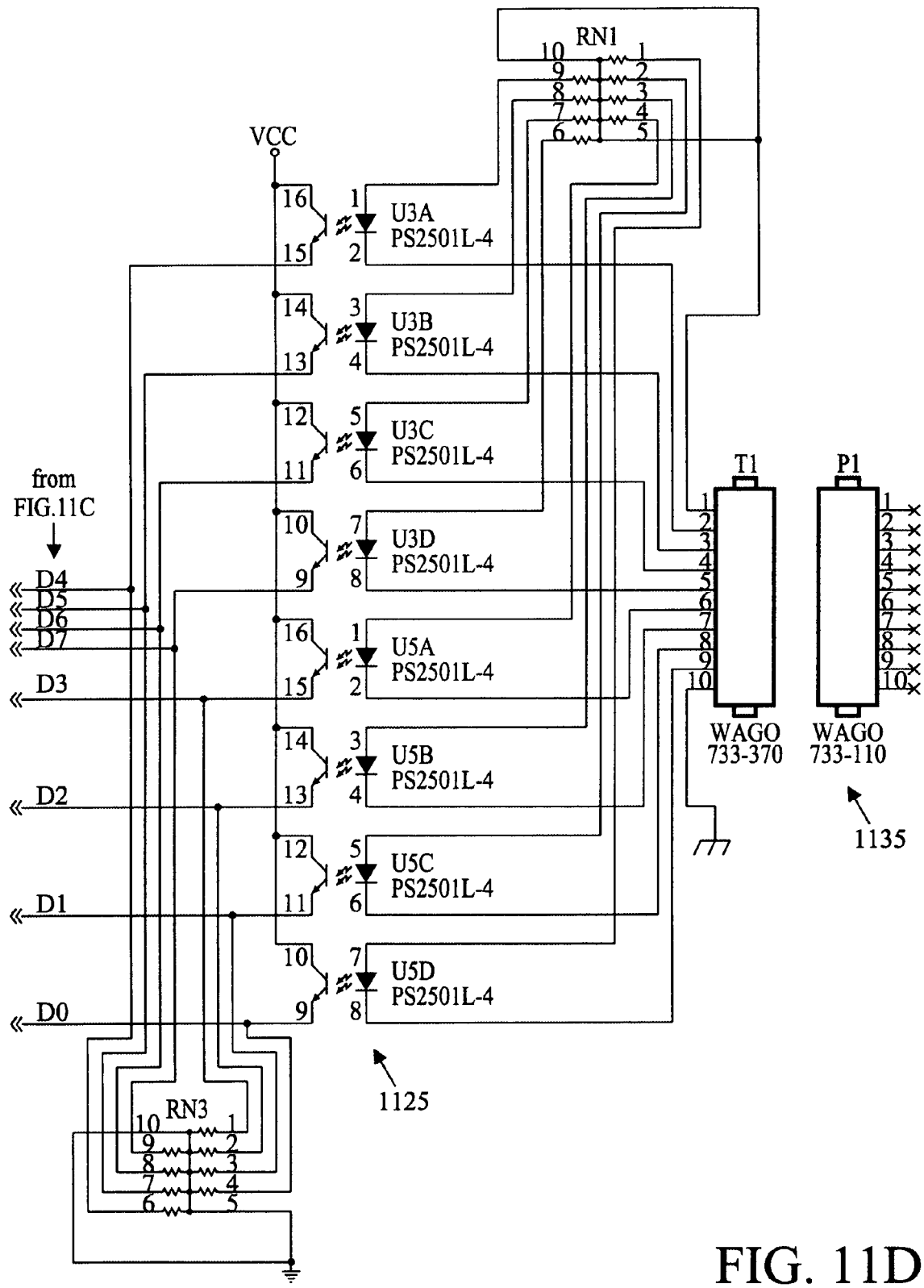
Figure 11E:
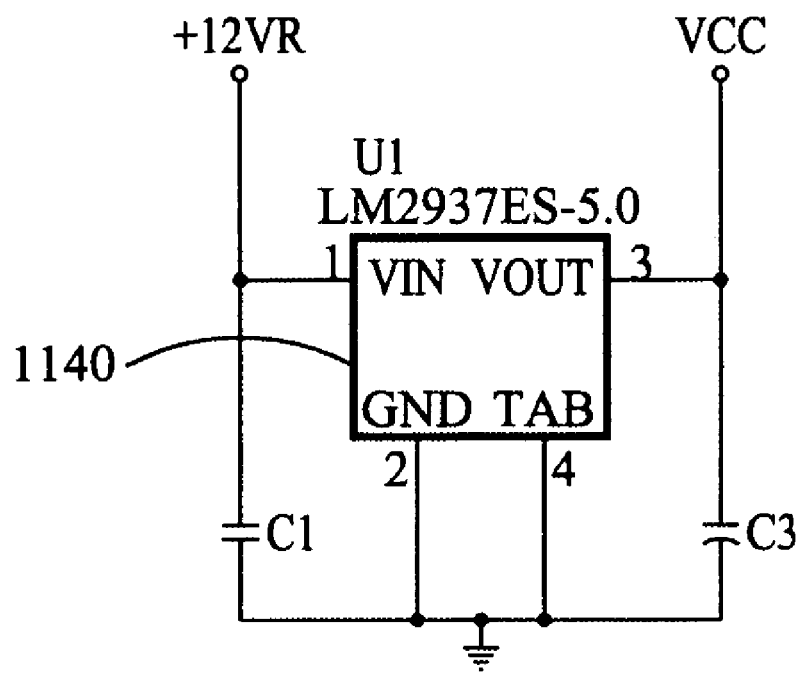
Figure 11E:
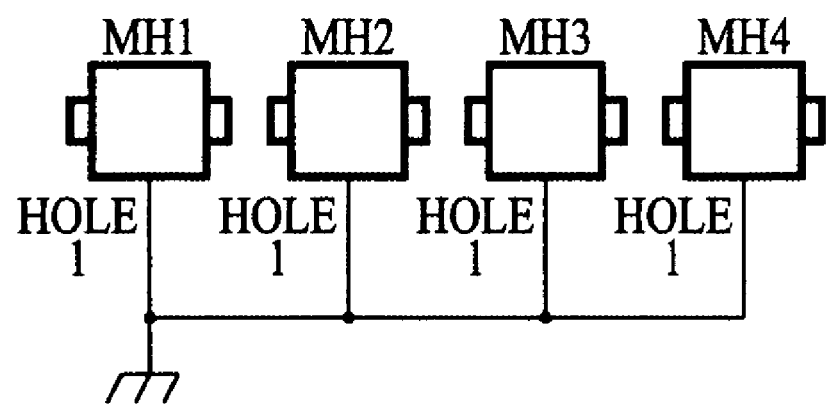

FIG. 11C illustrates power supply circuitry 1140 for a lighting module and may be very similar with the power supply circuitry 806 shown in FIG. 8A.

Relay Module

Figure 12:
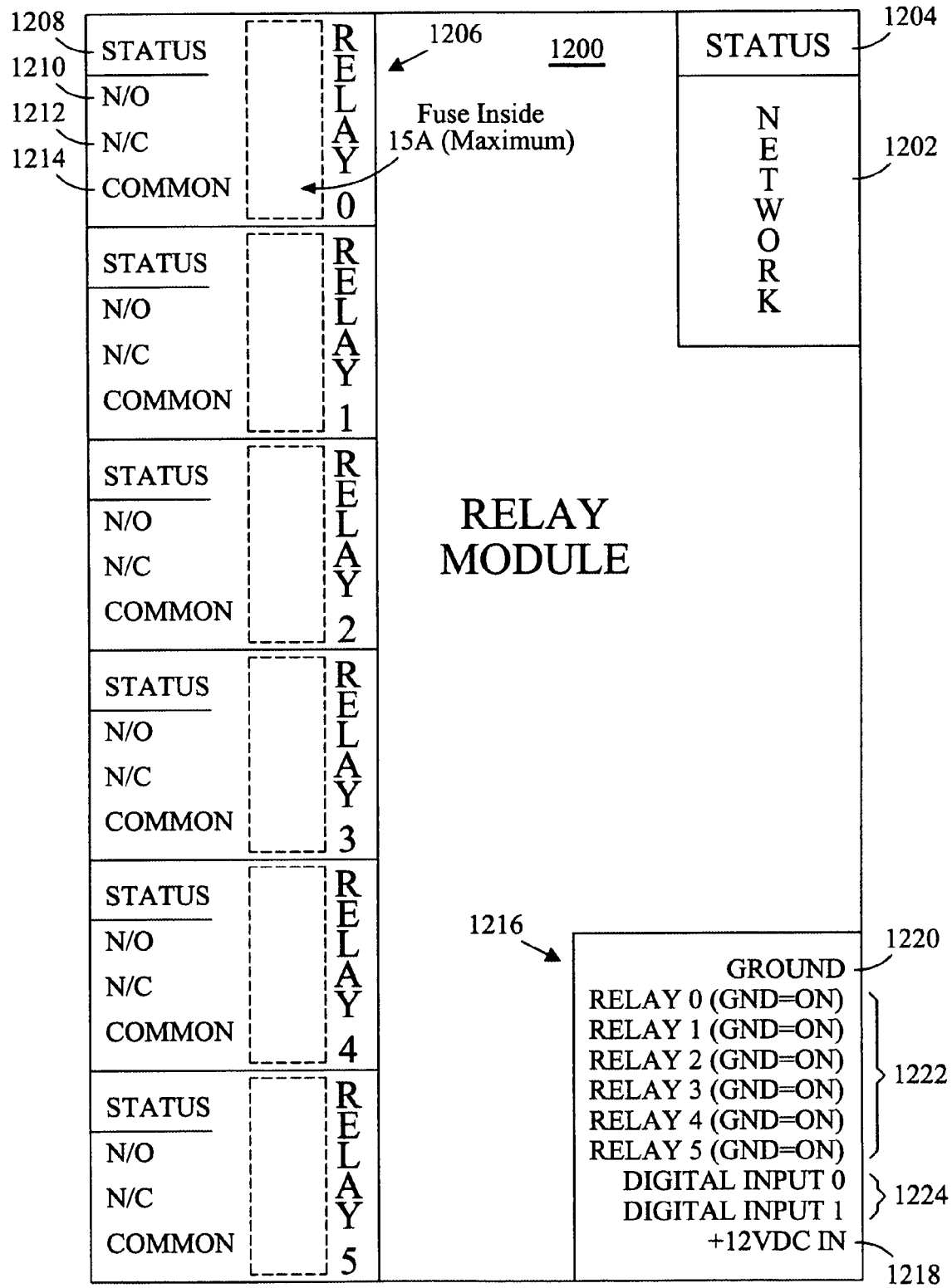
FIG. 12 illustrates an exemplary relay module.

FIG. 12 illustrates an exemplary relay module 1200. The relay module 1200 may include a network connection 1202 for connection to the smart module, and a light emitting diode 1204 to indicate the current status of the device. The network connection 1202 is preferably an RS422, 9,600 baud, full duplex connection interconnected using a red cable. By using a light emitting diode, such as green for operational, the status of the device may be quickly checked. The relay module 1200 may include six relays 1206. The status 1208 on the relay is 'on' when the relay is operational. The relays 1206 preferably include Form C relays. The output of each relay 1206 includes a normally open connection (NO) 1210, a normally closed connection (NC) 1212, and a common connection 1214. By switching the relay 1206 the device may be controlled in a binary (on/off) manner. The relay module 1200 may include digital inputs 1216 that are provided with +12 DC volts 1218 and a ground 1220. The digital inputs 1216 may include a set of connectors ground to enable 1222. The ground to enable permit low (0 volts) volts to be provided to the relay module 500 in order to control the corresponding relay 1206. For example, the input for one of the digital inputs may be a push button controller in the vehicle or other switching mechanism. Accordingly, in addition to controlling the relay 1206 by software within the relay module 1200 the relays 1206 may be controlled by external direct connections. A set of external connectors 1224 may be used, that when grounded, to provide a programmable function. The programmable function may provide any function, such as changing the state of one or more relays. In addition, the programmable function may be to provide a signal to an associated smart module which may then result in another functionality. In this manner, the external connectors 1224 may be used to provide any function across the entire network.

One example of how the external connectors 1224 may be used is when a portion of the room is slid out from its normal position to provide an enlarged living space. In many cases, this results in a track of lighting along the edge of the expanded portion being exposed. In this case it is desirable to have a sensor that provides an input to the external connectors 1224 that turns on the track lighting. In addition, when the expanded portion is closed it is desirable to turn off the track lighting, when then becomes covered by the sliding portion, so that it does not inadvertently start a fire. In addition, the external connectors 1224 may be connected to other items, such as the dump control.

Figure 13A:
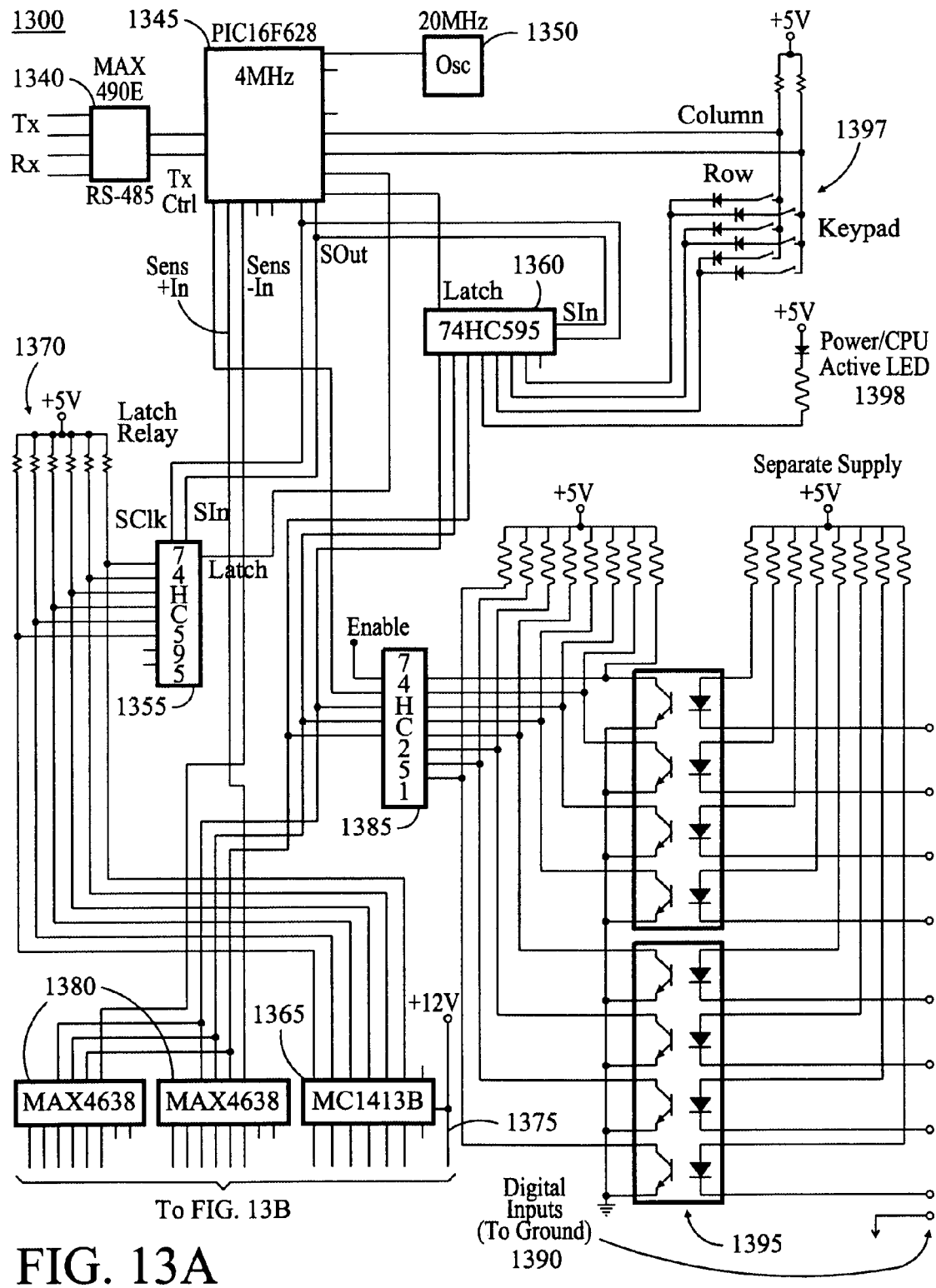
FIGS. 13A-13B illustrate an overview schematic of a relay module according to one embodiment.
Figure 13B:
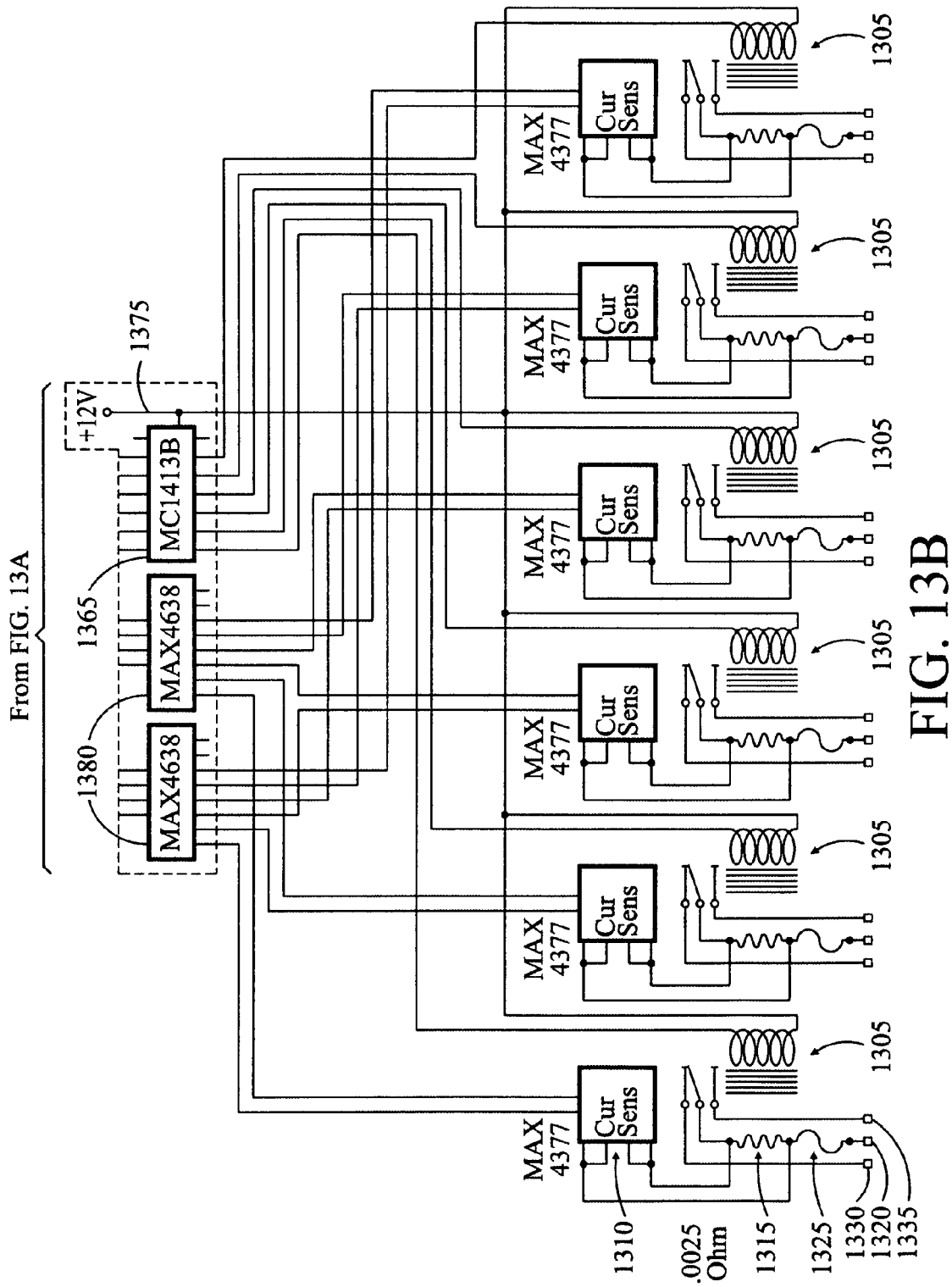

FIG. 13 illustrates an overview schematic of a relay module 1300 according to one embodiment. The relay module 1300 includes six Form C relays 1305, which are single pole double throw (SPDT) and break the connection with one throw before making contact with the other (break-before-make). Each of the six Form C relays 1305 is preferably coupled with bi-directional current sense circuitry 1310 for sensing the direction of current flow across current sense resistor 1315, which may be a 0.0025 ohm resistor in series with the common connection 1320. The current sense circuitry 1310 may comprise current sense amplifiers of the type MAX4377 available from Maxim Integrated Products and may be used in determining whether the Form C relay 1305 is operated in the normally closed (NC) or normally open (NO) mode. The current sense resistor 1315 is shown in series with an overcurrent fuse 1325 such as a 15A fuse.

The lines to the common connection 1320, the normally closed (NC) connection 1330, and the normally open (NO) connection 1335 comprise the load side circuitry of a Form C relay 1305 whereas the current sense circuitry 1310 may be used with other circuitry comprising the relay module 1300 for controlling each of the Form C relays 1305. As will be described in greater detail, the control circuitry for the relay module 1300 may comprise a transceiver 1340 of the type MAX490E available from Maxim Integrated Products. As previously described, the MAX490E is an RS422/485 transceiver for communicating with a smart module connected to the network connection 1202 and a microcontroller 1345 within the relay module 1300. The microcontroller 1345 may be of the type PIC16F628 available from Microchip Technology, Inc. and previously described. The microcontroller 1345 may be clocked by an external oscillator 1350 such as a 20 MHz crystal of the type SG-216P available from Epson and also previously described.

Relay control commands from a smart module may be received by the relay module 1300 through the transceiver 1340 and processed by the microcontroller 1345 whereafter the microcontroller 1345 may send command signals to one or more of the Form C relays 1305. The circuitry for sending the command signals to the Form C relays 1305 may comprise, as shown, shift registers 1355 and 1360 of the type 74HC595 available from Philips Semiconductors, which is an 8-bit serial-in, serial or parallel-out shift register. As shown, the shift register 1355 may be used with a transistor array 1365 to selectively energize the coil in a particular Form C relay 1305 thereby breaking the contact pads and subsequently making contact with the other pads. The transistor array 1365 may be of the type MC1413B available from Semiconductor Components Industries, LLC., which is a high voltage, high current Darlington connected transistor array for driving relays, lamps, or other devices. The MC1413B may be configured with pull-ups 1370 and +12 volt connections 1375 as shown.

The shift register 1360 may be configured with multiplexers 1380 of the type designated MAX4638 available from Maxim Integrated Products, which is an 8:1 analog multiplexer that switches one of eight inputs to a common output as determined by a 3-bit binary input. As shown, the 3-bit binary input may be provided by the shift register 1360, the inputs to the multiplexers 1380 may be connected to the coils of each Form C relay 1305, and the common outputs of the multiplexers 1380 may be wired back to the microcontroller 1345. The same 3-bit binary inputs provide by the shift register 1360 may be used with the multiplexer 1385 of the type 74HC251 available from Philips Semiconductors, for selectively receiving digital inputs 1390. Digital inputs 1390 may be used to selectively control operation of the six Form C relays 1305 without requiring communication between the relay module 1300 and a smart module. Optocoupler circuitry 1395 may be provided to isolate each of the digital inputs 1390 from the inputs of the multiplexer 1385.

The relay module 1300 may also comprise keypad circuitry 1397 for controlling the operation of the six Form C relays 1305. A relay module status LED 1398 is provided. Both the keypad circuitry 1397 and relay module status LED 1398 may be connected to the shift register 1360 as shown.

Figure 14A:
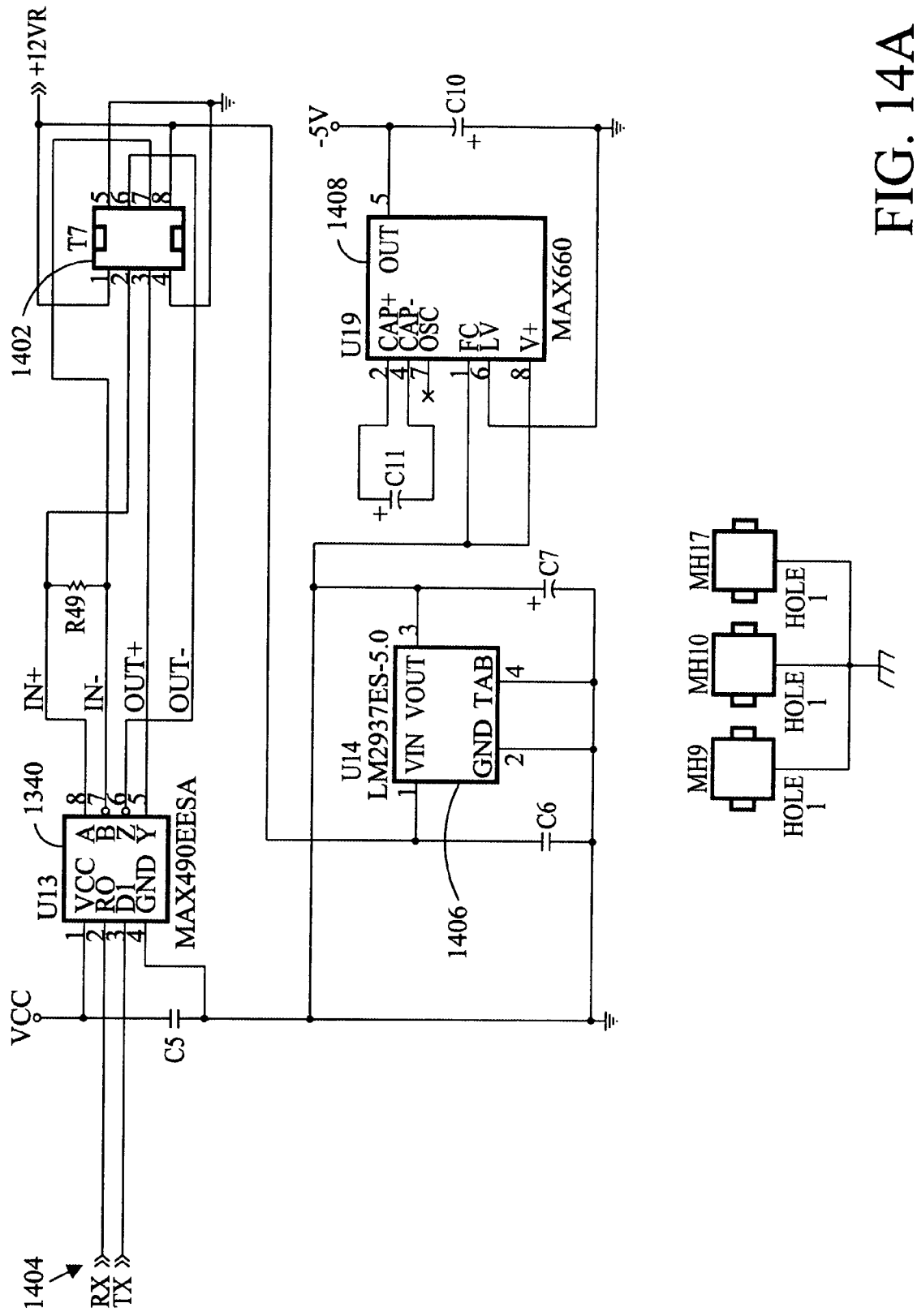
FIGS. 14A-14J comprise a relay module schematic according to one embodiment.

FIGS. 14A-14J comprise a relay module schematic according to one embodiment. FIG. 14A shows a modular RJ45 type connector 1402 for the network connection 1202, the transceiver 1340, and transmit and receive lines 1404 (leading to the microcontroller 1345), power supply circuitry 1406, and inverter circuitry 1408. The power supply circuitry 1406 may comprise circuitry that is very similar with the power supply circuitry 806 shown in FIG. 8A and the power supply circuitry 1140 shown in FIG. 11C. As shown in FIG. 14A, the power supply circuitry 1406 may include a step-down voltage regulator of the type LM2937ES-5.0 available from National Semiconductor Corporation along with input and output capacitors recommended for use with the LM2937ES. The power supply circuitry 1406 takes an input voltage of +12 volts and steps the voltage down to +5 volts (the supply voltage used for the transceiver 1340, the microcontroller 1345, and other components). The inverter circuitry 1408 may include an inverter of the type MAX660 available from Maxim Integrated Products. The MAX660 is a CMOS monolithic charge-pump converter which may be configured either to double the positive input voltage or invert a positive voltage to a negative output voltage. Here, the MAX660 is configured as an inverter, receiving +5 volts at its input and providing −5 volts at its output. The −5 volts is used, as will be described further below, for the bi-directional current sense circuitry such as the current sense circuitry 1310.

Figure 14B:
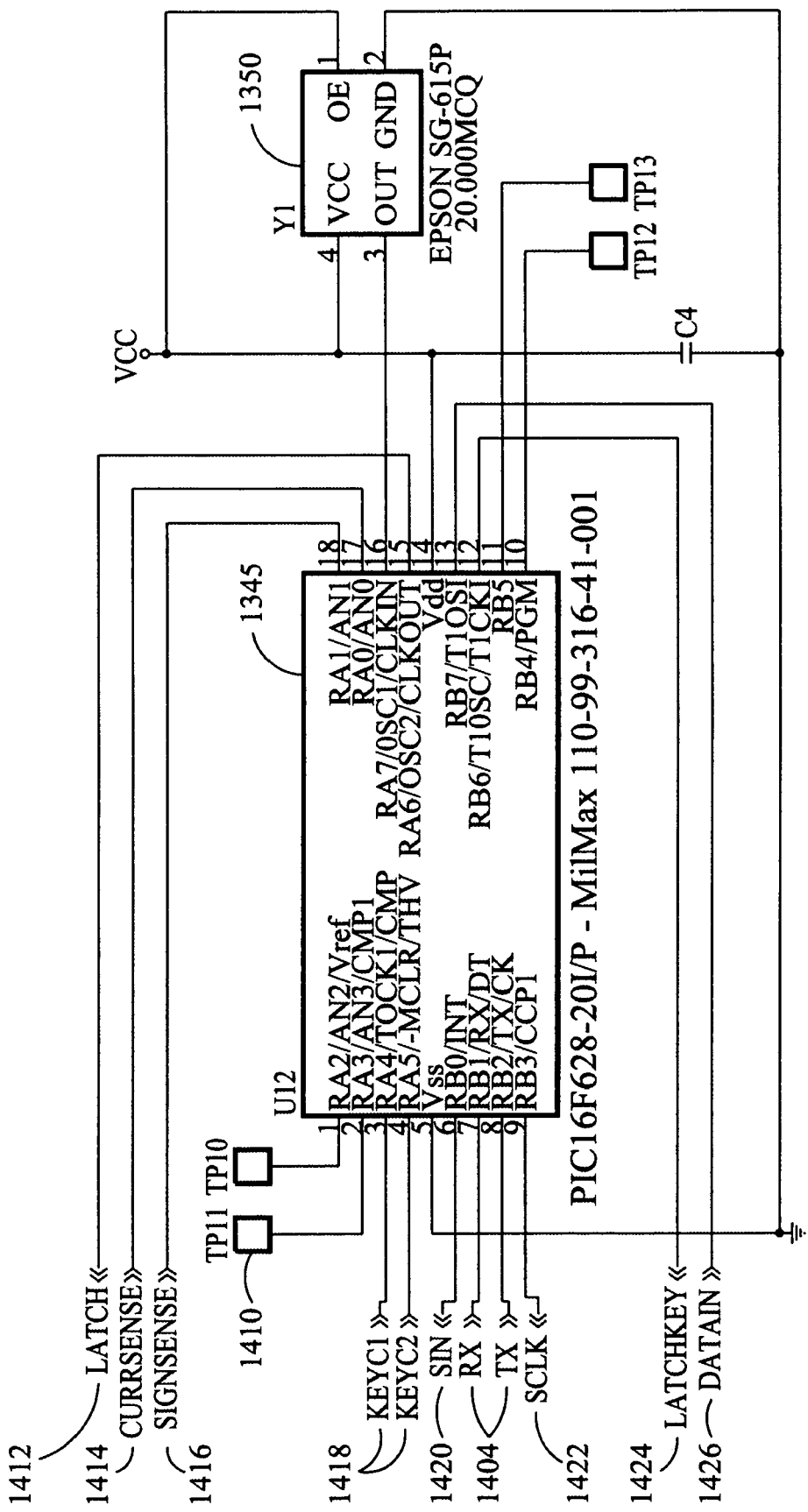

FIG. 14B illustrates a configuration for the microcontroller 1345 and the oscillator 1350. Various test pins 1410 are shown. However, such test pins may be incorporated in various places and will not be described herein. Other inputs and outputs are shown in FIG. 14B and will be described in greater detail below. For example, LATCH 1412 may be used by the microcontroller 1345 to enable the shift register 1355 which may be used to selectively energize the coil in a particular Form C relay 1305. Likewise the output line LATCH-KEY 1424 may be used by the microcontroller 1345 to enable the shift register 1360 which may be used as previously described. Input lines CURRSENSE 1414 and SIGNSENSE 1416 may be used with the bi-directional current sense circuitry. The input lines KEYC1 and KEYC2 1418 may be used with the keypad circuitry 1397. The output lines SIN 1420 and SCLK 1422 may be used with the shift registers 1355 and 1360. The input DATAIN 1426 may be used for receiving digital inputs 1390 through multiplexer 1385, as shown in FIG. 13. Also illustrated in FIG. 14B are the transmit and receive lines 1404 leading from the transceiver 1340.

Figure 14C:
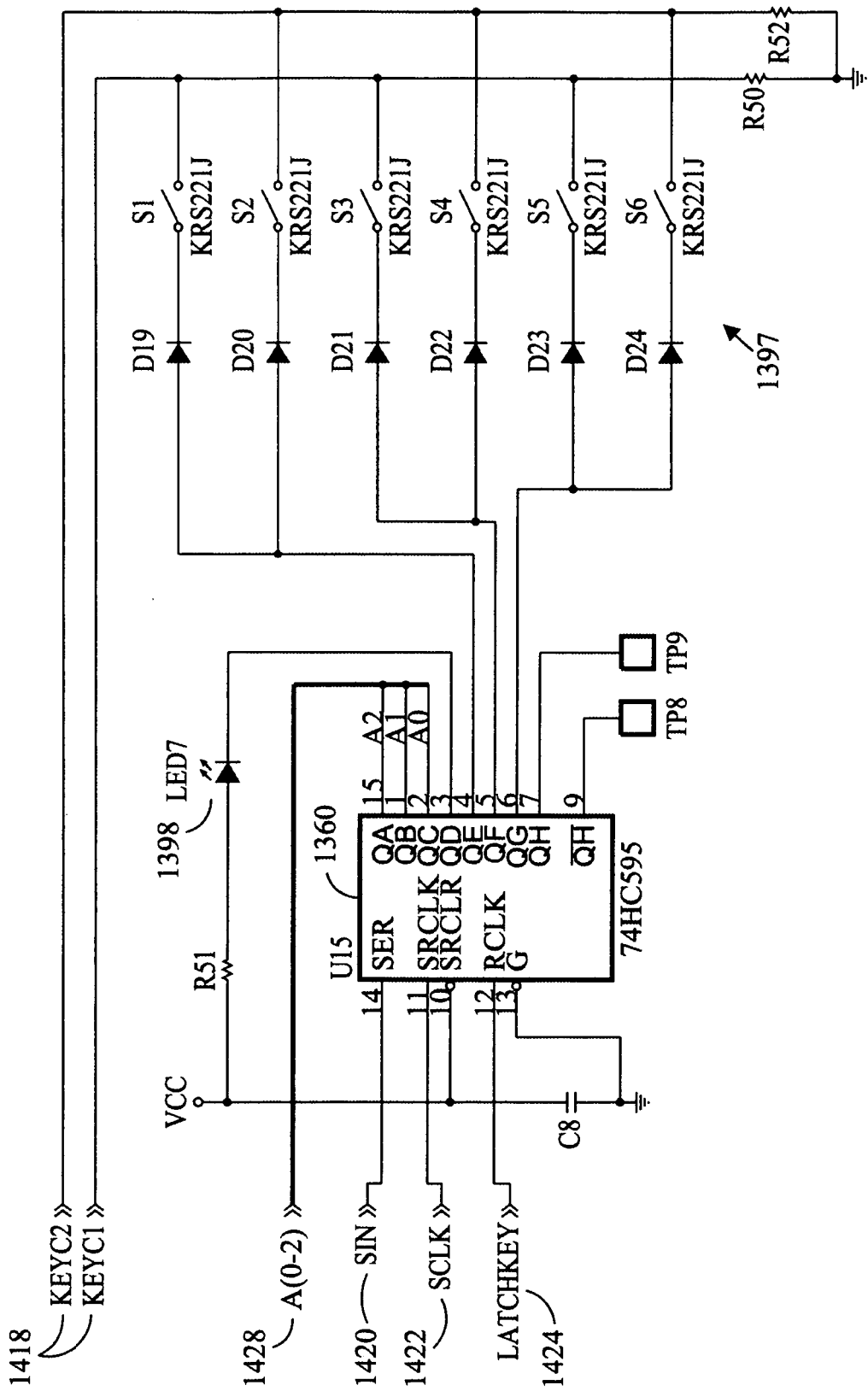

FIG. 14C illustrates circuitry interconnected with the shift register 1360. The keypad circuitry 1397 and relay module status LED 1398 may be connected to the shift register 1360 as shown. The input lines KEYC1 and KEYC2 1418 may be connected with the keypad circuitry 1397 as shown. The 3-bit binary input lines 1428 may be provided by the shift register 1360 and used as previously described. Also illustrated in FIG. 14C are the input lines SIN 1420 and SCLK 1422 (outputs from the microcontroller 1345 and inputs to the shift register 1360) and the output line LATCHKEY 1424 for enabling the shift register 1360.

Figure 14D:
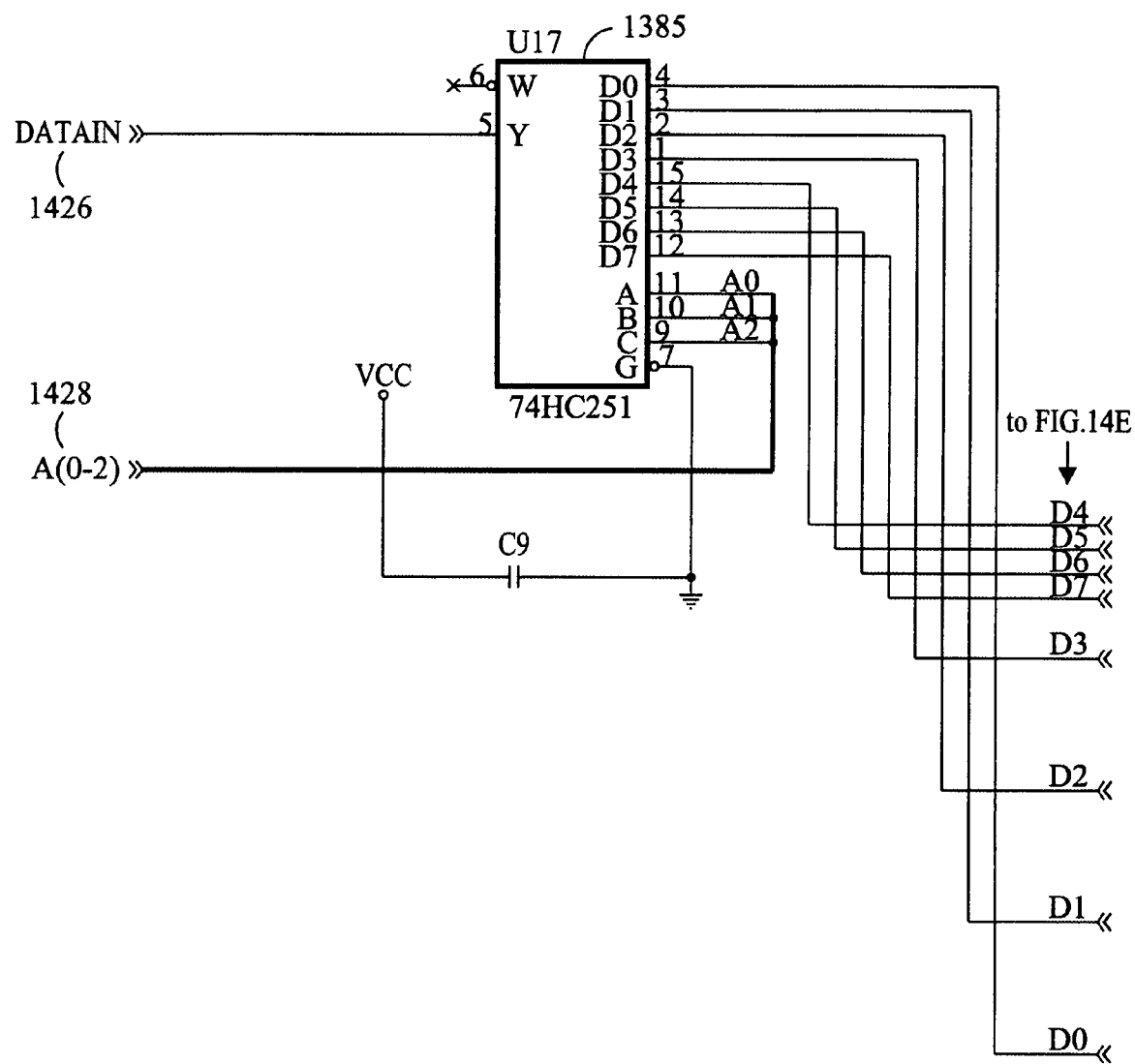

FIG. 14D illustrates the circuitry for handling the digital inputs 1390 as shown in FIG. 13. For instance, the physical interface for receiving digital inputs 1390 into the circuitry for the relay module 1300 may include digital connectors 1430 of the type WAGO 733-370 and WAGO 733-110 available from Wago Innovative Connections. Optocoupler circuitry 1395 may be provided to isolate each of the digital inputs 1390 from the inputs of the multiplexer 1385. The optocoupler circuitry 1395 may include the PS2501L-4 optocoupler from NEC and resistors as recommended for use with the PS2501L-4 devices. These devices, as described previously and illustrated in FIGS. 5H and 11B, are optically coupled isolators for providing isolation to the multiplexer 1385 and microcontroller 1345 from voltage spikes and the like. Also illustrated in FIG. 14D are the 3-bit binary input lines 1428 which may be used with the multiplexer 1385 for selectively receiving digital inputs 1390.

Figure 14E:
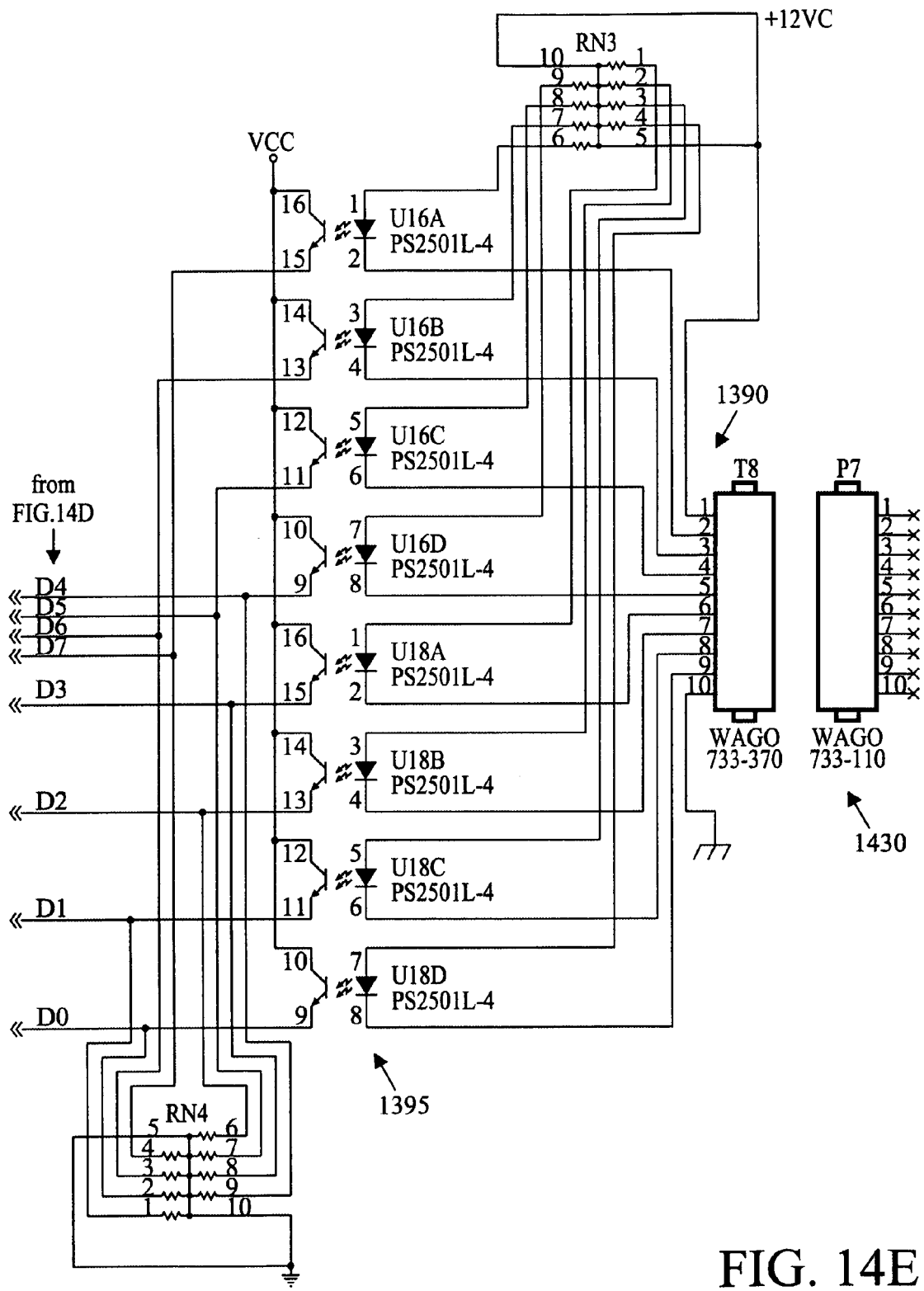

FIG. 14E illustrates relay control circuitry for a relay module according to one embodiment. Relay control may be accomplished using an array of transistors to selectively energize the coils of a corresponding relay. As shown, an array of six power MOSFET's 1432 may be used to selectively control six relays. Each of the six power MOSFET's 1432 may be of the type designated IRLML2803 available from International Rectifier. The IRLML2803 is an N-channel power MOSFET with integral zener (reverse p-n junction) diode similar to the power MOSFET shown in FIG. 11A. Control lines for biasing the power MOSFET's 1432 may be provided by the shift register 1355. For example, the microcontroller 1345 may enable the shift register 1355 using the input LATCH 1412 and select a particular relay to control using input lines SIN 1420 and SCLK 1422 thereby applying a bias to a corresponding power MOSFET 1432 which then allows current flow on a corresponding relay control line RLY 1434. The current flow energizes the coils of the corresponding Form C relay causing the load circuit of the selected relay to break its contacts connection and subsequently make contact with the other contacts. Relay status LED's 1436 may be provided to indicate which of the six relays have been activated. A lighted relay status LED 1436 may indicate the particular relay coil is in an energized state (with current flowing through the corresponding relay control line RLY 1434).

Also illustrated in FIG. 14E is circuitry for sensing current flow and current flow direction. The current sense multiplexer 1438 may be of the type 74HC251 available from Philips Semiconductors, which is an 8-input multiplexer. The current sense multiplexer 1438 may be configured with six current sense inputs 1442 connected to current sense circuitry for each of the six Form C relays 1305. The line CURRSENSE 1414 is shown connected to the current sense multiplexer 1438 and runs back to the microcontroller 1345 for indication of current flow for the particular relay selected by the 3-bit binary input lines 1428.

Circuitry for indicating current flow direction may include the current direction multiplexer 1440. The current direction multiplexer 1440 may be of the same type as the current sense multiplexer 1438 (designated 74HC251) and may be configured with six sign sense inputs 1444 connected to current direction sensing circuitry for each of the six Form C relays 1305. The line SIGNSENSE 1416 is shown connected to the current direction multiplexer 1440 and runs back to the microcontroller 1345 for indication of current direction for the particular relay selected by the 3-bit binary input lines 1428.

Figure 14F:
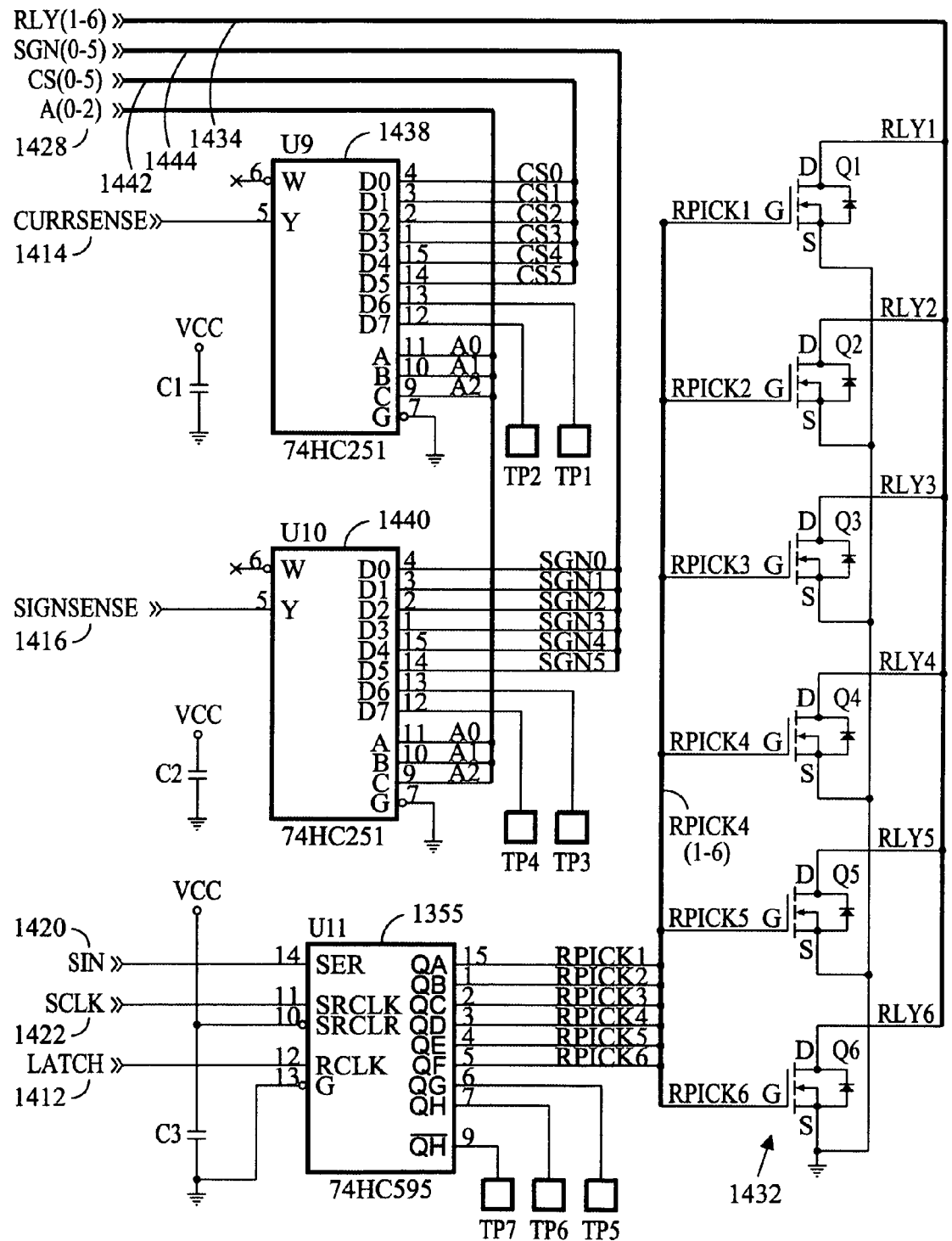
Figure 14G:
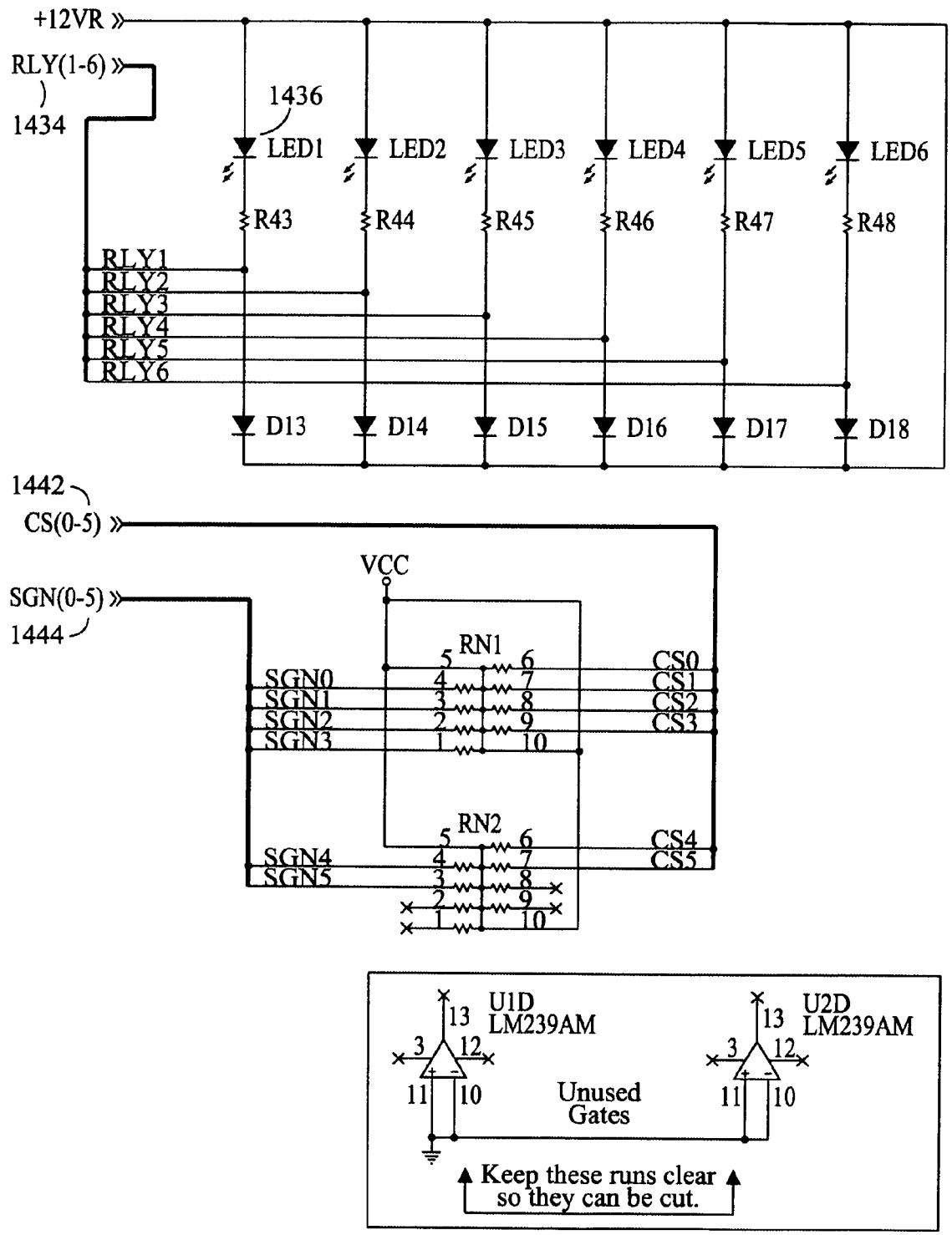
Figure 14H:
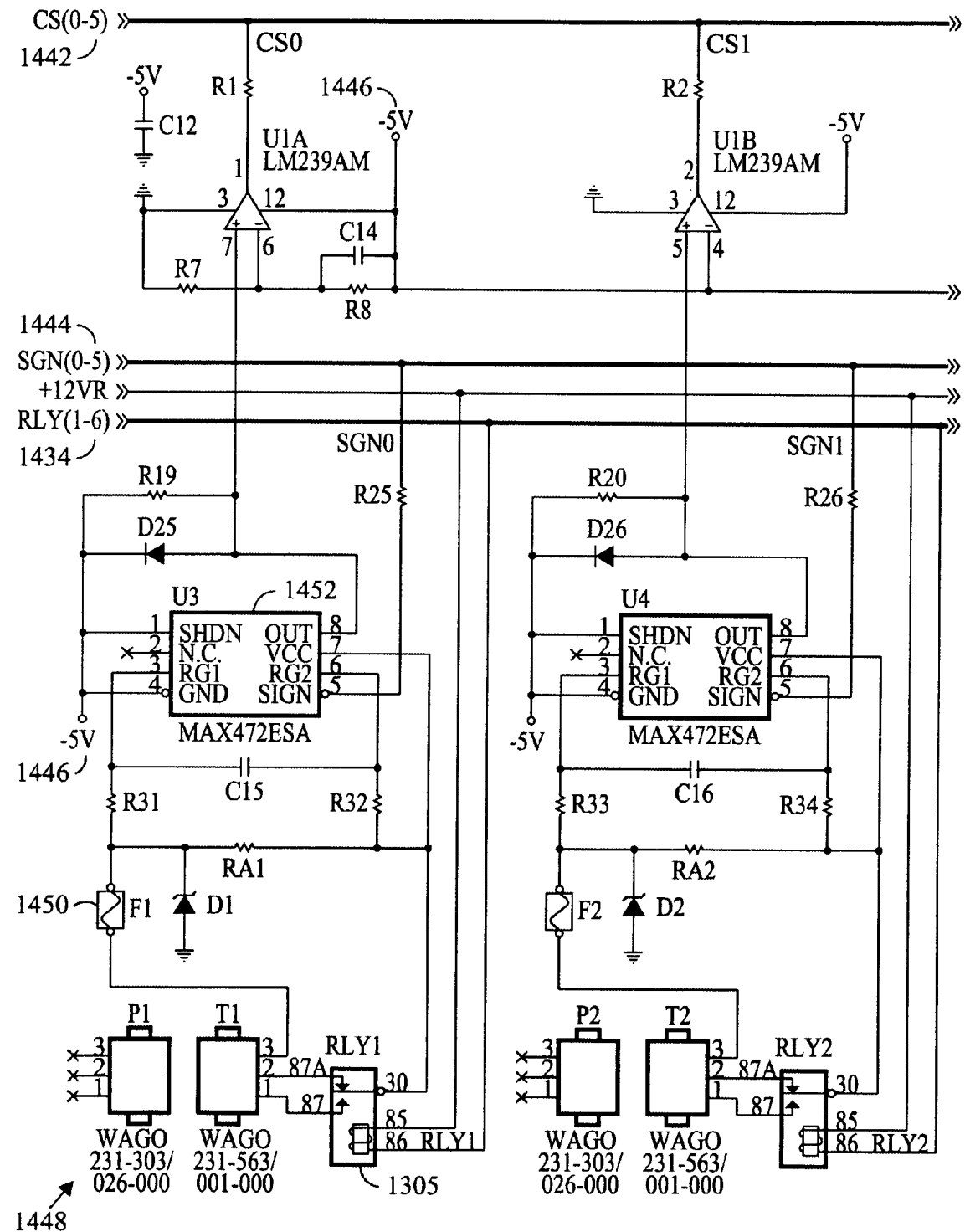
Figure 14I:
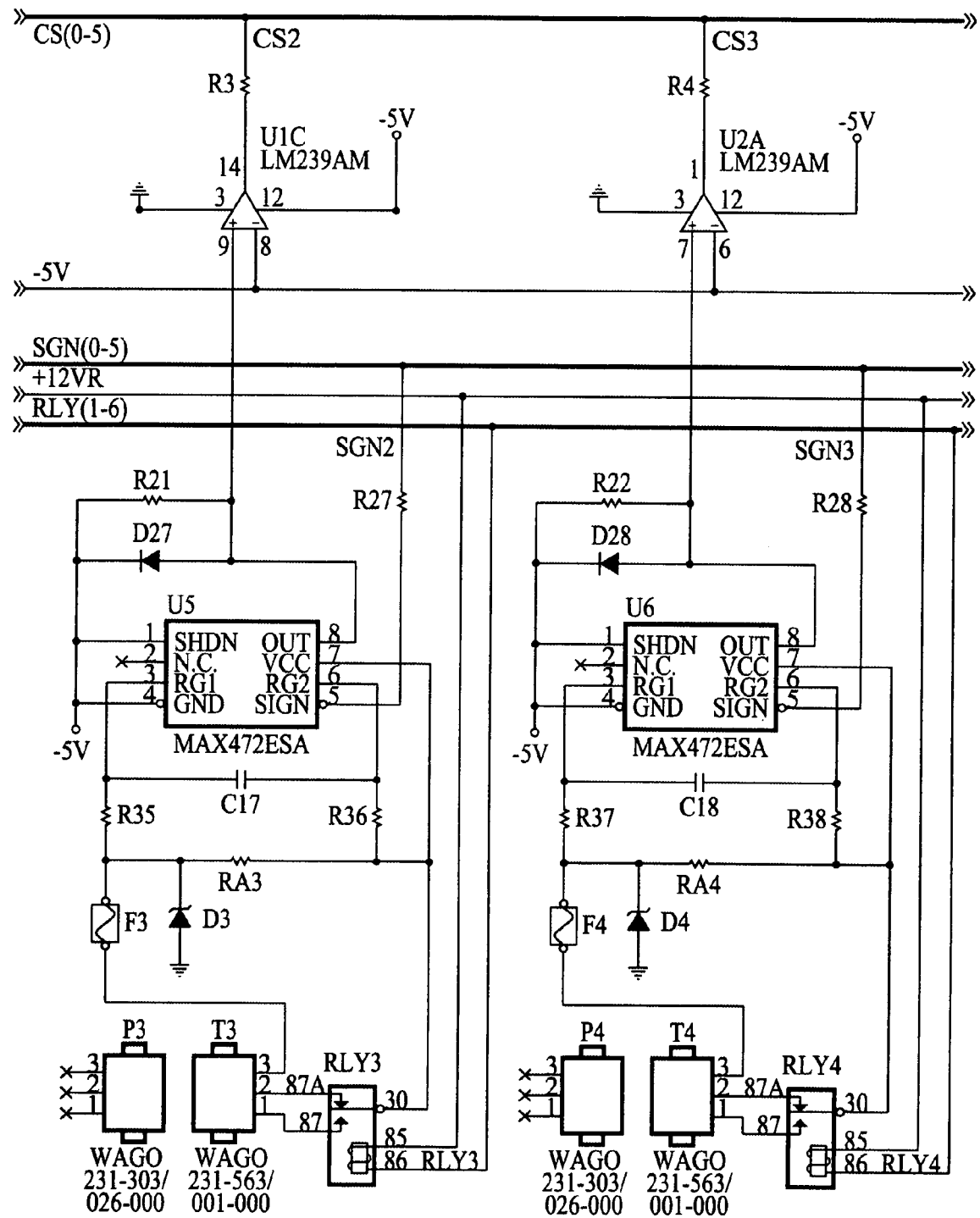
Figure 14J:
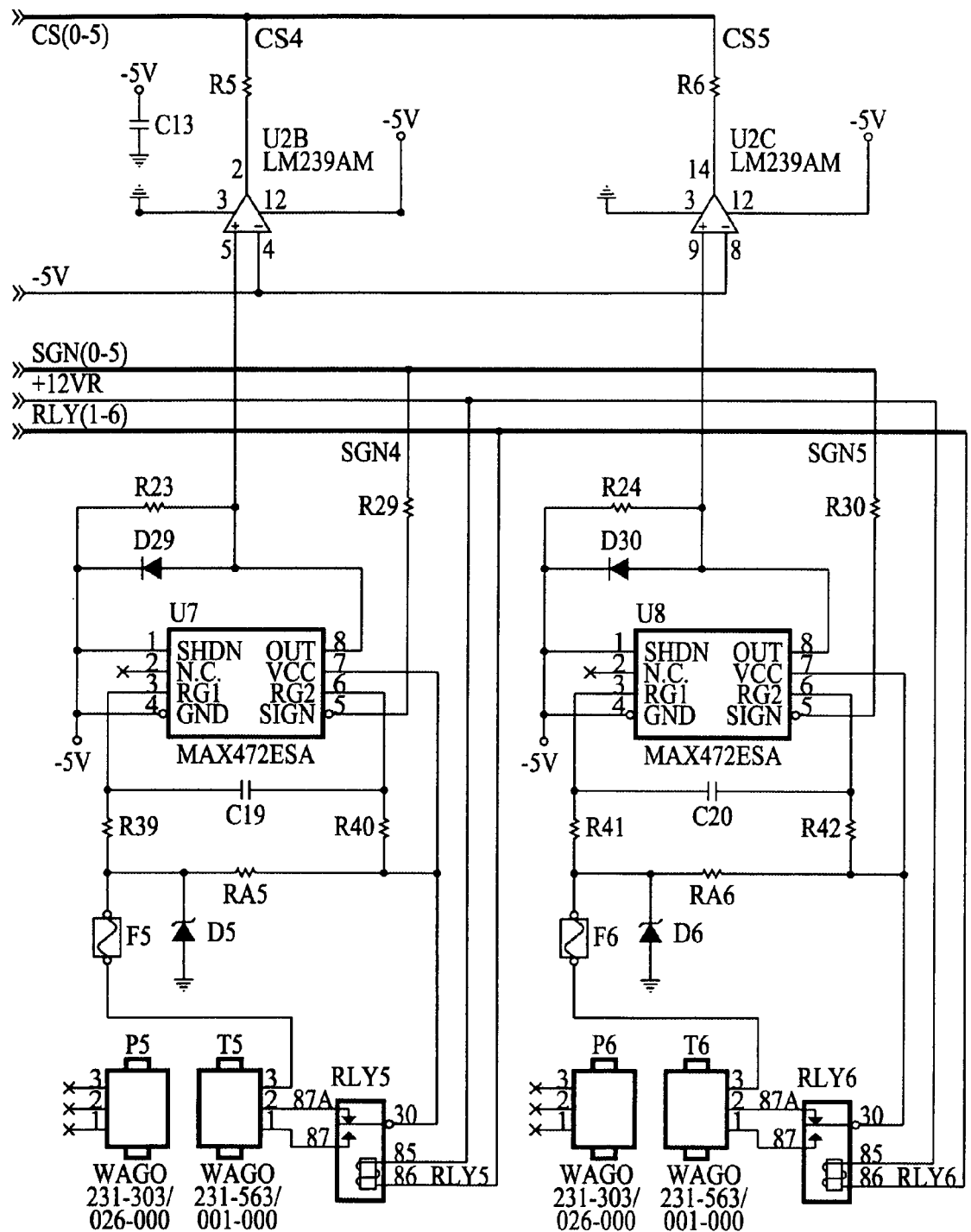

FIG. 14F illustrates bi-directional current sensing circuitry for each of the six Form C relays 1305 within a relay module, according to one embodiment. Each of the six Form C relays 1305 may comprise a relay of the type designated Tyco 6-1393298-0/1393310-3 available from Tyco Electronics, which is a Form C, single pole double throw, automotive relay. The bi-directional current sensing circuitry, as shown, involves the load circuitry rather than the control circuitry. That is, the relay control lines RLY 1434 and corresponding +12 volt supply lines for energizing the coils within each of the Form C relays 1305 comprise control circuitry that, apart from the energized coils' switching effect, is electrically isolated from the bi-directional current sensing circuitry.

The bi-directional current sensing circuitry shown includes a bi-directional current sense amplifier 1452 of the type MAX472ESA available from Maxim Integrated Products for each of the Form C relays 1305. The MAX472ESA uses external sense and gain-setting resistors and features an open collector SIGN output for indicating current flow direction. An example use for this feature may be monitoring whether a circuit breaker switch is being driven open or whether it is being driven the other way closed. Another example use may be monitoring whether a battery is being charged or whether it is being discharged. The bi-directional current sense amplifier 1452 may be supplied with −5 volt supply 1446 and configured with the six sign sense inputs 1444 and six current sense inputs 1442 as shown.

FIG. 14F also illustrates a physical interface for each of the Form C relays 1305 within a relay module. The relay connector 1448 may comprise WAGO 231-563/001-000 and WAGO 231-303/026-000 connectors from Wago Innovative Connections and may be configured as shown, with the common connection having an in-line fuse 1450 such as a 15A fuse of the type 153-008 from Littelfuse and normally closed (NC) and normally open (NO) connections with the Form C relay 1305.

Circuit Breaker Controller

Figure 15:
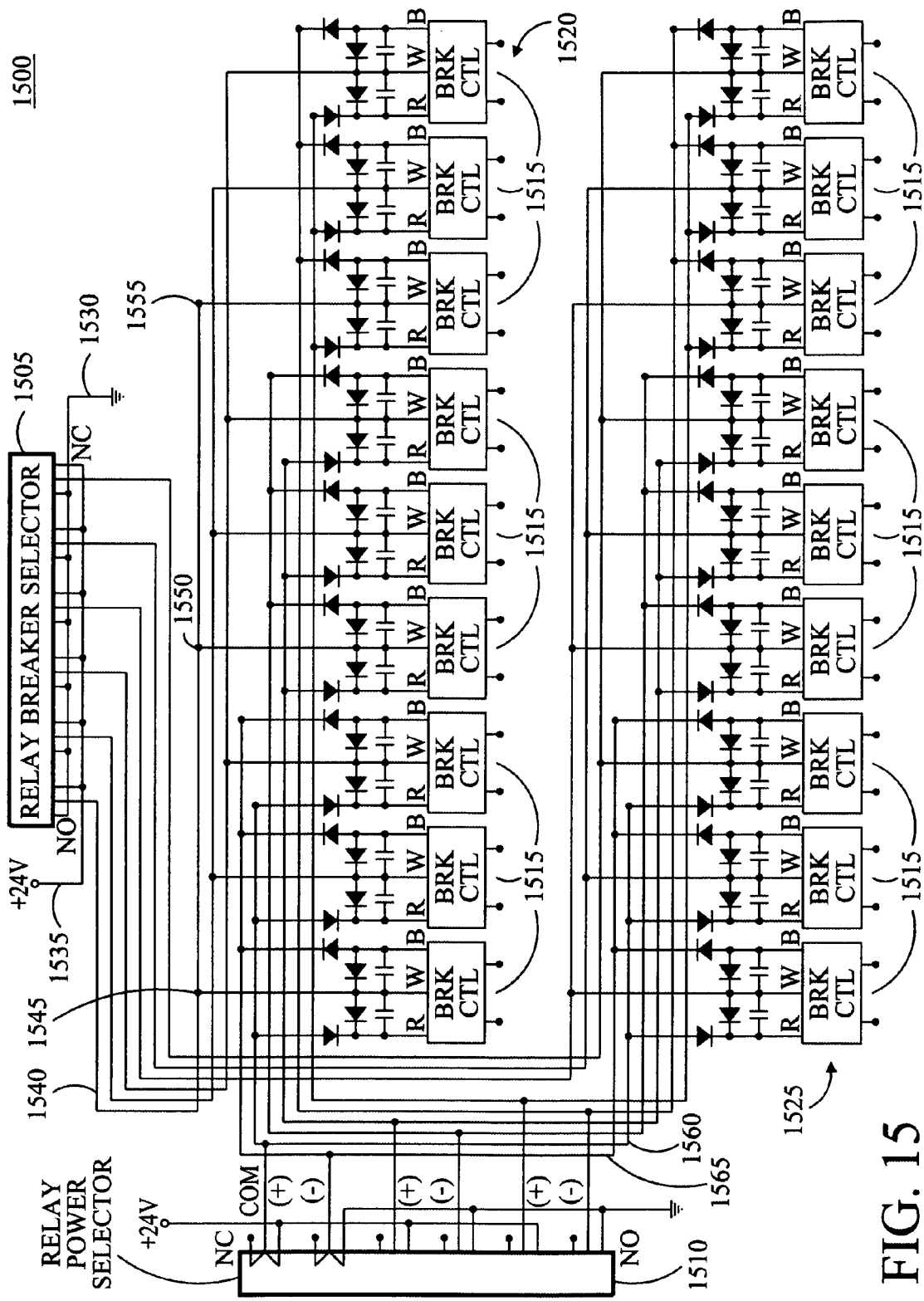
FIG. 15 illustrates a circuit breaker controller schematic according to one embodiment of the invention.

FIG. 15 illustrates a schematic for a circuit breaker controller 1500 according to one embodiment. The relay module 1505 and the relay module 1510 may be configured as shown to control one or more breaker controllers 1515. As illustrated in FIG. 15 a circuit breaker controller 1500 may comprise eighteen breaker controllers 1515. A first breaker strip 1520 may comprise the top nine breaker controllers 1515, and the bottom nine breaker controllers 1515 may comprise a second breaker strip 1525. The relay module 1505 may be configured as shown with normally open (NO) and normally closed (NC) connections to ground and +24 volts as illustrated. The relay module 1505 may be controlled by a smart module to operate in either NC or NO modes. For example, either ground 1530 or +24 volts 1535 may be connected with common 1540 by controlling the corresponding Form C relay within the relay module 1505. Each of the six common connections from the relay module 1505 may be connected to three of the eighteen breaker controllers 1515 thereby selecting those particular breaker controllers 1515 to be controlled. For instance, common 1540 may be connected to three breaker controllers 1515 shown schematically at the points 1545, 1550, and 1555. The relay module 1510 may be controlled by a smart module to operate three Form C relays within the relay module 1510 in a normally closed (NC) mode and three in a normally open (NO) mode. Each of the common lines from the relay module 1510 may be configured as shown to connect with six different breaker controllers 1515. For instance, common 1560 may be configured to connect to six different breaker controllers 1515 with one of them also being the breaker controller 1515 with a connection at point 1545. In a similar fashion, common 1565 may be configured to connect with those same six breaker controllers 1515 and with one of them being the breaker controller 1515 with a connection at point 1545 as illustrated. As may be seen by tracing the wire paths illustrated, the relay module 1510 may control whether the breaker controller 1515 connected at point 1545 receives a positive voltage (+24 volts) via common 1560 or ground via common 1565. Further, the relay module 1505 may be controlled so as to determine whether the common 1540 is connected to ground 1530 or +24 volts 1535. Thus, the particular breaker controller 1515 with connection at point 1545 may be selectively and controllably operated by controlling the two relay modules 1505 and 1510 configured as illustrated in FIG. 15. The other breaker controllers 1515 may be selectively and controllably operated in a similar manner.

As previously mentioned, the use of Form C relays within the relay modules comprising a circuit breaker controller (a virtual module created by programming additional functionality within a smart module and configuring two relay modules as described) allows for control of devices such as AC circuit breakers. Operation of the Form C relay in one mode (i.e. normally open) may be used to supply a positive voltage to, for example, a DC motor for driving a circuit breaker. Operation of the Form C relay in another mode (i.e. normally closed) may be used to supply a negative voltage to, for example, the DC motor for driving the circuit breaker in the opposite direction. Thus, the use of Form C relays allows for the control of devices such as circuit breakers.

Figure 16A:
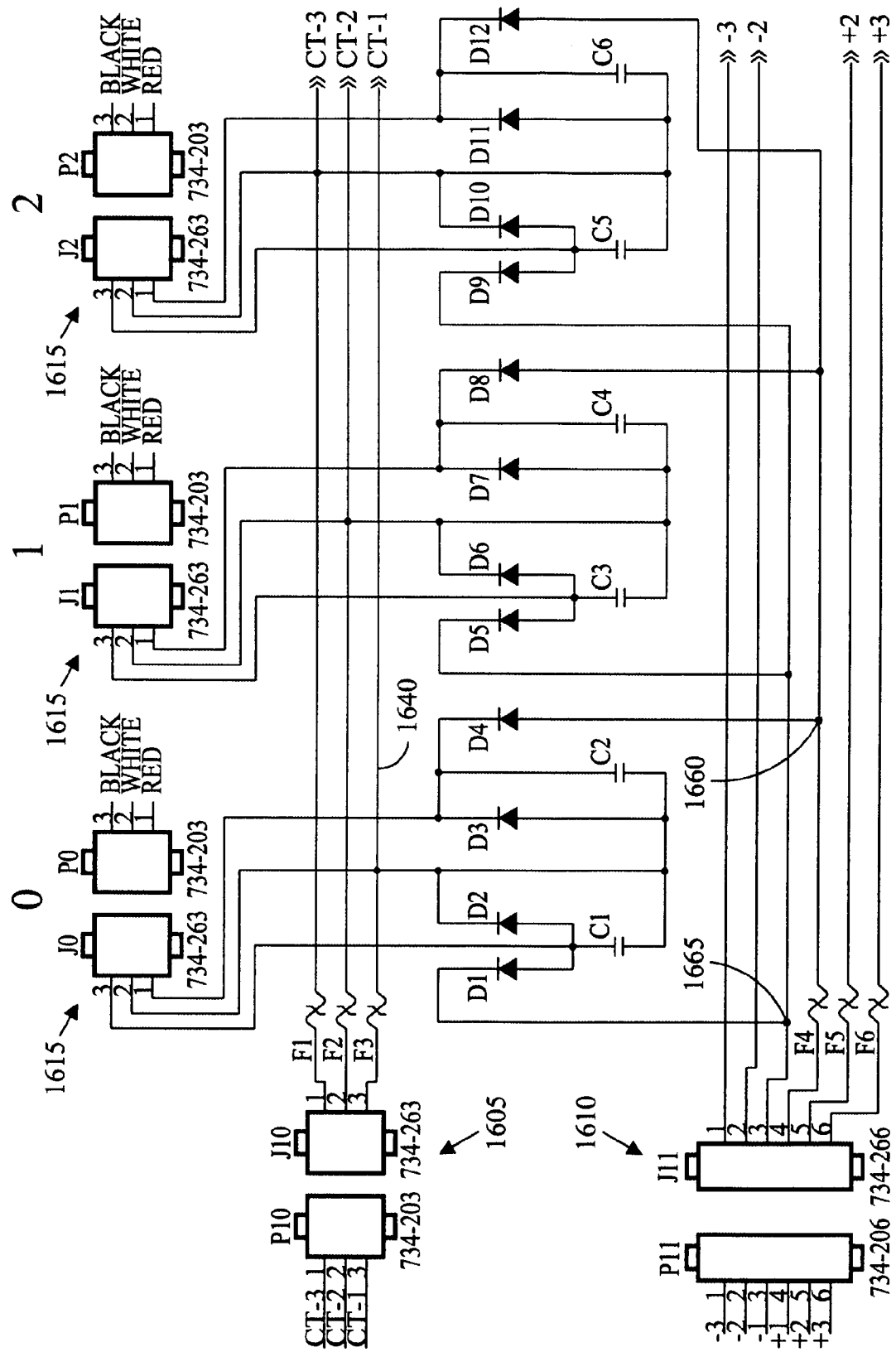
FIGS. 16A-16C comprise a breaker strip schematic according to one embodiment.
Figure 16B:
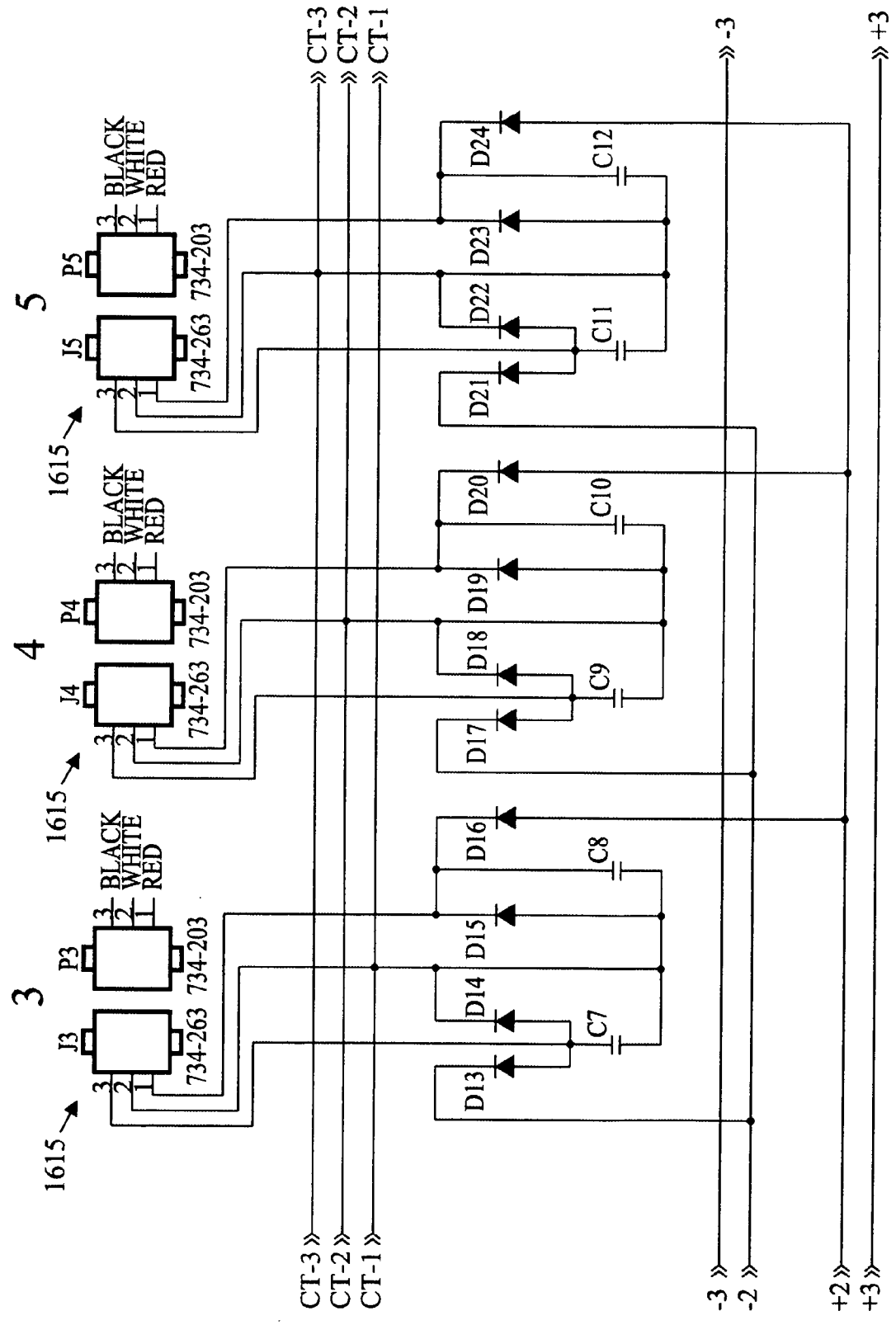
Figure 16C:
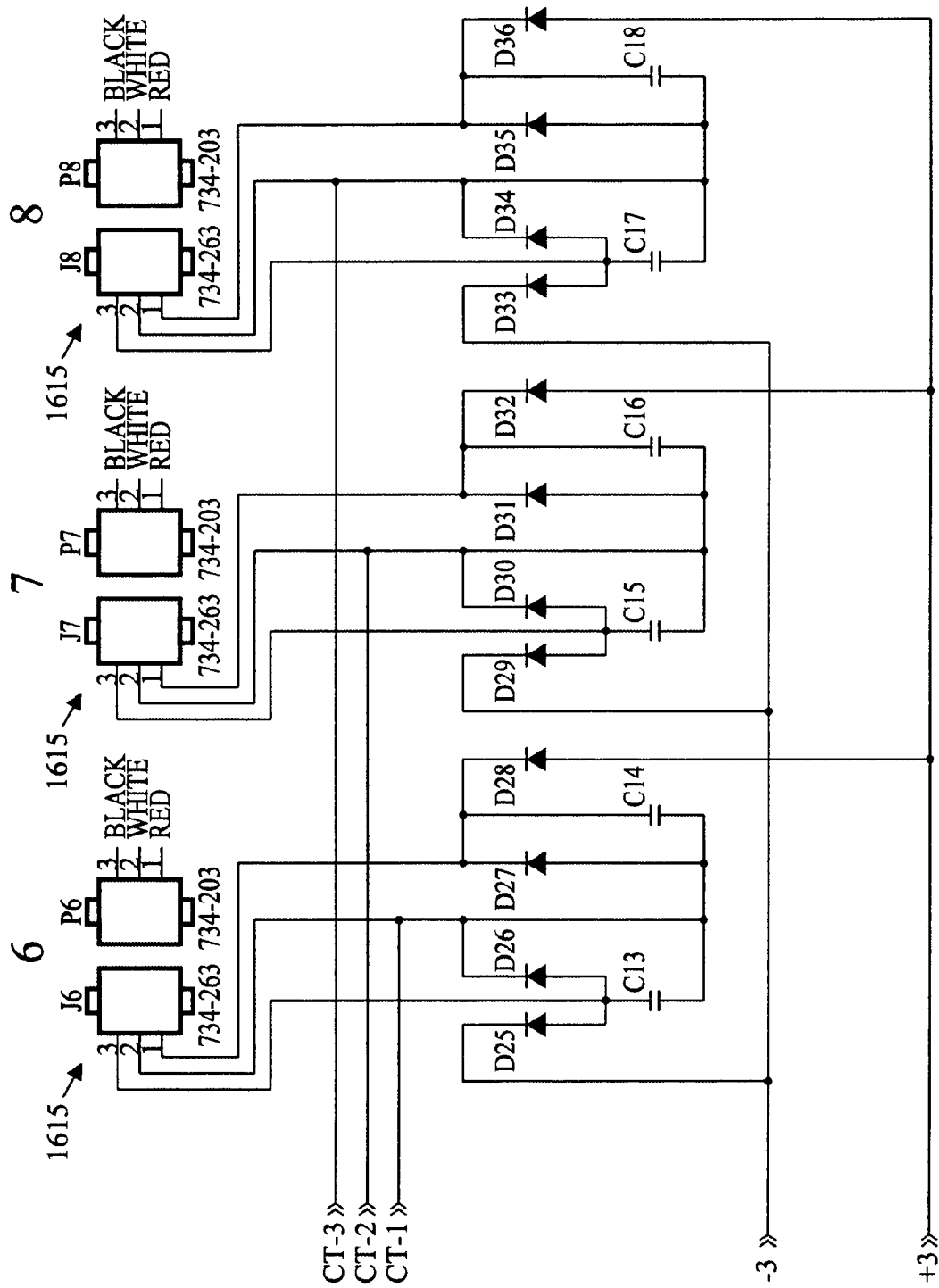

FIGS. 16A-16C comprise a schematic of a breaker strip such as breaker strip 1520 as shown in FIG. 15. FIG. 16A illustrates the connections between relay modules and the individual breaker controllers comprising a breaker strip such as breaker strip 1520. The relay module connector 1605 may be configured as shown for connecting three (of the six) common lines of a relay module such as relay module 1505 as described previously. Only three common lines are shown because only three are needed for one breaker strip whereas FIG. 15 illustrates two breaker strips with each having three common lines connected with relay module 1505. The physical relay module connector 1605 may be of the type 734-263 (and matching 734-203) from Wago Innovative Connections. The relay module connector 1610 may be configured as shown for connecting six common lines of a relay module such as relay module 1510 as described previously. The physical relay module connector 1610 may be of the type 734-266 (and matching 732-206) from Wago Innovative Connections. The breaker controller connector 1615 may be configured as shown for connecting the three lines of each breaker controller such as breaker controller 1515. The physical breaker controller connector 1615 may be of the same type used for the relay module connector 1605.

The breaker strip circuitry illustrated in FIGS. 16A-16C may comprise the circuitry illustrated in FIG. 15. For example, the configuration and operation of commons 1640, 1660, and 1665 may be identical with commons 1540, 1560, and 1565 as described and illustrated in FIG. 15. Connections and configurations of two relay modules with three of nine breaker controllers comprising one breaker strip are illustrated in FIG. 16A. The connections and configurations with another three of the nine breaker controllers are illustrated in FIG. 16B. Finally, the connections and configurations with the final three of the nine breaker controllers are illustrated in FIG. 16C.

Techlink Network Manager

Figure 17A:
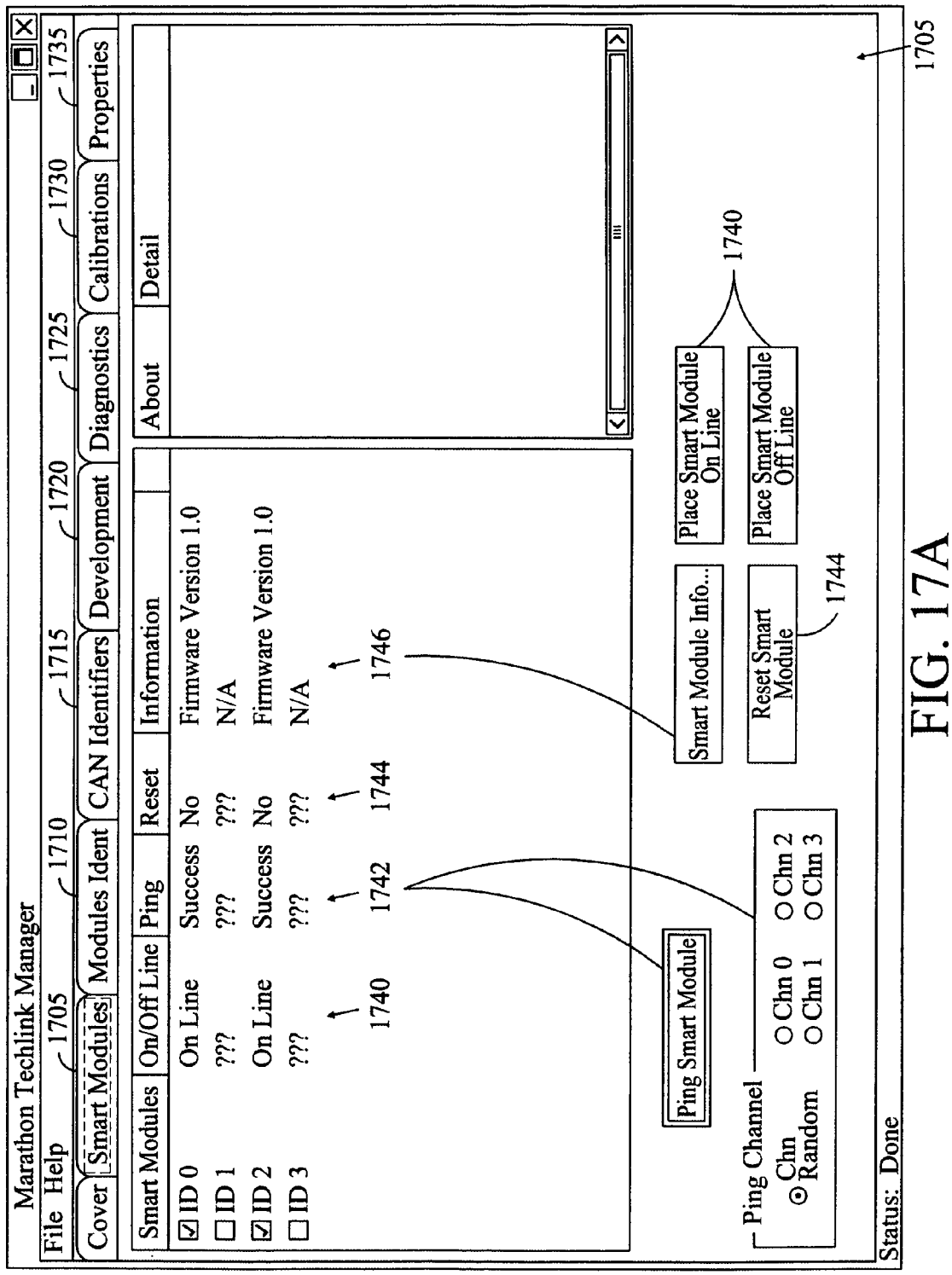

FIGS. 17A-17I depict exemplary screen shots of an application used for programming, testing, and calibrating an electrical system for controlling coach resources, according to one embodiment. FIG. 17A depicts an exemplary smart modules page 1705 for allowing a user direct access to smart modules within the coach electrical system for diagnostic purposes. As shown, the screen may comprise a standard window graphics interface with tabs (and upon opening a page) for various diagnostic functions. For example, the screen may comprise tabs for a smart modules page 1705, modules identification page 1710, CAN identifiers page 1715, development page 1720, diagnostics page 1725, calibrations page 1730, and properties page 1735.

The smart modules page 1705 may be used to verify proper communications between all smart modules before other procedures are executed. Each smart module may be placed on line or off line 1740, reset 1744 if needed, or pinged 1742 to verify whether all four channels of communication (all four CAN bus lines) are operating properly. This page may also be used to display the software or firmware versions 1746 installed and running on each of the smart modules.

Figure 17B:
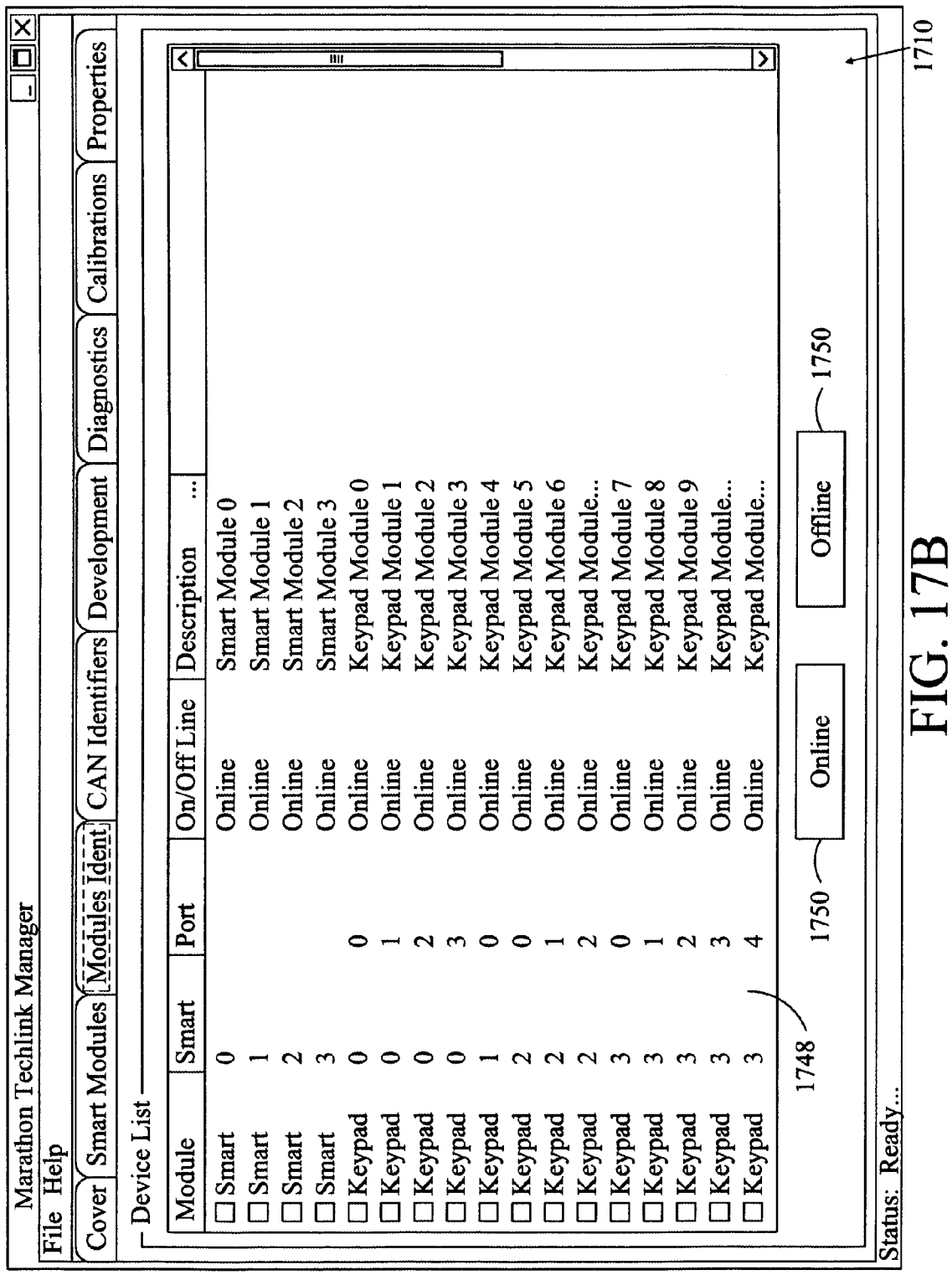

FIG. 17B depicts a modules identification page 1710 which may be used to list all modules that are installed within a coach module flash file. For example, each smart module includes configuration information for the coach electrical system. This information may include physical ID's and port numbers where various modules may be connected. Each line of information 1748 may be double clicked to retrieve additional information. Each module listed may also be placed on line or offline 1750 from the modules identification page 1710.

Figure 17C:
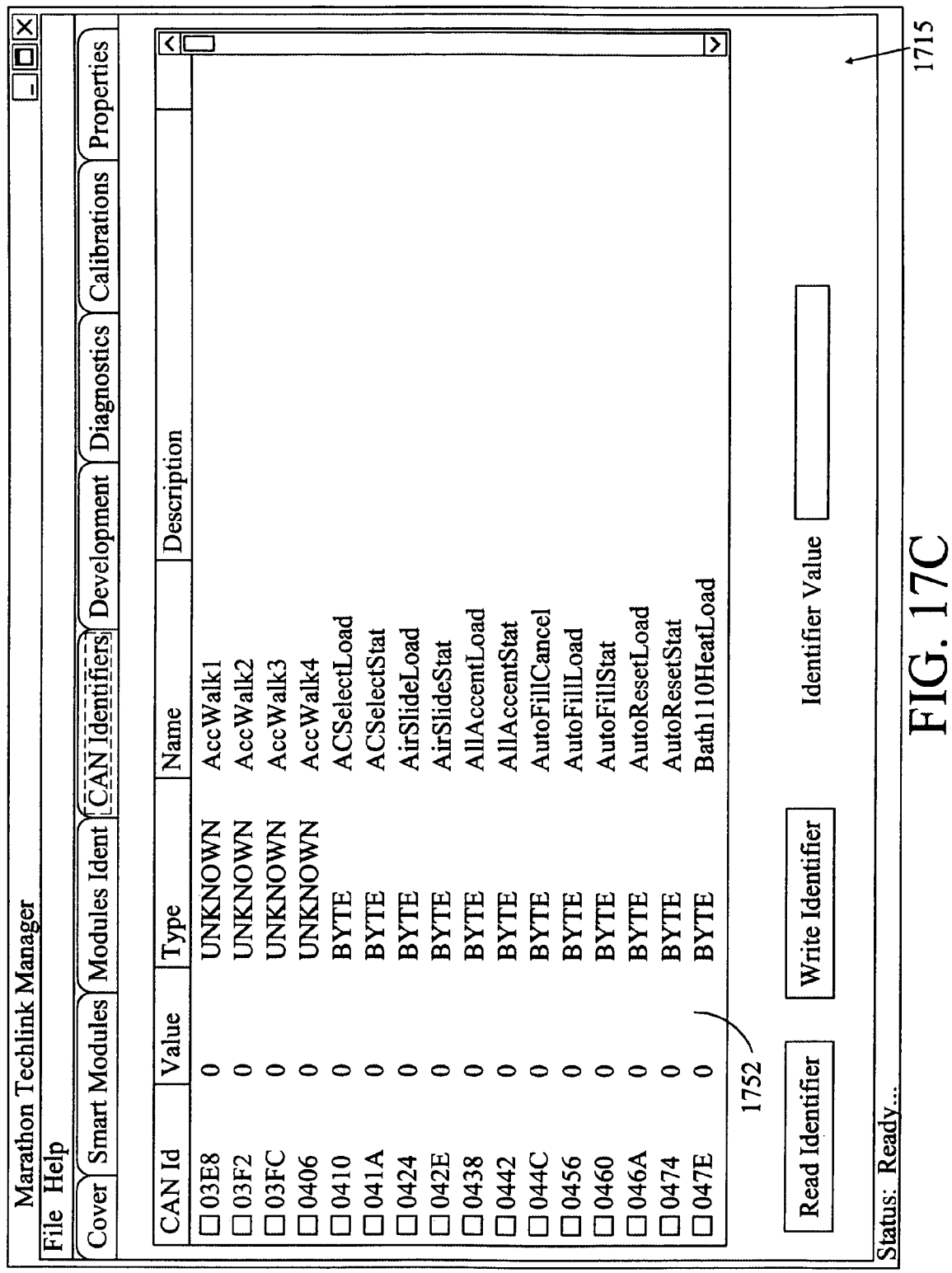

FIG. 17C depicts a CAN identifiers page 1715 which may be used to display a list off all CAN identifiers defined within a coach application. This page may be used to read or modify (write) the value of selected identifiers 1752.

Figure 17D:
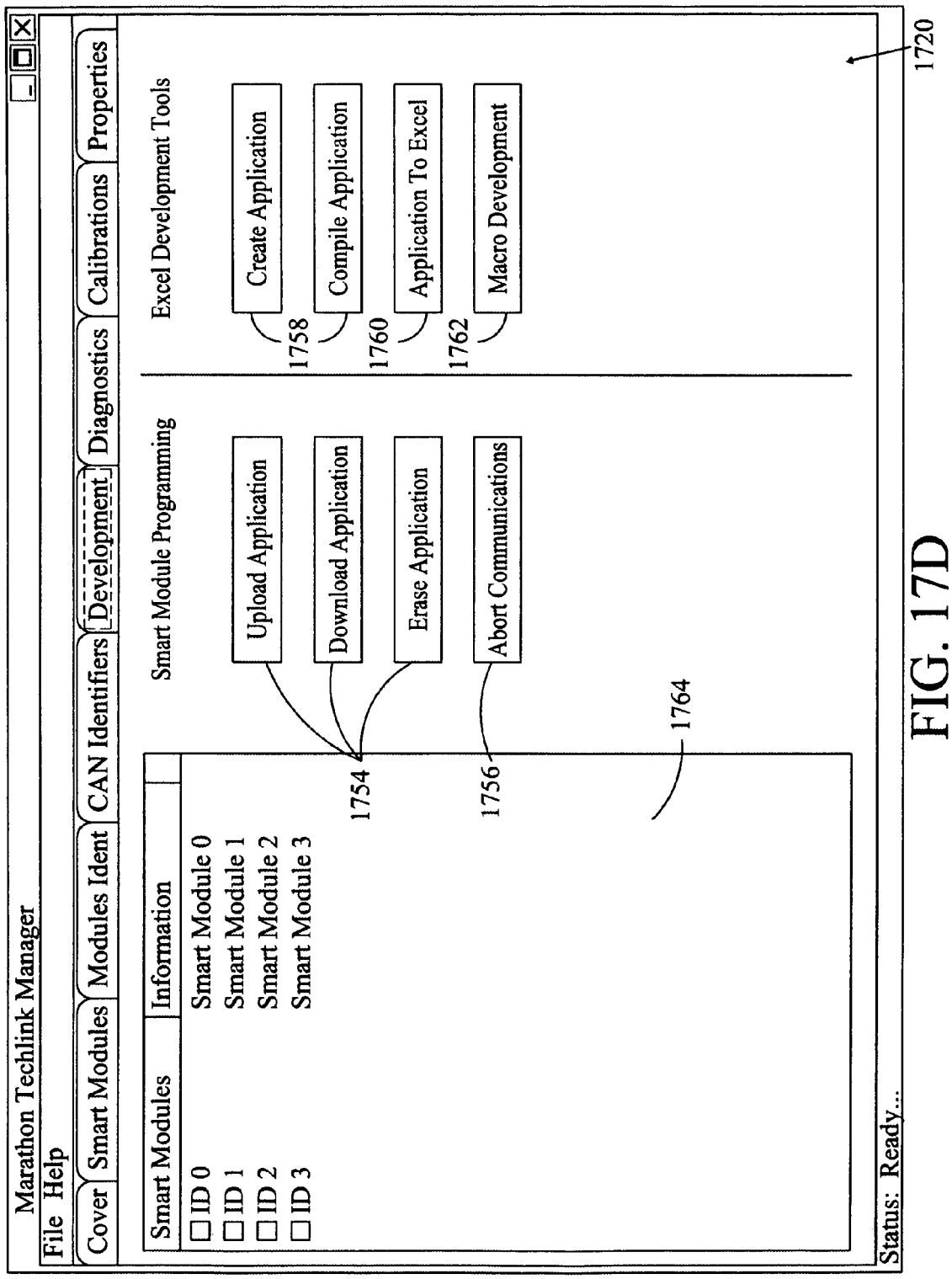

FIG. 17D depicts a development page 1720 which may be used to configure smart modules with module setup and layout information. Various development utilities may be provided. For example, buttons 1754 may be provided for uploading applications, downloading applications, or erasing applications. These are smart module programming functions used to modify the flash memory within a selected smart module 1764. A button 1756 may be used to abort communications with a smart module. Buttons 1758 may be provided for creating applications or compiling applications using Microsoft Excel development tools. An "Application to Excel" button 1760 may be provided for converting the currently loaded smart module flash memory file to an Excel file. The "Macro Development" button 1762 may be used to create macros programs associated with various network management tasks.

Figure 17E:
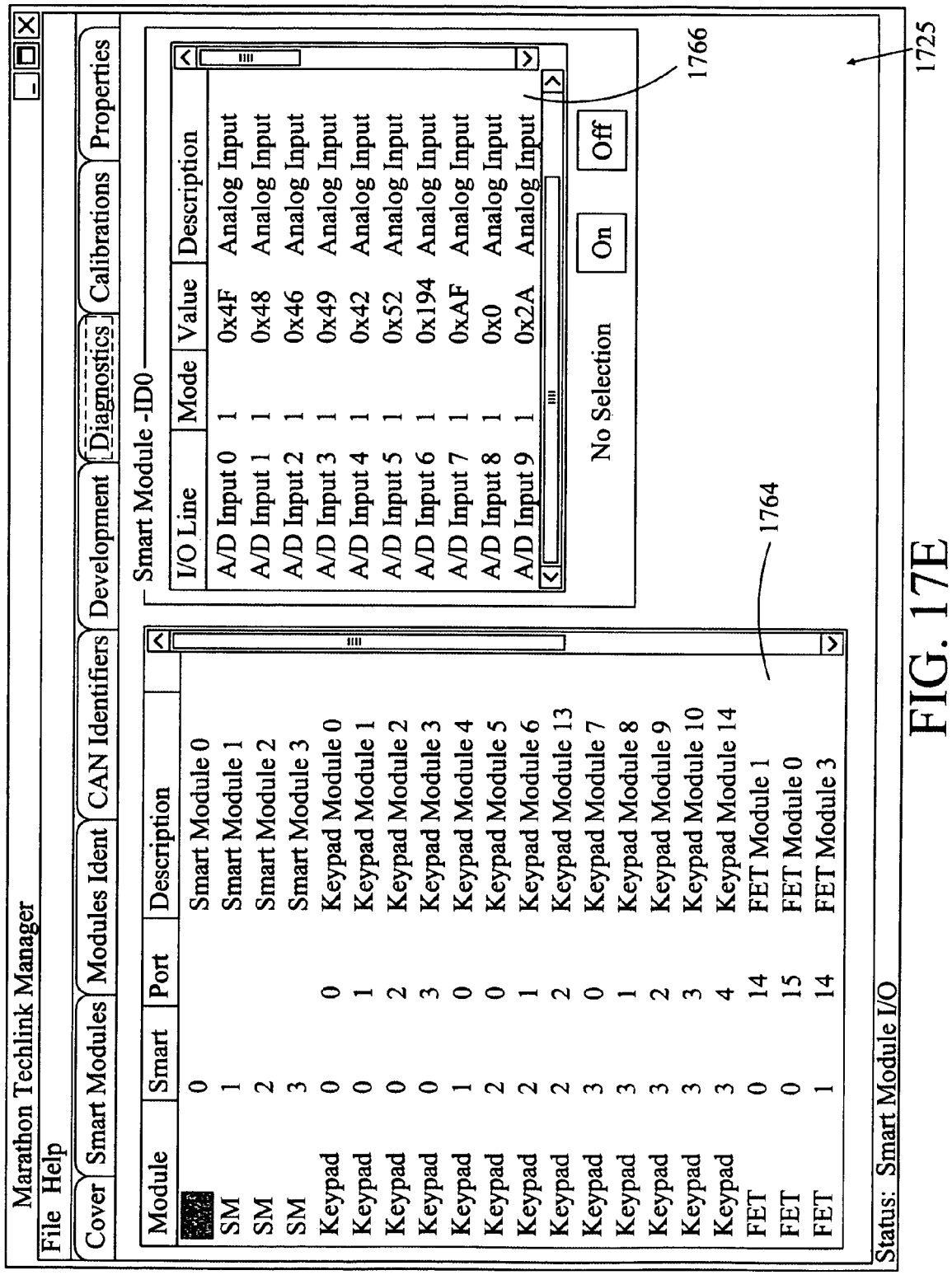

FIG. 17E depicts a diagnostics page 1725 which may be used to perform diagnostics on different modules within the coach electrical system. The content in the left box 1764, as shown, may comprise a list of modules within the electrical system, their respective connectivity with smart modules, work module port connections, and description information. The content in the right box 1766, as shown, may comprise diagnostic information for the module highlighted within the left box 1764.

Figure 17F:
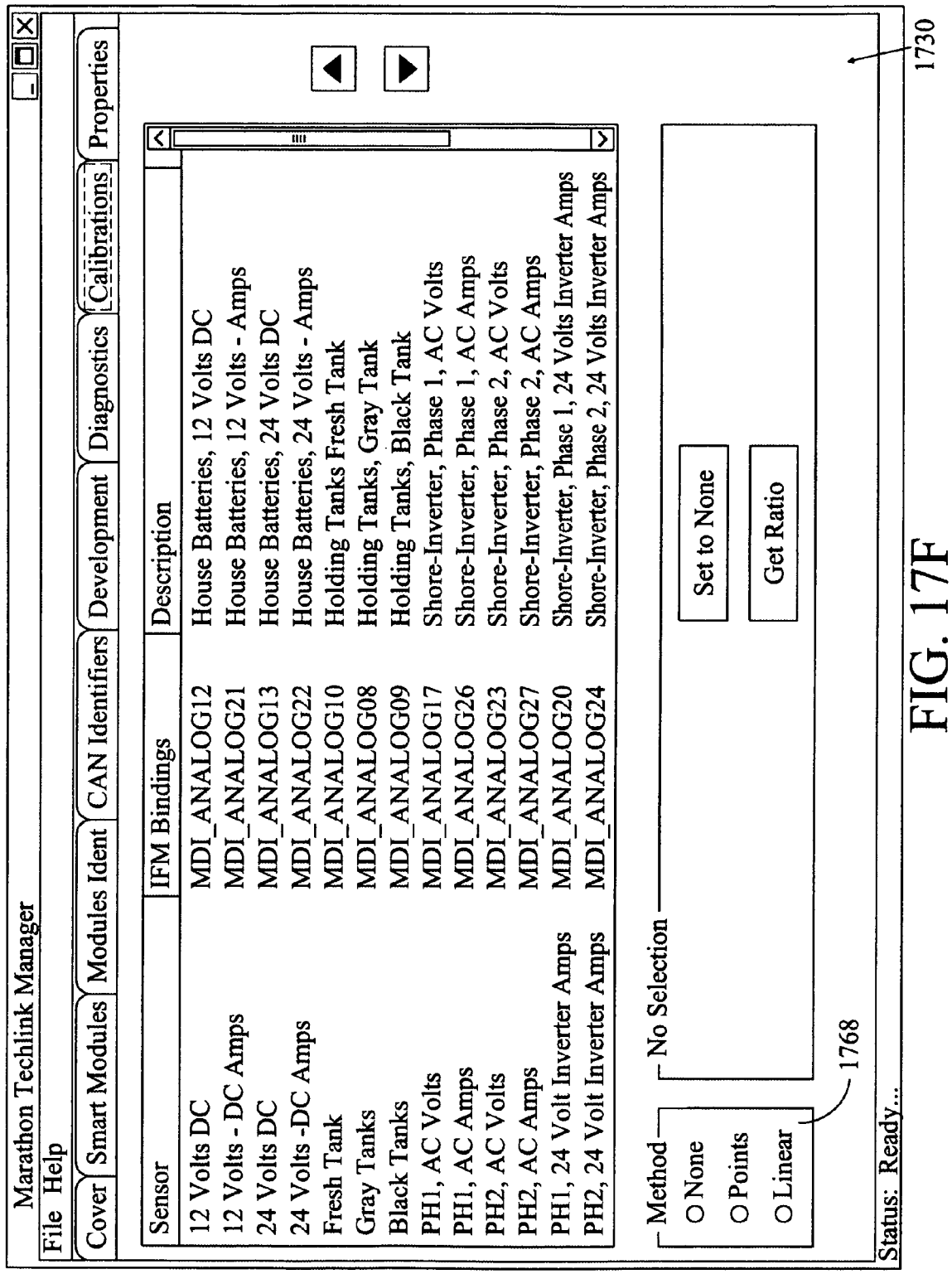

FIG. 17F depicts a calibrations page 1730 which may be used to perform calibrations of an interface module associated with the coach electrical system. The interface module may be used in conjunction with a smart module for managing one or more sensor which may be connected to the smart module. For instance, an interface module may comprise displays for 12 volt house batteries voltage, 12 volt house batteries amps, 24 volt house batteries voltage, 24 volt house batteries amps, fresh tank level, grey tank level, black tank level, and so forth. Exemplary sensors involving such an interface module are listed in the screen shot in FIG. 17F. Various sensors have previously been described. Some of these sensors are analog sensors which require calibrations to adjust and account for conditions which may be measured by other sensors or which may comprise information included within the configuration information for the coach electrical system. For example, temperature or pressure information may be used to adjust values from other sensors such as tank level sensors. An interface module may be used to display various sensor outputs and to allow for the displayed outputs to account for various calibrations.

The calibrations page 1730 may be used to calibrate the information displayed on the interface module. The method 1768 of calibration may be selected. Typical methods include a points method of calibration and a linear method of calibration. Various procedures may be used to calibrate sensors used in the coach electrical system. These procedures largely depend upon the sensors and display configuration for a particular coach and, thus, will not be discussed in further detail herein.

Figure 17G:
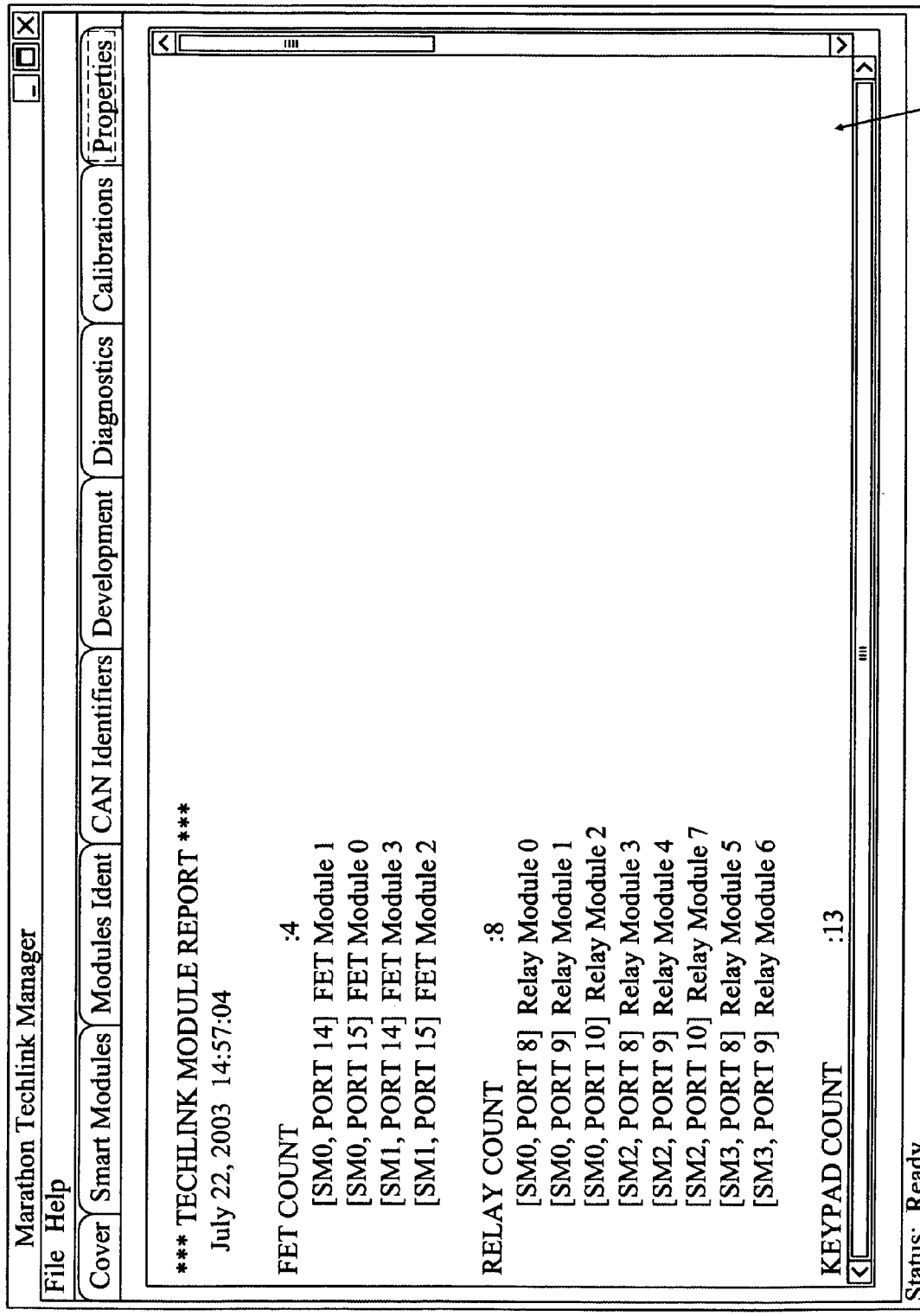
Figure 17I:
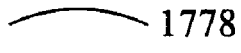
Figure 17I:
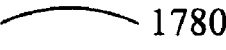
Figure 17I:
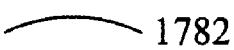

FIG. 17G depicts a properties page 1735 which may be used to list general configuration information about a particular coach electrical system. This page may be used to provide general statistics of a currently loaded smart module flash memory configuration file. For example, a module report 1770 may be generated that lists the number and port connections of various modules.

As shown in FIGS. 17G-17H, an exemplary module report 1770 may comprise a lighting module #1 1772 connected to smart module #0 via its port number 14, relay module #3 1774 connected to smart module #2 via its port number 8, keypad (or switch group) module #14 1776 connected to smart module #3 via its port number 4, circuit breaker controller (virtual module) 1778 connected to smart module #1 using both ports 8 and 9, and interface module #0 1780 connected to smart module #0. The exemplary module report 1770, as shown, also includes a total module count 1782 showing, in this example, that 32 modules are included in this particular coach electrical system.

Communication Protocols

Each smart module uses the RS422/485 protocol for controlling work modules connected to it. Work modules may be configured to directly control coach resources using standard digital logic control. For instance, lights may be controlled directly through the lighting module using the switch inputs on the lighting module itself. However, a more typical configuration includes linking together (or "binding") various functions performed by different work modules. For example, a particular switch may be linked to a particular device connected to another work module for performing a certain function. Network communications commence when the switch actuation signal is received by the switch group module supporting the particular switch. The switch group module communicates the control command via RS422/485 to the smart module to which the switch group module is connected. The smart module may then communicate over one or more CAN bus (using the CAN 2.0 A/B protocol) to another smart module if the linked device is connected to a different smart module. Once the appropriate smart module receives the request the smart module communicates to the appropriate work module via RS422/485. Finally, acknowledgements are communicated back through the RS4222/485 and CAN bus channels for indication whether the desired function was performed successfully.

The CAN 2.0 A/B protocol involves 8-byte data packets plus a CAN identifier which may require several additional bytes. Instead of relying exclusively on the (single bit correction) hardware CRC provided by the CAN engine (transceiver) within the Motorola MC9S12DP256 microcontroller, a secondary software CRC may be added to improve system reliability and throughput. The software CRC may be an 8-bit value added to the CAN identifier, creating a CRC byte within the CAN identifier. As data packets are prepared for transmission across a CAN bus, the software CRC is added to the CAN identifier information. The packet is then broadcasted to the other smart modules across an available CAN bus. The receiving smart module recomputes the software CRC. If the values match, the receiving smart module keeps the packet. If the values do not match, the receiving smart module ignores it and the sending smart module resends the packet across a different CAN bus. Embedding the software CRC in the CAN identifier allows all 8 bytes of the data packet to remain available for control information rather than error checking information thus improving system throughput and system response.

Smart Module Main Core Software

FIGS. 18A-18B illustrate exemplary main core programming instructions for a smart module 1800. Exemplary programming instructions may be written in C+ or another programming language. The main core programming instructions for a smart module 1800 generally include:

1. Subroutines to initialize various systems and subsystems 1802,

2. Subroutines to setup A/D converters, I/O lines, and timers 1825, communication ports 1840 and 1845, and CAN interfaces 1810, command processing 1830, 3. Setting the smart module identification number 1835, 4. Subroutines to pump communications I/O ports and the CAN network 1850 (checking for CAN ID's to determine whether CAN messages are directed to the instant smart module), 5. Subroutines to process the command interface 1860, 6. Initialization subroutines to read and write to flash memory 1865, and 7. A main or core operating system subroutine for processing requests from CAN ports 1870.

As described herein, the present invention provides an electrical system for controlling coach resources that provides improved reliability and economy. According to one embodiment of the invention, the electrical system may comprise a plurality of smart modules networked together on a multiple channel network, one or more work modules each communicably connected with one of the smart modules, and one or more electrical devices controllably connected with one of the work modules. In one embodiment, the multiple channel network comprises multiple CAN busses and the work modules communicate to smart modules via RS422/485.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. An electrical system for a vehicle comprising:
   (a) a first work module that provides a control signal to an electrical device;
   (b) a second work module that provides a control signal to another electrical device;
   (c) a first smart module electrically interconnected to said first work module;
   (d) a second smart module electrically interconnected to said second work module;
   (e) said first smart module electrically interconnected to said second smart module, wherein said first smart and said second smart module include sufficient network configuration data so that one of said first smart module and said second smart module may be replaced by a matching smart module of the other one and providing the same network functionality.

2. An electrical system for controlling coach resources, comprising:
   (a) a plurality of smart modules networked together on a multiple channel network,
   (b) one or more work modules each communicably connected with one of the smart modules, and
   (c) one or more electrical devices controllably connected with one of the work modules, wherein said work modules comprise a switching group module including switch settings that are programmable for changing functions of inputs and outputs associated said switch group module.

3. An electrical system for controlling coach resources, comprising:
   (a) a plurality of smart modules networked together on a multiple channel network,
   (b) one or more work modules each communicably connected with one of the smart modules, and
   (c) one or more electrical devices controllably connected with one of the work modules, wherein said multiple channel network comprises spatially separable redundant wiring between smart modules, said spatially separable redundant wiring providing alternate channels of communication should some of said channels of communications fail or should some of said wiring become damaged.

4. An electrical system for controlling coach resources, comprising a plurality of smart modules networked together on a multiple channel network, one or more work modules each communicably connected with one of the smart modules, and one or more electrical devices controllably connected with one of the work modules, wherein each smart module comprises circuitry for:
   (a) communicating with other smart modules on said multiple channel network,
   (b) communicating with work modules on a master-slave basis where said smart module is master,
   (c) storing configuration and description information for the coach electrical system,
   (d) analog-to-digital conversion associated with analog inputs on board said smart module,
   (e) handling digital inputs and outputs on-board said smart module,
   (f) interfacing with peripheral devices such as a laptop computer for loading programmable instructions into said smart module, performing diagnostics on the coach electrical system, developing new coach electrical system layout configurations, and other coach electrical system management tasks.

5. An electrical system for controlling coach resources, comprising:
   (a) a plurality of smart modules networked together on a multiple channel network,
   (b) one or more work modules each communicably connected with one of the smart modules, and
   (c) one or more electrical devices controllably connected with one of the work modules, wherein each smart module comprises a DIP switch for selecting a smart module number, said smart module number corresponding with configuration and description information stored within said smart module that defines which of said work modules are connected to said smart module and other configuration information for operation of said smart module within the coach electrical system.

6. An electrical system for controlling coach resources, comprising:
   (a) a plurality of smart modules networked together on a multiple channel network,
   (b) one or more work modules each communicably connected with one of the smart modules, and
   (c) one or more electrical devices controllably connected with one of the work modules, wherein a modified protocol is used for communication between two or more smart modules on said multiple channel network, wherein said multiple channel network comprises at least a first and a second channel, and each smart module transmits and receives on said second channel if said first channel is busy or unavailable.

* * * * *